United States Patent
Watariguchi et al.

(10) Patent No.: US 11,249,407 B2
(45) Date of Patent: Feb. 15, 2022

(54) ELECTROPHOTOGRAPHIC PHOTOSENSITIVE MEMBER, PROCESS CARTRIDGE AND ELECTROPHOTOGRAPHIC APPARATUS

(71) Applicant: CANON KABUSHIKI KAISHA, Tokyo (JP)

(72) Inventors: Kaname Watariguchi, Yokohama (JP); Tomohito Ishida, Suntou-gun (JP); Masataka Kawahara, Mishima (JP); Michiyo Sekiya, Atami (JP); Kohei Makisumi, Suntou-gun (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/905,427

(22) Filed: Jun. 18, 2020

(65) Prior Publication Data

US 2020/0409281 A1    Dec. 31, 2020

(30) Foreign Application Priority Data

Jun. 25, 2019  (JP) .............................. JP2019-117816

(51) Int. Cl.
*G03G 5/00*  (2006.01)
*G03G 5/06*  (2006.01)
(Continued)

(52) U.S. Cl.
CPC ....... *G03G 5/0696* (2013.01); *C09B 67/0026* (2013.01); *G03G 5/047* (2013.01); *G03G 5/0525* (2013.01); *G03G 21/1814* (2013.01)

(58) Field of Classification Search
CPC ..... G03G 5/0696; G03G 5/047; G03G 5/0525
(Continued)

(56) References Cited

U.S. PATENT DOCUMENTS 5,455,135 A    10/1995    Maruyama et al.
5,693,443 A    12/1997    Nakamura et al.
(Continued)

FOREIGN PATENT DOCUMENTS

JP    2000-137340    5/2000
JP    2001-305838    11/2001
(Continued)

OTHER PUBLICATIONS (Umeda, "Generation Process and Kinetics of Extrinsic Photocarriers in Layered Organic Photoreceptors", Journal of the Chemical Society of Japan, No. 11 (1996) 932-37. (Partial English translation).

(Continued)

*Primary Examiner* — Mark A Chapman
(74) *Attorney, Agent, or Firm* — Venable LLP

(57) ABSTRACT

The electrophotographic photosensitive member has: a cylindrical support; a charge generating layer formed on the cylindrical support; and a charge transport layer formed on the charge generating layer, the charge generating layer contains a hydroxygallium phthalocyanine crystal having a particular CuKα characteristic X-ray diffraction peak, a titanyl phthalocyanine crystal having a particular CuKα characteristic X-ray diffraction peak or a chlorogallium phthalocyanine crystal having a particular spectral absorption spectrum as a charge generating material, and in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region satisfies a specific condition.

6 Claims, 9 Drawing Sheets

(51) Int. Cl.
  *G03G 5/047* (2006.01)
  *C09B 67/50* (2006.01)
  *G03G 21/18* (2006.01)
  *G03G 5/05* (2006.01)

(58) Field of Classification Search
  USPC .............................................. 430/59.4, 58.05
  See application file for complete search history.

(56) References Cited

U.S. PATENT DOCUMENTS

| | | |
|---|---|---|
| 5,910,386 A | 6/1999 | Yoshinaga et al. |
| 6,110,628 A | 8/2000 | Sekiya et al. |
| 6,258,498 B1 | 7/2001 | Kawahara et al. |
| 6,296,978 B1 | 10/2001 | Takaya et al. |
| 6,372,397 B1 | 4/2002 | Maruyama et al. |
| 6,436,597 B2 | 8/2002 | Maruyama et al. |
| 6,551,752 B2 | 4/2003 | Takaya et al. |
| 6,623,899 B2 | 9/2003 | Takaya et al. |
| 6,664,014 B1 | 12/2003 | Kikuchi et al. |
| 7,141,341 B2 | 11/2006 | Sekido et al. |
| 7,333,752 B2 | 2/2008 | Kawahara et al. |
| 7,378,205 B2 | 5/2008 | Sekiya et al. |
| 7,551,878 B2 | 6/2009 | Ogaki et al. |
| 7,622,238 B2 | 11/2009 | Uematsu et al. |
| 7,629,102 B2 | 12/2009 | Ochi et al. |
| 7,642,025 B2 | 1/2010 | Tada et al. |
| 7,642,026 B2 | 1/2010 | Tada et al. |
| 7,718,331 B2 | 5/2010 | Uematsu et al. |
| 7,749,667 B2 | 7/2010 | Kawahara et al. |
| 8,088,541 B2 | 1/2012 | Tanaka et al. |
| 8,343,699 B2 | 1/2013 | Nagasaka et al. |
| 8,465,889 B2 | 6/2013 | Sekido et al. |
| 8,524,430 B2 | 9/2013 | Takagi et al. |
| 8,546,050 B2 | 10/2013 | Maruyama et al. |
| 8,632,931 B2 | 1/2014 | Sekido et al. |
| 8,795,936 B2 | 8/2014 | Sekido et al. |
| 8,841,052 B2 | 9/2014 | Watariguchi et al. |
| 9,029,054 B2 | 5/2015 | Okuda et al. |
| 9,063,505 B2 | 6/2015 | Sekiya et al. |
| 9,068,083 B2 | 6/2015 | Tanaka et al. |
| 9,069,267 B2 | 6/2015 | Kaku et al. |
| 9,436,106 B2 | 9/2016 | Kuno et al. |
| 9,459,542 B2 | 10/2016 | Tanaka et al. |
| 9,459,545 B2 | 10/2016 | Tanaka et al. |
| 9,500,966 B2 | 11/2016 | Watariguchi et al. |
| 9,523,929 B2 | 12/2016 | Nakamura et al. |
| 9,535,346 B2 | 1/2017 | Sekiya et al. |
| 9,535,347 B2 | 1/2017 | Watariguchi et al. |
| 9,541,850 B2 | 1/2017 | Nishida et al. |
| 9,563,139 B2 | 2/2017 | Kawahara et al. |
| 9,645,515 B2 | 5/2017 | Kuno et al. |
| 9,645,516 B2 | 5/2017 | Kawahara et al. |
| 9,720,337 B2 | 8/2017 | Nishida et al. |
| 9,760,030 B2 | 9/2017 | Sekiya et al. |
| 9,772,568 B2 | 9/2017 | Sekido et al. |
| 9,811,011 B2 | 11/2017 | Nishi et al. |
| 9,851,648 B2 | 12/2017 | Nishi et al. |
| 9,864,285 B2 | 1/2018 | Nishi et al. |
| 9,869,032 B2 | 1/2018 | Kawahara et al. |
| 9,921,498 B2 | 3/2018 | Sekido et al. |
| 10,372,050 B2 | 8/2019 | Nishi et al. |
| 10,401,746 B2 | 9/2019 | Watariguchi et al. |
| 2008/0096123 A1 | 4/2008 | Shimada et al. |
| 2009/0170023 A1 | 7/2009 | Shimada et al. |
| 2014/0141362 A1 | 5/2014 | Watariguchi et al. |
| 2015/0093693 A1 | 4/2015 | Watariguchi et al. |
| 2015/0185630 A1 | 7/2015 | Ito et al. |
| 2015/0185634 A1 | 7/2015 | Sekiya et al. |
| 2015/0316863 A1 | 11/2015 | Tanaka et al. |
| 2015/0346617 A1 | 12/2015 | Kawahara et al. |
| 2015/0362847 A1 | 12/2015 | Tanaka et al. |
| 2016/0091807 A1 | 3/2016 | Tanaka et al. |
| 2016/0131985 A1 | 5/2016 | Tanaka et al. |
| 2016/0154326 A1 | 6/2016 | Kumoi et al. |
| 2016/0154328 A1 | 6/2016 | Kumoi et al. |
| 2020/0159137 A1 | 5/2020 | Ito et al. |
| 2020/0174385 A1 | 6/2020 | Sakakibara et al. |

FOREIGN PATENT DOCUMENTS

| | | |
|---|---|---|
| JP | 2002-174910 | 6/2002 |
| JP | 2008-076656 | 4/2008 |
| JP | 2008-076657 | 4/2008 |
| JP | 2018-189692 | 11/2018 |

OTHER PUBLICATIONS

U.S. Appl. No. 16/891,525, Shuhei Iwasaki, filed Jun. 3, 2020.
U.S. Appl. No. 16/903,525, Kohei Makisumi, filed Jun. 17, 2020.
U.S. Appl. No. 16/904,700, Michiyo Sekiya, filed Jun. 18, 2020.
U.S. Appl. No. 16/904,705, Tomohito Ishida, filed Jun. 18, 2020.
U.S. Appl. No. 17/065,258, Kohei Makisumi, filed Oct. 7, 2020.
U.S. Appl. No. 17/070,085, Fumiyuki Hiyama, filed Oct. 14, 2020.
U.S. Appl. No. 17/070,179, Kaname Watariguchi, filed Oct. 14, 2020.

ELECTROPHOTOGRAPHIC PHOTOSENSITIVE MEMBER, PROCESS CARTRIDGE AND ELECTROPHOTOGRAPHIC APPARATUS

BACKGROUND OF THE INVENTION

Field of the Invention

The present invention relates to an electrophotographic photosensitive member, and a process cartridge and an electrophotographic apparatus, both of which has the electrophotographic photosensitive member.

Description of the Related Art

In recent years, exposure units mainly used in electrophotographic apparatuses are semiconductor lasers. The laser beam emitted from the light source is usually scanned in the axial direction of a cylindrical electrophotographic photosensitive member (hereinafter, may also be simply referred to as a photosensitive member) by a laser scanning and writing apparatus. The quantity of light irradiated on the photosensitive member is controlled such that it is uniform in the axial direction of the photosensitive member, using an optical system such as a polygon mirror and various electrical correction units.

As the cost of the above polygon mirror has been reduced and the optical system has been downsized due to the improvement of the electrical correction technology and the like, a laser beam printer for personal use using electrophotography has been used, but further cost reduction and downsizing are required these days.

The laser beam used for scanning by the above laser scanning and writing apparatus has a bias in the light quantity distribution with respect to the axial direction of the photosensitive member when the above devising in the optical system or electrical correction is not performed. In particular, due to the scanning of the laser beam with a polygon mirror or the like, there is an area where the quantity of light decreases from the central part of the photosensitive member in the axial direction thereof to the end part. If such a bias in the light quantity distribution is made uniform by controlling through the optical system or electrical correction, it will lead to cost increase and larger size.

In the past, the distribution of exposure potential in the axial direction of the photosensitive member has been made uniform by providing a sensitivity distribution in the axial direction of the photosensitive member such that the above bias in the light quantity distribution is canceled out.

As a method of providing an appropriate sensitivity distribution in the photosensitive member, it is suggested to allow the photosensitive layer in a single layer photosensitive member or the charge transport layer in a stacked photosensitive member to have an appropriate distribution in the electrostatic capacitance thereof. The smaller the electrostatic capacitance, the smaller the amount of charge to be extinguished required to lower the exposure potential to the specified potential, which makes it easier for the exposure potential to fall in relation to the quantity of light and improves sensitivity. As a method of allowing the electrostatic capacitance to have an appropriate distribution, changing the film thickness of the photosensitive layer or charge transport layer is known.

However, if there is a distribution in the electrostatic capacitance in the axial direction of the photosensitive member, the distribution also occurs in phenomena that change due to a change in the electrostatic capacitance of the photosensitive member, such as a fogging phenomenon and a ghosting phenomenon. As a result, there is a problem that it becomes difficult to control these phenomena in the entire electrophotographic system over the entire axial direction of the photosensitive member.

Therefore, as a method of providing an appropriate sensitivity distribution in the photosensitive member, it is effective to allow the charge generating layer in a stacked photosensitive member to have an appropriate distribution in the photoelectric conversion efficiency.

Japanese Patent Application Laid-Open No. 2001-305838 describes a technology of providing a deviation in the film thickness of the charge generating layer that a photosensitive member has through the speed adjustment upon immersion coating, thereby causing a deviation in the deposition amount of a trisazo pigment used as a charge generating material to change the value of the Macbeth concentration. Since the photosensitive member has a deviation in the Macbeth concentration distribution in the axial direction thereof, the quantity of light absorption of the charge generating layer is changed in the axial direction of the photosensitive member, thereby providing an appropriate distribution in the photoelectric conversion efficiency.

Japanese Patent Application Laid-Open No. 2008-076657 describes a technology in which two types of droplet discharge heads are used upon inkjet coating, changing the ratio of the charge generating material to the resin (P/B ratio) in the coating liquid for the charge generating layer discharged from each droplet discharge head, and the scanning conditions for each droplet discharge head are also controlled, thereby increasing the content of a chlorogallium phthalocyanine pigment used as the charge generating material from the central part to both end parts while keeping the film thickness of the charge generating layer constant in the axial direction of the photosensitive member. By keeping the film thickness of the charge generating layer constant and also allowing the content of the charge generating material per unit volume to have an appropriate distribution, the quantity of light absorption of the charge generating layer is changed, thereby allowing the photoelectric conversion efficiency to have an appropriate distribution while suppressing the ghosting phenomenon.

According to an examination of the present inventors, the electrophotographic photosensitive members described in Japanese Patent Application Laid-Open No. 2001-305838 and Japanese Patent Application Laid-Open No. 2008-076657 have problems of unevenness of dark decay in the axial direction of the photosensitive member and occurrence of leakage in the end part, due to the increase in the content of the charge generating material at the end part in the axial direction of the photosensitive member.

Accordingly, an object of the present invention is to provide an electrophotographic photosensitive member with a distribution of sensitivity in the axial direction of the photosensitive member while suppressing uneven dark decay and occurrence of leakage.

SUMMARY OF THE INVENTION

The above object is achieved by the following present invention. That is, one aspect of the present invention provides an electrophotographic photosensitive member, having: a cylindrical support; a charge generating layer formed on the cylindrical support; and a charge transport layer formed on the charge generating layer, wherein the charge generating layer contains a hydroxygallium phthalocyanine crystal as a charge generating material, the hydroxygallium phthalocyanine crystal having strong peaks at Bragg angle 2θ of 7.4°±0.3° and 28.2°±0.3° in CuKα characteristic X-ray diffraction, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ in order from the central part, $d_1<d_2<d_3<d_4<d_5$ is satisfied.

In addition, another aspect of the present invention provides an electrophotographic photosensitive member, having: a cylindrical support; a charge generating layer formed on the cylindrical support; and a charge transport layer formed on the charge generating layer, wherein the charge generating layer contains a titanyl phthalocyanine crystal as a charge generating material, the titanyl phthalocyanine crystal having a strong peak at Bragg angle 2θ of 27.2°±0.3° in CuKα characteristic X-ray diffraction, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ in order from the central part, $d_1<d_2<d_3<d_4<d_5$ is satisfied.

In addition, still another aspect of the present invention provides an electrophotographic photosensitive member, having: a cylindrical support; a charge generating layer formed on the cylindrical support; and a charge transport layer formed on the charge generating layer, wherein the charge generating layer contains a chlorogallium phthalocyanine crystal as a charge generating material, the chlorogallium phthalocyanine crystal has, in the spectral absorption spectrum thereof, at least one peak in each of a wavelength range of 646 nm or more and 668 nm or less and a wavelength range of 782 nm or more and 809 nm or less, and when a peak exhibiting the largest absorbance among peaks present in the wavelength range of 646 nm or more and 668 nm or less is defined as the first peak and a peak exhibiting the largest absorbance among peaks present in the wavelength range of 782 nm or more and 809 nm or less is defined as the second peak, the absorbance of the first peak is greater than the absorbance of the second peak, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ in order from the central part, $d_1<d_2<d_3<d_4<d_5$ is satisfied.

Further features of the present invention will become apparent from the following description of exemplary embodiments with reference to the attached drawings.

DESCRIPTION OF THE EMBODIMENTS

Figure 1:
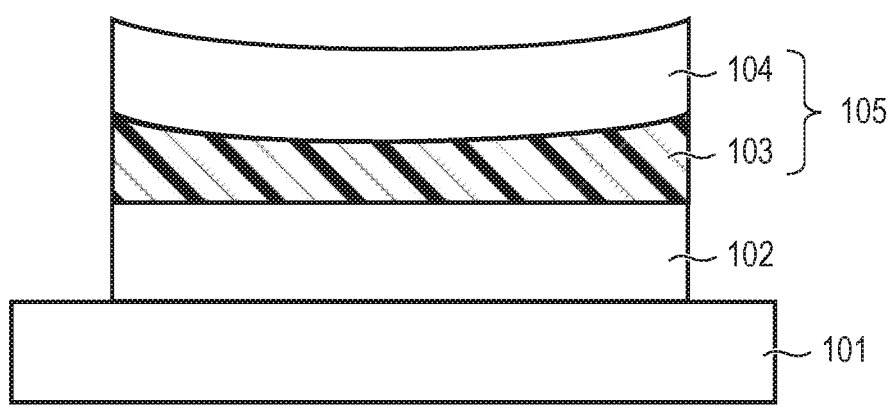
FIG. 1 illustrates one example of a layer configuration of an electrophotographic photosensitive member according to the present invention.

Preferred embodiments of the present invention will now be described in detail in accordance with the accompanying drawings.

Upon an examination by the present inventors, it was found that the change in the photoelectric conversion efficiency upon changing the film thickness of the charge generating layer is small because an azo based pigment that has been used as a charge generating material in the prior art is an interfacial type, the charge generating position of which is located at the interface between the charge generating layer and the charge transport layer (reference: Minoru Umeda, "Generation Process and Kinetics of Extrinsic Photocarriers in Layered Organic Photoreceptors", Journal of the Chemical Society of Japan, 1996, No. 11, pp. 932-937). Therefore, it was found that, when the azo based pigment is used as a charge generating material, it is necessary to increase the deviation in the film thickness of the charge generating layer in order to allow the photosensitive member to have a sensitivity distribution in the axial direction thereof, which results in uneven dark decay and a deviation in the frequency of leakage occurrence, which are attributable to a thermal carrier generated from the charge generating material.

In Japanese Patent Application Laid-Open No. 2001-305838, a trisazo pigment is used as a charge generating material, and therefore, due to the reasons mentioned above, if a deviation in the film thickness of the charge generating layer is provided to achieve a sensitivity ratio of 1.2 times or more between the central part and the end part in the axial direction of the photosensitive member, which is often required in association with the downsizing of laser beam printers in recent years, for example, the adverse effects of uneven dark decay and leakage occurrence become large.

On the other hand, for a particular chlorogallium phthalocyanine pigment, which has also been used as charge generating material in the prior art in addition to the above azo based pigment, the quantum efficiency when used in an electrophotographic photosensitive member is small just like the azo based pigment, and therefore, it is necessary to increase the absolute value of the average content of the charge generating material. Thus, when the content of the charge generating material has a deviation in the axial direction of the photosensitive member, the absolute value of the content in the part with a relatively high content becomes even larger, which leads to uneven dark decay and a deviation in the frequency of leakage occurrence. Phthalocyanine based pigments, in particular, pose a greater risk of leakage upon charging because the dark current increases exponentially with the increase in the content of the charge generating material in the high electric field region where the electric field strength applied to the photosensitive member is 60 V/μm or more. Therefore, in photosensitive members in which a particular chlorogallium phthalocyanine pigment is used and the content of the charge generating material increases from the central part to the end part, leakage is likely to occur at the end part thereof.

In Japanese Patent Application Laid-Open No. 2008-076657, a particular chlorogallium phthalocyanine pigment is used as a charge generating material, and therefore, due to the reasons mentioned above, if a deviation in the content of the charge generating material is provided to achieve a sensitivity ratio of 1.2 times or more between the central part and the end part in the axial direction of the photosensitive member, the adverse effects of uneven dark decay and leakage occurrence still become large.

In order to solve the above technical problems occurring in the prior art, the effect of the difference in the structural formula of the charge generating material or its crystal form on the amount of thermal carrier generation was examined. In addition, how the dependence of the dark decay and leakage occurrence on the film thickness of the charge generating layer is changed according to the difference in the structural formula of the charge generating material or its crystal form was also examined.

As a result of the above examinations, it was found that an electrophotographic photosensitive member, having: a cylindrical support; a charge generating layer formed on the cylindrical support; and a charge transport layer formed on the charge generating layer, wherein the charge generating layer contains a hydroxygallium phthalocyanine crystal as a charge generating material, the hydroxygallium phthalocyanine crystal having strong peaks at Bragg angle 2θ of 7.4°±0.3° and 28.2°±0.3° in CuKα characteristic X-ray diffraction, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ [nm] in order from the central part, $d_1<d_2<d_3<d_4<d_5$ is satisfied can solve uneven dark decay and occurrence of leakage, occurring in the prior art.

In addition, it was found that an electrophotographic photosensitive member, having: a cylindrical support; a charge generating layer formed on the cylindrical support; and a charge transport layer formed on the charge generating layer, wherein the charge generating layer contains a titanyl phthalocyanine crystal as a charge generating material, the titanyl phthalocyanine crystal having a strong peak at Bragg angle 2θ of 27.2°±0.3° in CuKα characteristic X-ray diffraction, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ [nm] in order from the central part, $d_1<d_2<d_3<d_4<d_5$ is satisfied can solve uneven dark decay and occurrence of leakage, occurring in the prior art.

Furthermore, it was found that an electrophotographic photosensitive member, having: a cylindrical support; a charge generating layer formed on the cylindrical support; and a charge transport layer formed on the charge generating layer, wherein the charge generating layer contains a chlorogallium phthalocyanine crystal as a charge generating material, the chlorogallium phthalocyanine crystal has, in the spectral absorption spectrum thereof, at least one peak in each of a wavelength range of 646 nm or more and 668 nm or less and a wavelength range of 782 nm or more and 809 nm or less, and when a peak exhibiting the largest absorbance among peaks present in the wavelength range of 646 nm or more and 668 nm or less is defined as the first peak and a peak exhibiting the largest absorbance among peaks present in the wavelength range of 782 nm or more and 809 nm or less is defined as the second peak, the absorbance of the first peak is greater than the absorbance of the second peak, and wherein, in the charge generating layer, with respect to the film thickness of the charge generating layer, when a region from the central position of an image forming area to the end position of the image forming area is divided in the axial direction of the cylindrical support into five equal regions and the average film thickness of the charge generating layer in each region is defined as $d_1$, $d_2$, $d_3$, $d_4$ and $d_5$ [nm] in order from the central part, $d_1<d_2<d_3<d_4<d_5$ is satisfied can solve uneven dark decay and occurrence of leakage, occurring in the prior art.

When the configuration as described above is adopted, the film thickness of the charge generating layer substantially increases from the central part of the image forming area toward the end part of the image forming area, and as a result of this, the content of the charge generating material substantially increases from the central part of the image forming area toward the end part of the image forming area, and thus, a distribution in the photoelectric conversion efficiency that substantially increases from the central part of the image forming area toward the end part of the image forming area is obtained. Note that "the film thickness of the charge generating layer substantially increases from the central part of the image forming area toward the end part of the image forming area" means that, when a region from the central position of the image forming area to the end position of the image forming area is divided in the axial direction of the photosensitive member into five equal regions and the average film thickness of the charge generating layer in each region is defined as $d_1$, $d_2$, $d_3$, $d_4$ and $d_5$ [nm] in order from the central part, $d_1<d_2<d_3<d_4<d_5$ is satisfied. The same also applies to the substantial increase in the content of the charge generating material and the substantial increase in the photoelectric conversion efficiency.

The present inventors consider the mechanism by which the unevenness of dark decay and the occurrence of leakage are solved by the configuration described above as follows.

Firstly, the dark decay attributable to the charge generating layer is caused by the thermal carrier generated by the charge generating material canceling the charged charge on the surface of the photosensitive member and reducing the surface potential of the photosensitive material. Dark decay increases when the amount of the thermal carrier generated is high. On the other hand, since the thermal carrier is stochastically generated from the charge generating material by thermal excitation, the amount of the thermal carrier is proportional to the amount of the charge generating material. Accordingly, when the content of the azo based pigment used as a charge generating material in the prior art substantially increases from the central part of the image forming area toward the end part of the image forming area, unevenness with increased dark decay from the central part of the image forming area toward the end part of the image forming area is generated.

However, in the case of hydroxygallium phthalocyanine having a particular CuKα characteristic X-ray diffraction peak, titanyl phthalocyanine having a particular CuKα characteristic X-ray diffraction peak or chlorogallium phthalocyanine having a particular spectral absorption spectrum, which is used as a charge generating material in the present invention, they are not an interfacial type like the azo based pigment, which has been used conventionally, and therefore, a change in the photoelectric conversion efficiency is significant when the film thickness of the charge generating layer or the content of the charge generating material is changed. Thus, in the case of the charge generating material used in the present invention, the deviation in the film thickness of the charge generating layer required to allow the photosensitive member to have a sensitivity distribution in the axial direction thereof may be small, and as a result, uneven dark decay and a deviation in the frequency of leakage occurrence in the axial direction of the photosensitive member, which are attributable to the thermal carrier generated from the charge generating material, can be suppressed.

Secondly, leakage attributable to the charge generating layer is caused by a large amount of the thermal carrier generated from the charge generating material flowing into the charge transport layer as a large dark current under the high electric field region during the charging process in the electrophotographic process, thereby causing the dielectric breakdown of the charge transport layer. Phthalocyanine based pigments, in particular, pose a greater risk of leakage upon charging because the dark current increases exponentially with the increase in the content of the charge generating material under the high electric field region of 60 V/μm or more. Accordingly, when the content of the azo based pigment or the particular chlorogallium phthalocyanine pigment, used as a charge generating material in the prior art substantially increases from the central part of the image forming area toward the end part of the image forming area, the frequency of leakage occurrence increases from the central part of the image forming area toward the end part of the image forming area.

However, the charge generating material used in the present invention has higher quantum efficiency when used in an electrophotographic photosensitive member than the conventionally used azo based pigment or particular chlorogallium phthalocyanine pigment. Therefore, in the case of the charge generating material used in the present invention, the absolute value of the average content of the charge generating material required to achieve the sensitivity demanded for the photosensitive member may be small, and as a result, the content of the charge generating material at the end part of the image forming area can be made small and the frequency of leakage occurrence can thus be suppressed.

According to the mechanism as described above, the fact that the charge generating material used in the present invention can reduce the relative difference in the film thickness distribution of the charge generating layer and the fact that it can also reduce the absolute value of the average film thickness of the charge generating layer synergistically exert an effect on each other, and therefore, the effect of the present invention can be achieved.

[Electrophotographic Photosensitive Member]

An electrophotographic photosensitive member of the present invention has a charge generating layer and a charge transport layer. FIG. 1 is a figure illustrating one example of a layer configuration of an electrophotographic photosensitive member 1 according to the present invention. As illustrated in FIG. 1, the electrophotographic photosensitive member 1 has a support 101, an underlayer 102, a charge generating layer 103, a charge transport layer 104 and a stacked photosensitive layer 105. In the present invention, there may be no underlayer 102.

Figure 2:
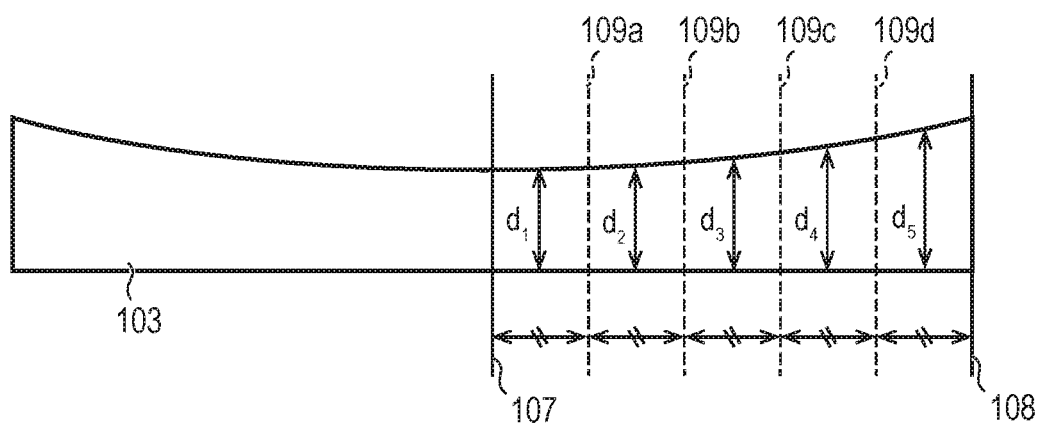
FIG. 2 is a sectional view of an image forming area of a charge generating layer, illustrating division into five equal regions from the central position to the end position.

FIG. 2 is a sectional view of an image forming area of the charge generating layer 103 and is a figure illustrating that the image forming area of the charge generating layer 103 is divided into five equal regions from the central position to the end position. In FIG. 2, 107 is the central position of the image forming area, 108 is the end position of the image forming area, and 109a to 109d are internally divided positions when the region from the central position of the image forming area to the end position of the image forming area is divided into five equal regions. The average film thickness of the charge generating layer in the region sandwiched between 107 and 109a is defined as $d_1$ [nm], the average film thickness of the charge generating layer in the region sandwiched between 109a and 109b is defined as $d_2$ [nm], the average film thickness of the charge generating layer in the region sandwiched between 109b and 109c is defined as $d_3$ [nm], the average film thickness of the charge generating layer in the region sandwiched between 109c and 109d is defined as $d_4$ [nm], and the average film thickness of the charge generating layer in the region sandwiched between 109d and 108 is defined as ids [nm].

Examples of the method of producing the electrophotographic photosensitive member of the present invention include a method in which a coating liquid for each layer, which will be mentioned below, is prepared, applied in the order of the desired layer, and dried. Upon this, examples of the coating method of the coating liquid include immersion coating, spray coating, inkjet coating, roll coating, die coating, blade coating, curtain coating, wire bar coating and ring coating. Among these, immersion coating is preferable from the viewpoint of efficiency and productivity.

In order to form a charge generating layer such that, when a region from the central position of the image forming area to the end position of the image forming area is divided in the axial direction of the photosensitive member into five equal regions and the average film thickness of the charge generating layer in each region is defined as $d_1$, $d_2$, $d_3$, $d_4$ and $d_5$ [nm] in order from the central part, $d_1<d_2<d_3<d_4<d_5$ is satisfied, it is preferable to control the lifting speed of the immersion coating. In this case, for example, the above control can be achieved by setting the lifting speed for each of the 11 points in the axial direction of the photosensitive member and smoothly changing the lifting speed between the two adjacent points during the immersion coating. Upon this, it is not necessary that the interval between the 11 points for which the lifting speed is set is equally divided in the axial direction of the photosensitive member; rather, it is preferable to select the points for which the lifting speed is set such that the difference between the values of the lifting speed is equal from the viewpoint of accurately controlling the film thickness of the charge generating layer.

When the film thickness distribution of the charge generating layer of the present invention is formed by controlling the lifting speed of the immersion coating, in the axial direction of the photosensitive member, sagging due to gravity may occur in a film of the charge generating layer before drying in a region, the state of which is changed from a large lifting speed and a thick film thickness of the charge generating layer to a small lifting speed and a thin film thickness of the charge generating layer. This sagging phenomenon leads to occurrence of unevenness in the film thickness of the charge generating layer in the circumferential direction of the photosensitive member, which poses a problem on the image. In order to solve this problem, it is effective to increase the viscosity of the coating liquid or to make the film thickness before drying thin in order to suppress sagging upon the immersion coating, but since the amount of sagging is inversely proportional to the third power of the film thickness before drying, the latter method is particularly effective. Accordingly, the fact that the charge generating material used in the present invention can make the average film thickness of the charge generating layer thin due to its high quantum efficiency contributes to the improvement in the accuracy for controlling the film thickness upon forming the film thickness distribution of the charge generating layer of the present invention by controlling the lifting speed of the immersion coating. Therefore, the electrophotographic photosensitive member of the present invention is suited for production through controlling the lifting speed of the immersion coating, in that the final image quality is improved.

[Process Cartridge and Electrophotographic Apparatus]

A process cartridge of the present invention integrally supports an electrophotographic photosensitive member and at least one unit selected from the group consisting of a charging unit, a developing unit, a transfer unit and a cleaning unit, and is removably attached to a main body of an electrophotographic apparatus.

Also, an electrophotographic apparatus of the present invention has an electrophotographic photosensitive member, a charging unit, an exposure unit, a developing unit and a transfer unit.

Figure 3:
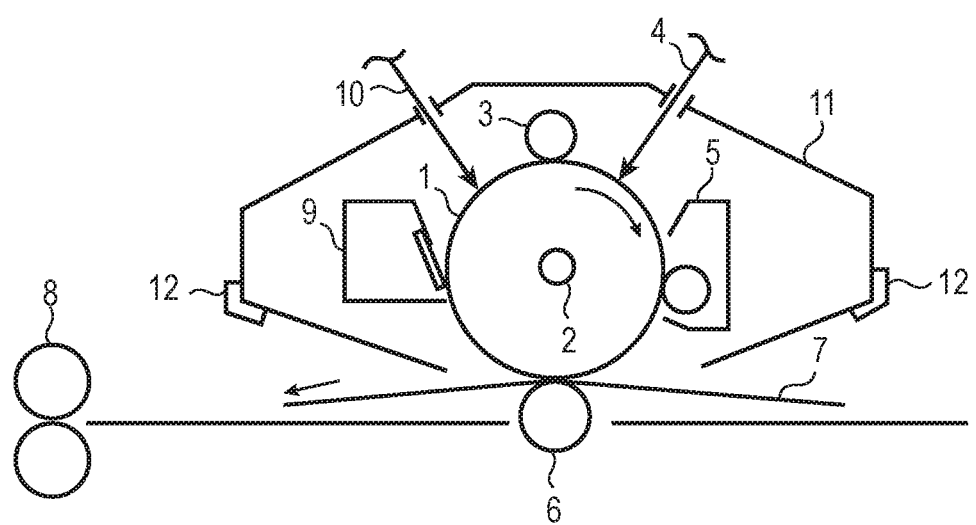
FIG. 3 illustrates one example of a schematic configuration of an electrophotographic apparatus having a process cartridge provided with an electrophotographic photosensitive member of the present invention.

FIG. 3 illustrates one example of a schematic configuration of an electrophotographic apparatus having a process cartridge provided with an electrophotographic photosensitive member.

An electrophotographic photosensitive member 1 is a cylindrical electrophotographic photosensitive member, and is rotationally driven at a predetermined circumferential speed in the direction of the arrow around an axis 2. The surface of the electrophotographic photosensitive member 1 is charged at a predetermined positive or negative potential by a charging unit 3. Note that the figure illustrates a roller charging system using a roller type charging member, but other charging systems such as a corona charging system, a proximity charging system, and an injection charging system may also be adopted. The surface of the charged electrophotographic photosensitive member 1 is irradiated with exposure light 4 from an exposure unit (not shown) to form an electrostatic latent image corresponding to the objective image information. The electrostatic latent image formed on the surface of the electrophotographic photosensitive member 1 is developed with toner accommodated in a developing unit 5, and a toner image is formed on the surface of the electrophotographic photosensitive member 1. The toner image formed on the surface of the electrophotographic photosensitive member 1 is transferred to a transfer material 7 by a transfer unit 6. The transfer material 7 onto which the toner image has been transferred is transported to a fusing unit 8, subjected to a fusing treatment of the toner image, and printed out to the outside of the electrophotographic apparatus. The electrophotographic apparatus may have a cleaning unit 9 for removing deposits such as the toner left on the surface of the electrophotographic photosensitive member 1 after the transfer. Alternatively, without separately providing a cleaning unit, the above deposits may be removed by a developing unit or the like, or by using a so-called cleaner-less system. The electrophotographic apparatus may have a destaticizing mechanism by which the surface of the electrophotographic photosensitive member 1 is subjected to a destaticizing treatment with pre-exposure light 10 from a pre-exposure unit (not shown). In addition, a guiding unit 12, such as a rail, may be provided for attaching and detaching the process cartridge of the present invention to the main body of the electrophotographic apparatus.

The electrophotographic photosensitive member of the present invention can be used for laser beam printers, LED printers, copiers, facsimile machines and multifunctional machines thereof.

Figure 4:
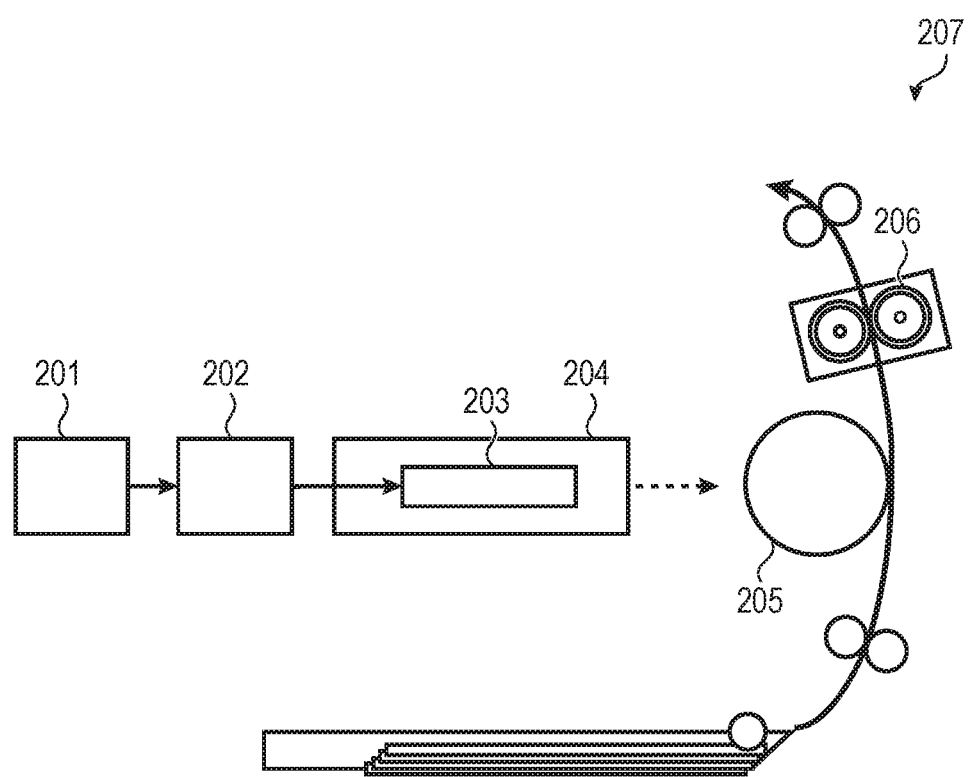
FIG. 4 illustrates one example of a schematic configuration for an exposure unit of an electrophotographic apparatus provided with an electrophotographic photosensitive member of the present invention.

FIG. 4 illustrates one example of a schematic configuration 207 for an exposure unit of an electrophotographic apparatus provided with an electrophotographic photosensitive member of the present invention.

A laser drive section 203 in a laser scanning apparatus 204, which is a laser scanning unit, emits laser scanning light based on an image signal output from an image signal generating section 201 and a control signal output from a controlling section 202. A photosensitive member 205 charged by a charging unit not shown is scanned with laser beam to form an electrostatic latent image on the surface of the photosensitive member 205.

Figure 5:
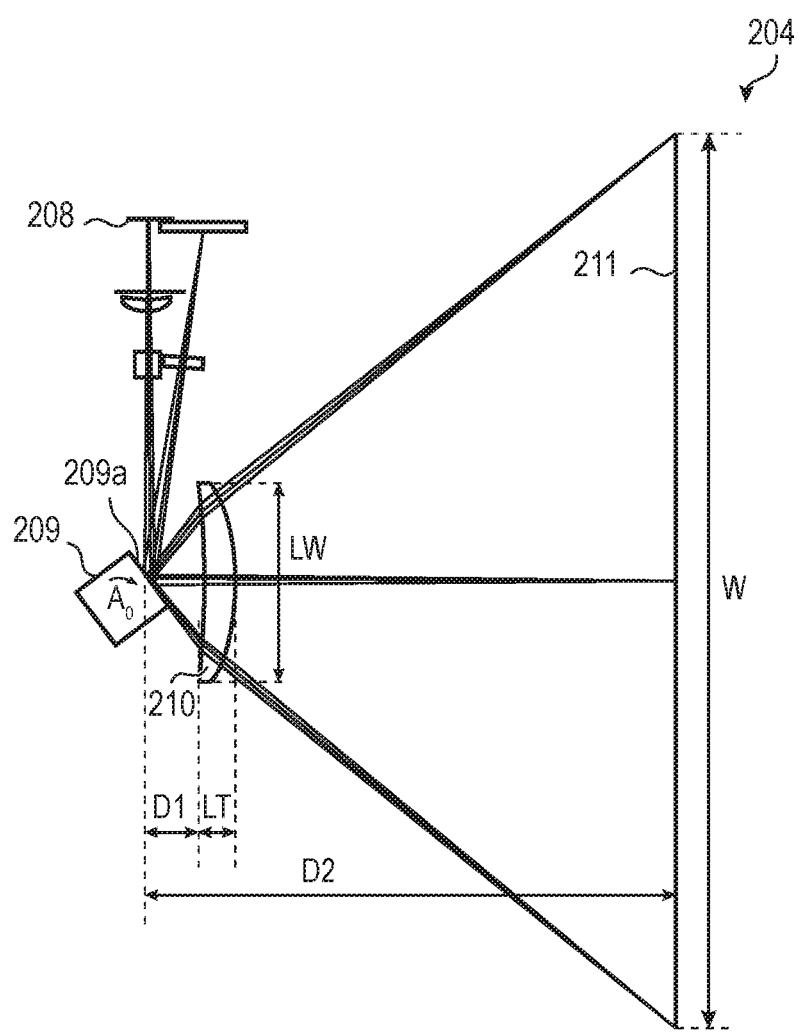
FIG. 5 is a sectional view of a laser scanning apparatus part of an electrophotographic apparatus provided with an electrophotographic photosensitive member of the present invention.

FIG. 5 is a sectional view of the laser scanning apparatus part 204 of an electrophotographic apparatus provided with an electrophotographic photosensitive member of the present invention.

Laser beam (luminous flux) emitted from a laser light source 208 is transmitted through the optical system, is then reflected by a deflection plane (reflection plane) 209a of a polygon mirror (deflector) 209, is transmitted through an imaging lens 210, and enters the surface 211 of the photosensitive member. The imaging lens 210 is an imaging optical element. In the laser scanning apparatus part 204, an imaging optical system is configured with only a single imaging optical element (imaging lens 210). The laser beam transmitted through the imaging lens 210 forms an image on the surface (scanned surface) 211 of the photosensitive member that the laser beam enters, and forms a certain spot-like image (spot). By rotating the polygon mirror 209 at a constant angular speed by a drive section not shown, a spot is moved in the axial direction of the photosensitive member on the scanned surface 211 to form an electrostatic latent image on the scanned surface 211.

The imaging lens 210 does not have a so-called fθ characteristic. In other words, when the polygon mirror 209 is rotated at a constant angular speed, it does not have a scanning characteristic such that a spot of the laser beam transmitted through the imaging lens 210 is moved at a constant speed on the scanned surface 211. As described above, by using the imaging lens 210 that does not have an fθ characteristic, the imaging lens 210 can be placed in close proximity to the polygon mirror 209 (at a position where a distance D1 is small). In addition, the imaging lens 210 that does not have an fθ characteristic can be made smaller than an imaging lens that has an fθ characteristic with respect to a width LW and a thickness LT. From the above, the laser scanning apparatus 204 can be downsized. Moreover, in the case of the lens having an fθ characteristic, there may be a steep change in the shape of the entrance surface and the opposite surface of the lens, and when such a shape constraint is present, a good imaging performance may not be obtained. In contrast, since the imaging lens 210 does not have an fθ characteristic, there are few steep changes in the shape of the entrance surface and the opposite surface of the lens, and a good imaging performance can be obtained.

The scanning characteristic of the imaging lens 210, which is not allowed to have an fθ characteristic for the purpose of downsizing and improvement in the imaging performance, is represented by the following expression (E3):

$$Y = \frac{K}{B}\tan(B\theta) \quad (E3)$$

In the expression (E3), the scanning angle by the polygon mirror 209 is defined as θ, the condensing position of the laser beam (image height) on the scanned surface 211 in the axial direction of the photosensitive member is defined as Y [mm], the imaging coefficient at the on-axis image height is defined as K [mm], and the coefficient (scanning characteristic coefficient) that determines the scanning characteristic of the imaging lens 210 is defined as B. Note that, in the present invention, the on-axis image height refers to an image height on the optical axis (Y=0=$Y_{min}$) and corresponds to the scanning angle θ=0. Also, the off-axis image height refers to an image height (Y≠0) outside the central optical axis (when the scanning angle θ=0), which corresponds to the scanning angle θ≠0. Furthermore, the off-most axis image height refers to an image height when the scanning angle θ is at its maximum (Y=+$Y'_{max}$, −$Y'_{max}$). Note that a scanning width W, which is the width in the axial direction of the photosensitive member in a certain area (scanning area) on the scanned surface 211, on which a latent image can be formed, is represented by W=|+$Y'_{max}$|+ |−$Y'_{max}$|. In other words, the central position of the scanning area is the on-axis image height and the end position is the off-most axis image height. In addition, the scanning area is larger than the image forming area of the photosensitive member of the present invention.

Here, the imaging coefficient K is a coefficient corresponding to f at the scanning characteristic (fθ characteristic) Y=fθ when parallel light enters the imaging lens 210. In other words, the imaging coefficient K is a coefficient for making a proportional relationship between the condensing position Y and the scanning angle θ, similar to the fθ characteristic, when luminous flux other than parallel light enters the imaging lens 210.

To supplement the scanning characteristic coefficient, when B=0, the expression (E3) becomes Y=Kθ, which corresponds to the scanning characteristic Y=fθ of the imaging lens used in a conventional optical scanning apparatus. In addition, when B=1, the expression (E3) becomes Y=K·tan θ, which corresponds to the projection characteristic Y=f·tan θ of a lens used in an imaging apparatus (camera) or the like. In other words, by setting the scanning characteristic coefficient B in the range of 0≤B≤1 in the expression (E3), the scanning characteristic between the projection characteristic Y=f·tan θ and the fθ characteristic Y=fθ can be obtained.

Here, when the expression (E3) is differentiated by the scanning angle θ, the scanning speed of the laser beam on the scanned surface 211 with respect to the scanning angle θ can be obtained as shown in the following expression (E4):

$$\frac{dY}{d\theta} = \frac{K}{\cos^2(B\theta)} \quad (E4)$$

Furthermore, by dividing the expression (E4) by the velocity at the on-axis image height Y/θ=K and taking the reciprocals of both sides, the following expression (E5) can be obtained:

$$\left(\frac{1}{K}\frac{dY}{d\theta}\right)^{-1} = \cos^2(B\theta) \quad (E5)$$

The expression (E5) expresses the proportion of the reciprocal of the scanning speed of each off-axis image height to the reciprocal of the scanning speed of the on-axis image height. Since the total energy of the laser beam is constant regardless of the scanning angle θ, the reciprocal of the scanning speed of the laser beam on the surface 211 of the photosensitive member is proportional to the quantity of laser beam per unit area [µJ/cm²] with which the location of the scanning angle θ is irradiated. Accordingly, the expression (E5) means the proportion of the quantity of laser beam per unit area with which the surface 211 of the photosensitive member is irradiated at the scanning angle θ·0 to the quantity of laser beam per unit area with which the surface 211 of the photosensitive member is irradiated at the scanning angle θ=0. In the laser scanning apparatus 204, when B≠0, the quantity of laser beam per unit area with which the surface 211 of the photosensitive member is irradiated is different for the on-axis image height and the off-axis image height.

When the distribution of laser beam quantity as described above is present in the axial direction of the photosensitive member, the present invention having a sensitivity distribution in the axial direction of the photosensitive member can be suitably used. In other words, the distribution of the electrostatic latent image in the axial direction of the photosensitive member will be uniform if a sensitivity distribution that just cancels out the distribution of the laser beam quantity is realized by the configuration of the present invention. The shape of the sensitivity distribution required upon that time is represented by the following expression (E6), which is the reciprocal of the above expression (E5):

$$\frac{1}{K}\frac{dY}{d\theta} = \frac{1}{\cos^2(B\theta)} \quad (E6)$$

When the scanning angle corresponding to the end position of the image forming area of the photosensitive member is defined as θ=$θ_{max}$, the value of the expression (E6) at θ=$θ_{max}$ means the proportion of the photoelectric conversion efficiency at the end position of the image forming area to the central position of the image forming area, that is, the sensitivity ratio r, which is required for the photosensitive member when the laser scanning apparatus mentioned above and the photosensitive member of the present invention are combined. When this r is specified, the geometrical feature of the laser scanning apparatus $\theta_{max}$ and the optical system feature B that are permissible for forming a uniform electrostatic latent image in the axial direction of the photosensitive member in the image forming area are determined. Specifically, when the condition of the following expression (E7) is satisfied, a uniform electrostatic latent image can be formed in the axial direction of the photosensitive member in the image forming area of the photosensitive member of the present invention:

$$r = \frac{1}{\cos^2(B\theta_{max})} \quad (E7)$$

Solving the above expression (E7) for $\theta_{max}$, the following expression (E8) is obtained.

$$\theta_{max} = \frac{1}{B}\arccos\sqrt{r} \quad (E8)$$

Figure 6:
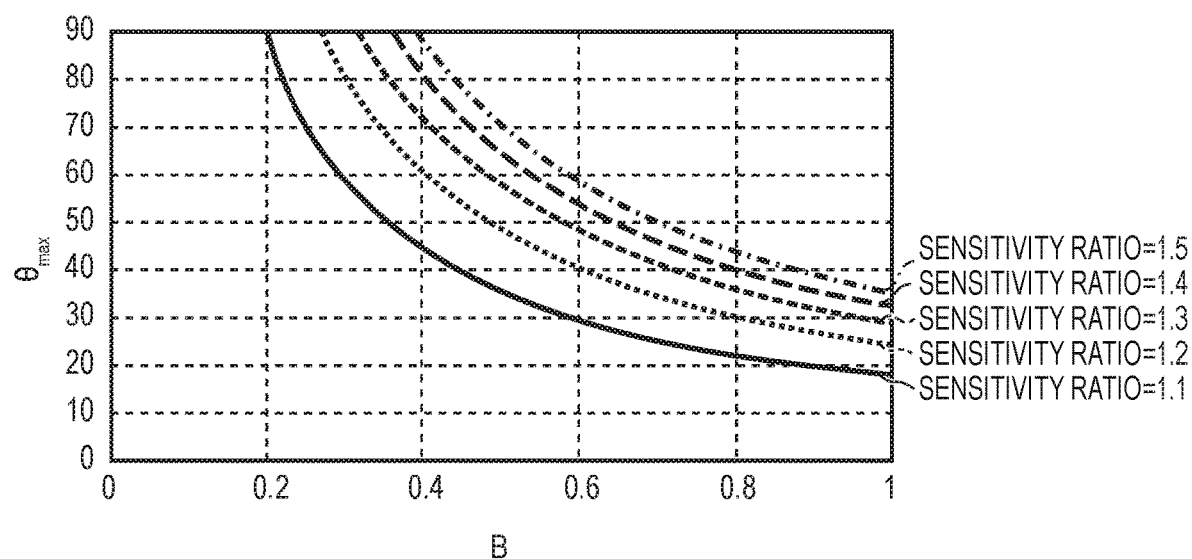
FIG. 6 is a graph showing the geometrical feature of a laser scanning apparatus Amax and the optical system feature B, which satisfy the condition by which a uniform electrostatic latent image can be formed in the axial direction of a photosensitive member in an image forming area of the photosensitive member of the present invention.

FIG. 6 illustrates the expression (E8) made into a graph. As can be seen from FIG. 6, when, for example, a photosensitive drum of the present invention with r=1.2 is combined with an imaging lens 210 with a scanning characteristic coefficient B=0.5, by designing the laser scanning apparatus 204 such that $\theta_{max}$=48°, the electrostatic latent image can be made uniform in the image forming area of the photosensitive member. On the other hand, when, for example, a photosensitive drum of the present invention with r=1.1 is combined with an imaging lens 210 with a scanning characteristic coefficient B=0.5, even if the laser scanning apparatus part 204 is designed such that $\theta_{max}$=48°, unevenness in the electrostatic latent image will partially occur in the image forming area of the photosensitive member. Upon this, $\theta_{max}$=35° is necessary to make the electrostatic latent image uniform, but this value is smaller than $\theta_{max}$=48°. The larger the $\theta_{max}$, the shorter the optical path length D2 from the deflection plane 209a to the surface 211 of the photosensitive member shown in FIG. 5, and therefore, the laser scanning apparatus 204 can be downsized. Accordingly, when the sensitivity ratio r between the central position of the image forming area and the end position of the image forming area in the axial direction of the photosensitive member is made larger, the laser beam printer can be downsized upon using the photosensitive drum of the present invention.

<Support>

In the present invention, the electrophotographic photosensitive member has a support. In the present invention, the support is preferably a conductive support having electrical conductivity. In addition, the shape of the support needs to be cylindrical. Also, the surface of the support may be subjected to an electrochemical treatment such as anodic oxidation, a blasting treatment, a cutting treatment or the like.

The material of the support is preferably metal, resin, glass or the like.

Examples of the metal include aluminum, iron, nickel, copper, gold, stainless steel and alloys thereof. Among other things, the support is preferably a support made of aluminum, using aluminum.

In addition, for the resin or glass, electrical conductivity may be imparted through a treatment of mixing a conductive material thereinto or covering them with a conductive material.

<Conductive Layer>

In the present invention, it is preferable to provide a conductive layer on the support. By providing a conductive layer, not only scratches or unevenness on the surface of the support can be concealed, but also, by controlling the reflection of light on the surface of the support, the transmittance when the exposure laser, which has entered the photosensitive member and passed through the charge generating layer of the present invention, is reflected and enters the charge generating layer again can be reduced. As such, compared with the case where no conductive layer is provided, the light absorption rate for the incident exposure laser in the charge generating layer improves and the average film thickness of the charge generating layer of the present invention can be made thinner, and the present invention can thus be used more effectively.

It is preferable that the conductive layer should contain a conductive particle and a resin.

Examples of the material of the conductive particle include metal oxide, metal and carbon black. Examples of the metal oxide include zinc oxide, aluminum oxide, indium oxide, silicon oxide, zirconium oxide, tin oxide, titanium oxide, magnesium oxide, antimony oxide and bismuth oxide. Examples of the metal include aluminum, nickel, iron, nichrome, copper, zinc and silver.

Among these, it is preferable to use a metal oxide as the conductive particle.

When a metal oxide is used as the conductive particle, the surface of the metal oxide may be treated with a silane coupling agent or the like, or the metal oxide may be doped with an element or an oxide thereof. Examples of the element and an oxide thereof to be doped include phosphorus, aluminum, niobium and tantalum.

Also, the conductive particle may have a laminated structure with a core particle and an enveloping layer covering the particle. Examples of the core particle include titanium oxide, barium sulfate and zinc oxide. Examples of the enveloping layer include a metal oxide such as tin oxide and titanium oxide.

Examples of the resin include a polyester resin, a polycarbonate resin, a polyvinyl acetal resin, an acrylic resin, a silicone resin, an epoxy resin, a melamine resin, a polyurethane resin, a phenolic resin and an alkyd resin.

In addition, the conductive layer may further contain a silicone oil, a resin particle, a concealing agent such as titanium oxide.

From the viewpoint of more effectively obtaining a sensitivity distribution in the axial direction of the photosensitive member of the present invention, it is preferable that the film thickness of the above conductive layer should be greater than 10 µm, that the conductive layer should contain a binder resin and a metal oxide fine particle, and that the average particle diameter of the metal oxide fine particle should be 100 nm or more and 400 nm or less. When the average particle diameter of the metal oxide fine particle is 100 nm or more and 400 nm or less, laser in the sub-micron wavelength range that has been used as the exposure light source for electrophotographic apparatuses in recent years is scattered well. Also, if the film thickness of the conductive layer is larger than 10 µm, since the laser beam incident on the photosensitive member passes through the conductive layer, is reflected by the cylindrical support, and then passes through the conductive layer again to reach the charge generating layer, it will run over a distance of 20 μm or more before reaching the charge generating layer. This distance is 20 or more times the wavelength of the exposure laser used, and the laser beam traveling over such a distance while being scattered loses its coherency sufficiently. Therefore, the transmittance for the charge generating layer of the laser beam that has been reflected and entered the charge generating layer again becomes low and is well absorbed at the charge generating layer, and the sensitivity of the photosensitive member substantially improves. According to the above mechanism, the sensitivity distribution of the present invention can be effectively obtained even when the film thickness of the charge generating layer is thin by using the configuration of the conductive layer mentioned above.

In addition, from the viewpoint of, while effectively obtaining the sensitivity distribution of the present invention as described above, further improving the image quality when using the electrophotographic photosensitive member of the present invention at the same time, it is more preferable that the metal oxide fine particle contained in the above conductive layer should have a core material containing titanium oxide and an enveloping layer covering the core material and containing titanium oxide in which niobium or tantalum is doped. Titanium oxide has a higher refractive index compared to tin oxide, which is often used as an enveloping layer. Accordingly, when the core material and the enveloping layer of the metal oxide fine particle both contain titanium oxide, the penetration of the exposure laser incident on the photosensitive member into the conductive layer after passing through the charge generating layer is suppressed, and the exposure laser is likely to be reflected or scattered near the interface on the charge generating layer side of the conductive layer. It is considered that the farther the position where the laser is scattered in the conductive layer is from the interface on the charge generating layer side of the conductive layer, the substantially wider the range where the charge generating layer is irradiated with the exposure laser, the lower the minuteness of the latent image and, consequently, the lower the minuteness of the output image. By combining the conductive layer having the above configuration with the charge generating layer of the present invention, a substantial increase in the sensitivity of the photosensitive member due to the scattering of the exposure laser and the prevention of a substantial expansion of the range where the charge generating layer is irradiated with the exposure laser can both be achieved, and the image quality can further improve through the improvement in the minuteness of the output image.

The conductive layer can be formed by preparing a coating liquid for the conductive layer that contains each of the above materials and a solvent, forming a coating film therefrom, and drying it. Examples of the solvent used for the coating liquid include an alcohol based solvent, a sulfoxide based solvent, a ketone based solvent, an ether based solvent, an ester based solvent and an aromatic hydrocarbon based solvent. Examples of the dispersion method of dispersing the conductive particle in the coating liquid for the conductive layer include a method using a paint shaker, a sand mill, a ball mill or a liquid collision type high speed disperser.

The average diameter of the metal oxide fine particle in the present invention was determined as follows. That is, particles to be measured were observed by using a scanning electron microscope S-4800 manufactured by Hitachi, Ltd; the particle diameter for each of the 100 individual particles was measured from the image obtained through the observation; and the arithmetic mean thereof was calculated to determine the average diameter (average primary particle diameter). The individual particle diameter was defined as (a+b)/2, where the longest side of the primary particle is a and the shortest side is b. Note that, for a needle-like titanium oxide particle or a flake-like titanium oxide particle, the average particle diameter was calculated for each of the major and minor axis diameters.

<Underlayer>

In the present invention, an underlayer may be provided on the support or the conductive layer. By providing an underlayer, the adhesion function between the layers can be enhanced and the charge injection prevention function can be imparted.

It is preferable that the underlayer should contain a resin. Alternatively, the underlayer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenolic resin, a polyvinyl phenol resin, an alkyd resin, a polyvinyl alcohol resin, a polyethylene oxide resin, a polypropylene oxide resin, a polyamide resin, a polyamide acid resin, a polyimide resin, a polyamide-imide resin and a cellulose resin.

Examples of the polymerizable functional group that the monomer having a polymerizable functional group has include an isocyanate group, a block isocyanate group, a methylol group, an alkylated methylol group, an epoxy group, a metal alkoxide group, a hydroxyl group, an amino group, a carboxyl group, a thiol group, a carboxylic anhydride group and a carbon-carbon double bond group.

In addition, the underlayer may further contain an electron transport substance, a metal oxide, a metal, a conductive polymer or the like for the purpose of enhancing the electrical characteristic. Among these, it is preferable to use an electron transport substance or a metal oxide.

Examples of the electron transport substance include a quinone compound, an imide compound, a benzimidazole compound, a cyclopentadienylidene compound, a fluorenone compound, a xanthone compound, a benzophenone compound, a cyanovinyl compound, an aryl halide compound, a silol compound and a boron containing compound. The underlayer may be formed as a cured film by using an electron transport substance having a polymerizable functional group as the electron transport substance and copolymerizing it with a monomer having a polymerizable functional group as mentioned above.

Examples of the metal oxide include indium tin oxide, tin oxide, indium oxide, titanium oxide, zinc oxide, aluminum oxide and silicon dioxide. Examples of the metal include gold, silver and aluminum.

In addition, the underlayer may further contain an additive.

The average film thickness of the underlayer is preferably 0.1 μm or more and 50 μm or less, more preferably 0.2 μm or more and 40 μm or less, and particularly preferably 0.3 μm or more and 30 μm or less.

The underlayer can be formed by preparing a coating liquid for the underlayer that contains each of the above materials and a solvent, forming a coating film therefrom, and drying and/or curing it. Examples of the solvent used for the coating liquid include an alcohol based solvent, a ketone based solvent, an ether based solvent, an ester based solvent and an aromatic hydrocarbon based solvent.

<Photosensitive Layer>

A photosensitive layer of the electrophotographic photosensitive member of the present invention is a stacked photosensitive layer having a charge generating layer containing a charge generating material and a charge transport layer containing a charge transport material.

(1) Stacked Photosensitive Layer

The stacked photosensitive layer has a charge generating layer and a charge transport layer.

(1-1) Charge Generating Layer

It is preferable that the charge generating layer should contain a charge generating material and a resin.

In the present invention, the above charge generating layer contains, as a charge generating material: a hydroxygallium phthalocyanine crystal having strong peaks at Bragg angle 2θ of 7.4°±0.3° and 28.2°±0.3° in CuKα characteristic X-ray diffraction, which is described in Japanese Patent Application Laid-Open No. 2000-137340; a titanyl phthalocyanine crystal having a strong peak at Bragg angle 2θ of 27.2°±0.3° in CuKα characteristic X-ray diffraction, which is described in Japanese Patent Application Laid-Open No. 2000-137340; or a chlorogallium phthalocyanine crystal having, in the spectral absorption spectrum thereof, at least one peak in each of a wavelength range of 646 nm or more and 668 nm or less and a wavelength range of 782 nm or more and 809 nm or less, wherein, when a peak exhibiting the largest absorbance among peaks present in the wavelength range of 646 nm or more and 668 nm or less is defined as the first peak and a peak exhibiting the largest absorbance among peaks present in the wavelength range of 782 nm or more and 809 nm or less is defined as the second peak, the absorbance of the first peak is greater than the absorbance of the second peak, which is described in U.S. Pat. No. 9,720,337. Among these, from the viewpoint of enhancing the effect of the present invention, a hydroxygallium phthalocyanine crystal containing 0.4% by mass or more and 3.0% by mass or less of a compound having a structure represented by the following formula (A1) in the crystal, which is described in Examples of Japanese Patent Application Laid-Open No. 2018-189692 is preferable:

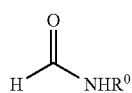

(A1)

(In the above formula (A1), $R^0$ represents a methyl group, a propyl group or a vinyl group.)

The above-mentioned hydroxygallium phthalocyanine crystal containing 0.4% by mass or more and 3.0% by mass or less of a compound having a structure represented by the above formula (A1) in the crystal is suited for use as the charge generating material of the present invention because the sensitivity is high and also the dark decay is small when used as a charge generating material of an electrophotographic photosensitive member. In addition to that, in the above hydroxygallium phthalocyanine crystal, the size of the crystal particles almost matches with the size of the film thickness of the charge generating layer due to the reasons described in Japanese Patent Application Laid-Open No. 2018-189692. As such, both quantum efficiency determined by the Onsager equation and light absorption rate determined by the Lambert-Beer equation, described in Japanese Patent Application Laid-Open No. 2018-189692, can be achieved at high values. The sensitivity as a photosensitive member that can be controlled by the charge generating layer is mainly determined by these two factors, quantum efficiency and light absorption rate, and the sensitivity distribution in the axial direction of the photosensitive member of the present invention is achieved by allowing the light absorption rate to have a distribution according to the Lambert-Beer equation. Accordingly, the feature of the above hydroxygallium phthalocyanine crystal, whose crystal particles are aligned in size, itself also works effectively in the present invention.

The content of the charge generating material in the charge generating layer is preferably 40% by mass or more and 85% by mass or less, and is more preferably 60% by mass or more and 80% by mass or less based on the entire mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenolic resin, a polyvinyl alcohol resin, a cellulose resin, a polystyrene resin, a polyvinyl acetate resin and a polyvinyl chloride resin. Among these, a polyvinyl butyral resin is more preferable.

In addition, the charge generating layer may further contain an additive such as an antioxidant and an ultraviolet light absorber. Specific examples thereof include a hindered phenol compound, a hindered amine compound, a sulfur compound, a phosphorus compound and a benzophenone compound.

The film thickness distribution of the charge generating layer of the present invention was measured as follows.

Firstly, a region from the central position of the image forming area to the end position of the image forming area is divided in the axial direction of the cylindrical electrophotographic photosensitive member of the present invention into five equal regions. Next, each region was further divided into four equal sections in the axial direction and eight equal sections in the circumferential direction, and the film thickness of the charge generating layer was measured at these 32 measurement points. The average thereof was, as the average film thickness of the charge generating layer in each region, defined as $d_1$, $d_2$, $d_3$, $d_4$ and $d_5$ [nm] in order from the central part toward the end part.

Note that the central position of the image forming area in the present invention means the position in the axial direction where the image height Y in the above expression (E3) is Y=0. This position may be shifted in the axial direction up to 10% of the axial length of the image forming area with respect to the central position where the image forming area is divided into two equal sections in the axial direction of the photosensitive member.

In the above film thickness distribution of the charge generating layer, when the absorption coefficient of the charge generating layer is defined as $\beta$ [$nm^{-1}$], it is preferable that the film thickness $d_0$ of the charge generating layer at the central position of the image forming area and the film thickness $d_6$ of the charge generating layer at the end position of the image forming area should satisfy the following expression (E1):

$$\frac{1-e^{-2\beta d_6}}{1-e^{-2\beta d_0}} \geq 1.2 \qquad (E1)$$

The absorption coefficient β here is defined according to the Lambert-Beer law represented by the following expression (E9):

$$\frac{I}{I_0} = 1 - e^{-\beta d} \tag{E9}$$

(Provided that $I_0$ is the total energy of the light incident on a film with a film thickness of d [nm], and I is the energy of the light absorbed by the film with a film thickness of d [nm]. In addition, considering regions having a width of $Y_{max}/20$ [mm] in the axial direction and one circumferential perimeter centered on each of the points at the central position of the image forming area and at the end position of the image forming area, each of these regions is divided into four equal sections in the axial direction and eight equal sections in the circumferential direction, and the film thickness of the charge generating layer is measured at these 32 measurement points. $d_0$ and $d_6$ are defined as the average thereof, respectively.)

As is obvious from the expression (E9), the left side numerator and the left side denominator of the above expression (E1) represent the light absorption rate at the end part in the axial direction of the photosensitive member and the light absorption rate at the central part in the axial direction of the photosensitive member, respectively. Accordingly, the above expression (E1) means that the light absorption rate at the end position is 1.2 or more times that of the central position. In this way, a difference in the sensitivity of at least 1.2 times can be provided in the image forming area in the axial direction of the photosensitive member, and therefore, a realistic deviation in the light quantity caused by downsizing of the optical system in the laser scanning system of an electrophotographic apparatus can be flexibly coped with. Also, the reason why a factor 2 is placed on the shoulder of the exponent in the above expression (E1) is that the exposure laser, which has passed through the charge generating layer, is reflected on the side of the photosensitive member support and passes through the charge generating layer again.

Furthermore, when the distance from the central position of the image forming area in the axial direction of the photosensitive member is defined as Y [mm], the value of Y at the end position of the image forming area is defined as $Y=Y_{max}$ [nm] and the difference between d6 and d0 is defined as $\Delta=d_6-d_0$, it is more preferable that the above film thickness distribution of the charge generating layer for all Y, where $0 \le Y \le Y_{max}$, should be between $d-0.2\Delta$ and $d+0.2\Delta$ with respect to d(Y) calculated with the following expression (E2):

$$d(Y) = d_0 + \Delta(1-\beta\Delta)\frac{Y^2}{Y_{max}^2} + \beta\Delta^2\frac{Y^4}{Y_{max}^4} \tag{E2}$$

(Provided that Y is the same as the above-mentioned image height Y, and $Y_{max}$ is smaller than the above-mentioned off-most axis image height $Y'_{max}$.)

The film thickness of the charge generating layer for all Y, where $0 \le Y \le Y_{max}$, is measured as follows. In other words, considering a region with a width of $Y_{max}/20$ [mm] in the axial direction and one circumferential perimeter centered on a point where the distance from the central position of the image forming area in the axial direction of the photosensitive member is Y [mm], that region is divided into four equal sections in the axial direction and eight equal sections in the circumferential direction, and the film thickness of the charge generating layer is measured at these 32 measurement points. d(Y) is defined as the average thereof.

The present inventors have found that, by forming a charge generating layer having a film thickness distribution represented by a quartic function such as the above expression (E2), the light quantity distribution in the axial direction of the photosensitive member when scanned with an exposure laser by an optical system having the characteristic represented by the following expression (E3) can be appropriately canceled out and the distribution of exposure potential in the axial direction of the photosensitive member can be made uniform at a higher level. In the following, a mechanism therefor will be described.

As mentioned above, in order to make the distribution of exposure potential uniform for an optical system having the characteristic represented by the following expression (E3):

$$Y = \frac{K}{B}\tan(B\theta) \tag{E3}$$

the photosensitive member may have the shape of a sensitivity distribution represented by the following expression (E6):

$$\frac{1}{K}\frac{dY}{d\theta} = \frac{1}{\cos^2(B\theta)} \tag{E6}$$

In the present invention, the sensitivity is determined by the photoelectric conversion efficiency calculated by the Lambert-Beer law from the film thickness of the charge generating layer. Therefore, when the left side of the above expression (E1), where $d_5$ is changed to the film thickness d(Y) of the charge generating layer at arbitrary Y ($0 \le Y \le Y_{max}$), is equal to the right side of the above expression (E6), that is, when the following formula (E10) is satisfied, the distribution of exposure potential becomes uniform:

$$\frac{1-e^{-2\beta d(Y)}}{1-e^{-2\beta d_0}} = \frac{1}{\cos^2(B\theta)} \tag{E10}$$

By using a formula of the trigonometric function $1+\tan^2(x) = 1/\cos^2(x)$ and substituting the expression (E3) thereinto, the above expression (E10) can be transformed into the following expression (E11):

$$\frac{1-e^{-2\beta d(Y)}}{1-e^{-2\beta d_0}} = 1 + \frac{B^2}{K^2}Y^2 \tag{E11}$$

Here, by substituting $Y=Y_{max}$ and $d(Y)=d_6$ into the above expression (E11), the following expression (E12) can be obtained:

$$\frac{B^2}{K^2} = \left(\frac{1-e^{-2\beta d_6}}{1-e^{-2\beta d_0}} - 1\right)\frac{1}{Y_{max}^2} \tag{E12}$$

By substituting the above expression (E12) into the above expression (E11) and solving it for d(Y), the following expression (E13) can be obtained:

$$d(Y) = d_0 - \frac{1}{2\beta}\ln\left[1 - (1 - e^{-2\beta\Delta})\frac{Y^2}{Y_{max}^2}\right] \quad (E13)$$

(Provided that $\Delta = d_6 - d_0$ is defined, as mentioned above. Also, $\ln(\bullet)$ represents the natural logarithmic function.)

The film thickness distribution d(Y) of the charge generating layer represented by the above expression (E13) is the exact solution of the film thickness distribution required to make the distribution of exposure potential in the axial direction of the photosensitive member uniform at a higher level in the present invention.

The present inventors further considered expressing the above expression (E13) as an approximation that is established for the case where $Y^2/Y_{max}^2$ and $2\beta\Delta$ are small. By doing so, the shape of the film thickness distribution of the charge generating layer suitable for the present invention becomes clearer, and it also becomes easier to actually form the film thickness distribution by immersion coating. Specifically, by using the Maclaurin expansion of $\ln(1-x)$ and the above expression (E13) is transformed into the following expression (E14):

$$d(Y) = d_0 + \frac{1}{2\beta}\sum_{n=1}^{\infty}\frac{1}{n}\left[-\frac{Y^2}{Y_{max}^2}\sum_{m=1}^{\infty}\frac{(-2\beta\Delta)^m}{m!}\right]^n \quad (E14)$$

and by leaving $(Y^2/Y_{max}^2)$ second order and $2\beta\Delta$ second order, the following expression (E2) representing a final film thickness distribution of the charge generating layer can be obtained.

$$d(Y) = d_0 + \Delta(1 - \beta\Delta)\frac{Y^2}{Y_{max}^2} + \beta\Delta^2\frac{Y^4}{Y_{max}^4} \quad (E2)$$

Figure 7:
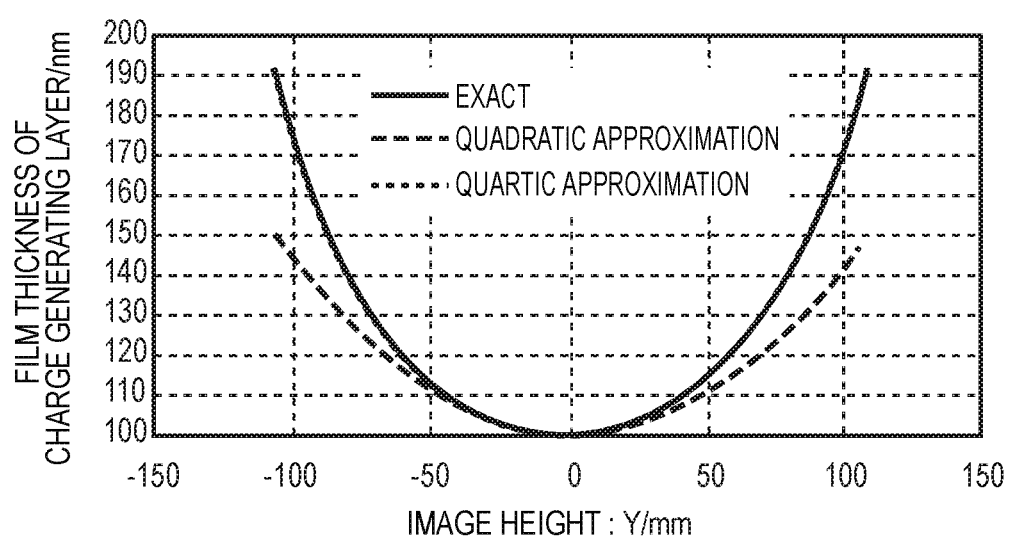
FIG. 7 is a graph showing the film thickness distribution d(Y) of a charge generating layer of the present invention.
Figure 8:
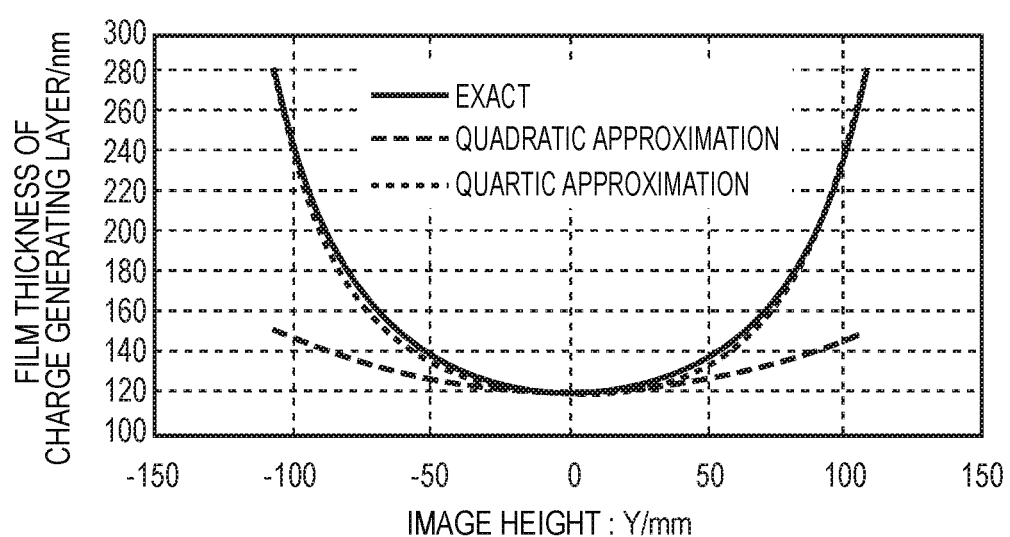
FIG. 8 is a graph showing the film thickness distribution d(Y) of a charge generating layer of the present invention.

FIG. 7 shows the film thickness distribution d(Y) of the charge generating layer calculated from three expressions: the above expression (E13); the above expression (E2); and an expression obtained by ignoring the third term in the right side of the above expression (E2) as the exact solution, the quartic approximation and the quadratic approximation, respectively, under the condition where the required sensitivity ratio represented by the above expression (E7) is $r=1.35$, the absorption coefficient is $\beta=0.00495$, $d_0=100$ and $Y_{max}=108$. As can be seen from the figure, the quartic approximation is consistent with the exact solution, but the quadratic approximation deviates greatly from the exact solution. Note that the value of $Y_{max}=108$ [nm] is half the length of the short side of the letter size, which is the dimension of the paper. In addition, FIG. 8 shows the film thickness distribution d(Y) calculated under the condition where the required sensitivity ratio is $r=1.35$, the absorption coefficient is $\beta=0.00495$ and $d_0=120$. In this case as well, the variance of the quartic approximation from the exact solution is slight, indicating that the above expression (E14) is effective for actual physical property values as an expression for representing the film thickness distribution d(Y) of the charge generating layer of the present invention.

The charge generating layer can be formed by preparing a coating liquid for the charge generating layer that contains each of the above materials and a solvent, forming a coating film therefrom, and drying it. Examples of the solvent used for the coating liquid include an alcohol based solvent, a sulfoxide based solvent, a ketone based solvent, an ether based solvent, an ester based solvent and an aromatic hydrocarbon based solvent.

Whether the above hydroxygallium phthalocyanine pigment contained the amide compound represented by the above formula (A1) in the crystal particle was determined by analyzing the data of $^1$H-NMR measurement for the obtained hydroxygallium phthalocyanine pigment. In addition, by performing data analysis for the results of the $^1$H-NMR measurement, the content of the amide compound represented by the above formula (A1) in the crystal particle was determined. For example, when a milling treatment with a solvent that is capable of dissolving the amide compound represented by the above formula (A1), or a washing process after the milling is carried out, the hydroxygallium phthalocyanine pigment thus obtained is subjected to $^1$H-NMR measurement. When the amide compound represented by the above formula (A1) is detected, it can be considered that the amide compound represented by the above formula (A1) is contained in the crystal.

In order to determine the film thickness of the charge generating layer from the state of the electrophotographic photosensitive member, the charge generating layer of the electrophotographic photosensitive member may be taken out using the FIB method, and Slice & View of the FIB-SEM may be carried out. The film thickness of the charge generating layer can be obtained from a cross-sectional SEM observation image taken by Slice & View of the FIB-SEM. Alternatively, the film thickness may also be determined more conveniently through a method using the average specific gravity and weight of the charge generating layer. Further conveniently, a method may also be used in which a calibration curve of the Macbeth concentration of the electrophotographic photosensitive member and the film thickness of the charge generating layer is acquired in advance and the Macbeth concentration at each point of the photosensitive member is measured and converted to the film thickness.

In the present invention, the film thickness distribution of the charge generating layer was measured precisely and conveniently by acquiring a calibration curve from the value of the Macbeth concentration measured by pressing a spectral densitometer (trade name: X-Rite 504/508, manufactured by X-Rite Inc.) against the surface of the photosensitive member and the measurement of the film thickness obtained through the above cross-sectional SEM image observation, and converting the value of the Macbeth concentration at each point of the photosensitive member by using the calibration curve.

In the present invention, the absorption coefficient $\beta$ for each charge generating material was determined as follows. Firstly, the electrophotographic photosensitive member is processed so that the charge generating layer appears on the surface. For example, the layer above the charge generating layer may be exfoliated using a solvent or the like. Then, the light reflectivity in that state is measured. Subsequently, the charge generating layer is also exfoliated in the same manner, and the light reflectivity is measured for the state in which the layer below the charge generating layer appears on the surface. By using the two reflectivities thus obtained, the light absorption rate of the charge generating layer alone is calculated. In the meantime, the film thickness of the charge generating layer is determined through the method mentioned above. By connecting with a straight line between a data with the natural logarithm value of the light absorption rate and the film thickness obtained by the above method and a point with a natural logarithm value of 0 at the light absorption rate 100% and a film thickness of 0, the absorption coefficient can be obtained from the slope of the line.

The powder X-ray diffraction measurement and $^1$H-NMR measurement of the phthalocyanine pigment contained in the electrophotographic photosensitive member of the present invention are performed under the following conditions.

(Powder X-Ray Diffraction Measurement)
Measuring machine used: an X-ray diffractometer RINT-TTRII manufactured by Rigaku Corporation
X-ray bulb tube: Cu
X-ray wavelength: Kα1
Tube voltage: 50 KV
Tube current: 300 mA
Scanning method: 2θ scanning
Scanning speed: 4.0°/min
Sampling interval: 0.02°
Starting angle 2δ: 5.0°
Stopping angle 2θ: 35.0°
Goniometer: Rotor horizontal goniometer (TTR-2)
Attachment: capillary rotary sample holder
Filter: none
Detector: scintillation counter
Incident monochrome: use
Slit: variable slit (parallel beam method)
Counter monochromator: not used
Divergence slit: open
Divergence vertical limitation slit: 10.00 mm
Scattering slit: open
Photoreception slit: open ($^1$H-NMR Measurement)
Measuring instrument used: AVANCEIII 500 manufactured by BRUKER
Solvent: deuterated sulfuric acid ($D_2SO_4$)
Cumulative number: 2,000

In the present invention, the spectral absorption spectrum of the chlorogallium phthalocyanine pigment contained in the electrophotographic photosensitive member was measured by the following method. Firstly, 2 parts of the chlorogallium phthalocyanine pigment, 1 part of a polyvinyl butyral (trade name: S-LEC BX-1, manufactured by SEKISUI CHEMICAL CO., LTD.) and 52 parts of cyclohexanone were placed in a sand mill using glass beads with a diameter of 1 mm and subjected to a dispersion treatment for 6 hours. Then, a dispersion liquid of the chlorogallium phthalocyanine pigment prepared by adding 75 parts of ethyl acetate was applied to Lumirror (model number T60, thickness 100 μm; manufactured by TORAY INDUSTRIES, INC.) to form a coating film. The resulting coating film was dried to form a dispersion film of the chlorogallium phthalocyanine crystal with a film thickness of 0.20 μm. Using this dispersion film, the spectral absorption spectrum is measured under the following measurement conditions.

(Spectral Absorption Spectrum Measurement)
Measuring instrument used: an ultraviolet and visible spectrophotometer JASCO V-570, manufactured by JASCO Corporation)
Photometric mode: Abs absorbance measurement
Response: fast
Band width: 2.0 nm
Scanning speed: 200 nm/min
Data fetching interval: 0.5 nm (1-2) Charge Transport Layer It is preferable that the charge transport layer should contain a charge transport material and a resin.

Examples of the charge transport material include a polycyclic aromatic compound, a heterocyclic compound, a hydrazone compound, a styryl compound, an enamine compound, a benzidine compound, a triarylamine compound and a resin having a group derived from these materials. Among these, a triarylamine compound or a benzidine compound is preferable.

The content of the charge transport material in the charge transport layer is preferably 25% by mass or more and 70% by mass or less, and is more preferably 30% by mass or more and 55% by mass or less based on the entire mass of the charge transport layer.

Examples of the resin include a polyester resin, a polycarbonate resin, an acrylic resin and a polystyrene resin. Among these, a polycarbonate resin and a polyester resin are preferable. As the polyester resin, a polyarylate resin is particularly preferable.

The content ratio (mass ratio) between the charge transport material and the resin is preferably 4:10 to 20:10, and is more preferably 5:10 to 12:10.

In addition, the charge transport layer may contain an additive such as an antioxidant, an ultraviolet light absorber, a plasticizer, a leveling agent, a slippage imparting agent and a wear resistance enhancing agent. Specific examples thereof include a hindered phenol compound, a hindered amine compound, a sulfur compound, a phosphorus compound, a benzophenone compound, a siloxane modified resin, a silicone oil, a fluororesin particle, a polystyrene resin particle, a polyethylene resin particle, a silica particle, an alumina particle and a boron nitride particle.

The average film thickness of the charge transport layer is preferably 5 μm or more and 50 μm or less, more preferably 8 μm or more and 40 μm or less, and particularly preferably 10 μm or more and 30 μm or less.

The charge transport layer can be formed by preparing a coating liquid for the charge transport layer that contains each of the above materials and a solvent, forming a coating film therefrom, and drying it. Examples of the solvent used for the coating liquid include an alcohol based solvent, a ketone based solvent, an ether based solvent, an ester based solvent and an aromatic hydrocarbon based solvent. Among these solvents, an ether based solvent or an aromatic hydrocarbon based solvent is preferable.

<Protective Film>

In the present invention, a protective film may be provided on the photosensitive layer. By providing a protective film, durability can be enhanced.

It is preferable that the protective film should contain a conductive particle and/or charge transport material and a resin.

Examples of the conductive particle include a particle of a metal oxide such as titanium oxide, zinc oxide, tin oxide and indium oxide.

Examples of the charge transport material include a polycyclic aromatic compound, a heterocyclic compound, a hydrazone compound, a styryl compound, an enamine compound, a benzidine compound, a triarylamine compound and a resin having a group derived from these materials. Among these, a triarylamine compound and a benzidine compound are preferable.

Examples of the resin include a polyester resin, an acrylic resin, a phenoxy resin, a polycarbonate resin, a polystyrene resin, a phenolic resin, a melamine resin and an epoxy resin.

Among other things, a polycarbonate resin, a polyester resin and an acrylic resin are preferable.

Alternatively, the protective film may be formed as a cured film by polymerizing a composition containing a monomer having a polymerizable functional group. Examples of the reaction in that case include a thermal polymerization reaction, a photopolymerization reaction and a radiation polymerization reaction. Examples of the polymerizable functional group that the monomer having a polymerizable functional group has include an acrylic group and a methacrylic group. As the monomer having a polymerizable functional group, a material having a charge transport capacity may be used.

The protective film may contain an additive such as an antioxidant, an ultraviolet light absorber, a plasticizer, a leveling agent, a slippage imparting agent and a wear resistance enhancing agent. Specific examples thereof include a hindered phenol compound, a hindered amine compound, a sulfur compound, a phosphorus compound, a benzophenone compound, a siloxane modified resin, a silicone oil, a fluororesin particle, a polystyrene resin particle, a polyethylene resin particle, a silica particle, an alumina particle and a boron nitride particle.

The average film thickness of the protective film is preferably 0.5 μm or more and 10 μm or less, and preferably 1 μm or more and 7 μm or less.

The protective film can be formed by preparing a coating liquid for the protective film that contains each of the above materials and a solvent, forming a coating film therefrom, and drying and/or curing it. Examples of the solvent used for the coating liquid include an alcohol based solvent, a ketone based solvent, an ether based solvent, a sulfoxide based solvent, an ester based solvent and an aromatic hydrocarbon based solvent.

EXAMPLES

In the following, the present invention will be described in further detail with reference to Examples and Comparative Examples. Unless it goes beyond the gist thereof, the present invention is not limited in any way by the following Examples. Note that, in the following description with respect to Examples, the term "part(s)" is based on mass unless otherwise indicated.

Synthetic Example 1

Under a nitrogen flow atmosphere, 5.46 parts of orthophthalonitrile and 45 parts of α-chloronaphthalene were added in a reaction vessel and heated. The temperature was raised to 30° C. and this temperature was maintained. Next, 3.75 parts of gallium trichloride was added at this temperature (30° C.). The moisture content of the mixed solution at the time of addition was 150 ppm. Then, the temperature was raised to 200° C. Next, under a nitrogen flow atmosphere, the contents were allowed to react at a temperature of 200° C. for 4.5 hours and then cooled. When the temperature reached 150° C., the product was filtered. The obtained residue was dispersed in and washed with N,N-dimethylformamide at a temperature of 140° C. for 2 hours and then filtered. The obtained residue was washed with methanol and then dried to obtain a chlorogallium phthalocyanine pigment at a yield of 71%.

Synthetic Example 2

4.65 parts of the chlorogallium phthalocyanine pigment obtained in the above Synthetic Example 1 was dissolved in 139.5 parts of concentrated sulfuric acid at a temperature of 10° C. Under stirring, the solution was added dropwise into 620 parts of ice water for reprecipitation, and the precipitates were filtered under reduced pressure using a filter press. Upon this, No. 5C (manufactured by ADVANTEC CO., LTD.) was used as a filter. The obtained wet cake (residue) was dispersed in and washed with a 2% aqueous ammonia for 30 minutes and then filtered using a filter press. Next, the obtained wet cake (residue) was dispersed in and washed with ion exchanged water, and then the filtration using a filter press was repeated three times. Finally, freeze drying (lyophilization) was carried out to obtain a hydroxygallium phthalocyanine pigment (water containing hydroxygallium phthalocyanine pigment) with a solid content of 23% at a yield of 97%.

Synthetic Example 3

6.6 kg of the hydroxygallium phthalocyanine pigment obtained in the above Synthetic Example 2 was dried by using a hyper dry dryer (trade name: HD-06R, frequency (oscillating frequency): 2455 MHz±15 MHz, manufactured by BIOCON (JAPAN) LTD.), as follows.

The above hydroxygallium phthalocyanine pigment was placed on a special circular plastic tray in the state of a mass (thickness of water containing cake: 4 cm or less) as it was taken out from the filter press. The far infrared rays were turned off and the temperature of the inner wall of the dryer was set to 50° C. Then, the vacuum pump and leak valve were adjusted during microwave irradiation such that the degree of vacuum was 4.0 to 10.0 kPa.

Firstly, as a first process, the hydroxygallium phthalocyanine pigment was irradiated with a 4.8 kW microwave for 50 minutes, and then, the microwave was once turned off and the leak valve was temporarily closed to create a high vacuum at 2 kPa or less. The solid content of the hydroxygallium phthalocyanine pigment at this time point was 88%. As a second process, the leak valve was adjusted such that the degree of vacuum (pressure in the dryer) was adjusted to be within the above set value (4.0 to 10.0 kPa). After that, the hydroxygallium phthalocyanine pigment was irradiated with a 1.2 kW microwave for 5 minutes, and the microwave was once turned off again and the leak valve was temporarily closed to create a high vacuum at 2 kPa or less. This second process was repeated one more time (two times in total). The solid content of the hydroxygallium phthalocyanine pigment at this time point was 98%. Furthermore, as a third process, microwave irradiation was carried out in the same manner as in the second process except that the output of the microwave in the second process was changed from 1.2 kW to 0.8 kW. This third process was repeated one more time (two times in total). Furthermore, as a fourth process, the leak valve was adjusted such that the degree of vacuum (pressure in the dryer) was returned to be within the above set value (4.0 to 10.0 kPa). After that, the hydroxygallium phthalocyanine pigment was irradiated with a 0.4 kW microwave for 3 minutes, and the microwave was once turned off again and the leak valve was temporarily closed to create a high vacuum at 2 kPa or less. This fourth process was repeated seven more times (eight times in total). As described above, after a total of 3 hours, 1.52 kg of the hydroxygallium phthalocyanine pigment (crystal) with a moisture content of 1% or less was obtained.

Synthetic Example 4

10 parts of the hydroxygallium phthalocyanine pigment obtained in the above Synthetic Example 2 was mixed with 200 parts of hydrochloric acid having a concentration of 35% by mass at a temperature of 23° C., and the mixture was stirred with a magnetic stirrer for 90 minutes. The amount of hydrochloric acid mixed was 118 mol of hydrogen chloride for 1 mol of hydroxygallium phthalocyanine. After stirring, the mixture was added dropwise into 1000 parts of ion exchanged water cooled with ice water and the resultant mixture was stirred with a magnetic stirrer for 30 minutes. This was filtered under reduced pressure. Upon this, No. 5C (manufactured by ADVANTEC CO., LTD.) was used as a filter. After that, dispersion and washing with ion exchanged water at a temperature of 23° C. was carried out four times. In this manner, 9 parts of a chlorogallium phthalocyanine pigment was obtained.

Synthetic Example 5

In 100 g of α-chloronaphthalene, 5.0 g of o-phthalodinitrile and 2.0 g of titanium tetrachloride were heated and stirred at 200° C. for 3 hours, cooled to 50° C., and the crystals precipitated were separated by filtration to obtain a paste of dichlorotitanium phthalocyanine. Next, this paste was washed with 100 mL of N,N-dimethylformamide heated to 100° C. under stirring and then washed twice with 100 mL of methanol at 60° C., and then separated by filtration. Furthermore, the resulting paste was stirred in 100 mL of deionized water at 80° C. for 1 hour and separated by filtration to obtain 4.3 g of a blue titanyl phthalocyanine pigment.

Next, this pigment was dissolved in 30 mL of concentrated sulfuric acid. The resultant solution was added dropwise into 300 mL of deionized water at 20° C. under stirring for reprecipitation, and the precipitates were filtered and washed thoroughly with water to obtain an amorphous titanyl phthalocyanine pigment. 4.0 g of this amorphous titanyl phthalocyanine pigment was suspended and stirred in 100 mL of methanol at room temperature (22° C.) for 8 hours, separated by filtration and dried under reduced pressure to obtain a low crystalline titanyl phthalocyanine pigment.

Milling Example 1

0.5 parts of the hydroxygallium phthalocyanine pigment obtained in Synthetic Example 3, 9.5 parts of N,N-dimethylformamide (product code: D0722, manufactured by Tokyo Chemical Industry Co., Ltd.) and 15 parts of glass beads with a diameter of 0.9 mm were subjected to a milling treatment in a ball mill at room temperature (23° C.) for 100 hours. Upon this, a standard bottle (product name: PS-6, manufactured by HAKUYO GLASS Co., Ltd.) was used as the container, and the milling treatment was carried out under the condition where the container was rotated 60 times per minute. The liquid thus treated was filtered through a filter (part No.: N-NO. 125T, pore size: 133 μm, manufactured by NBC Meshtec Inc.) to remove the glass beads. To this liquid, 30 parts of N,N-dimethylformamide was added and the resultant liquid was then filtered. The residue collected on the strainer was washed thoroughly with tetrahydrofuran. Then, the washed residue was vacuum dried to obtain 0.48 parts of the hydroxygallium phthalocyanine pigment. The obtained pigment has peaks at Bragg angle 2θ of 7.4°±0.3° and 28.2°±0.3° in the X-ray diffraction spectrum using CuKα radiation.

Milling Example 2

1 part of the hydroxygallium phthalocyanine pigment obtained in Synthetic Example 3, 9 parts of N-methylformamide (product code: F0059, manufactured by Tokyo Chemical Industry Co., Ltd.) and 15 parts of glass beads with a diameter of 0.9 mm were subjected to a milling treatment using a sand mill (K-800, manufactured by Igarashi Machine Production Co., Ltd. (now AIMEX CO., Ltd.), disc diameter 70 mm, 5 discs) under a circulating water temperature of 18° C. for 80 hours. Upon this, the milling treatment was carried out under the condition where the disc was rotated 400 times per minute. To the liquid thus treated, 30 parts of N-methylformamide was added and the resultant liquid was then filtered. The residue collected on the strainer was washed thoroughly with tetrahydrofuran. Then, the washed residue was vacuum dried to obtain 0.45 parts of the hydroxygallium phthalocyanine pigment. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 0.9% by mass based on the content of hydroxygallium phthalocyanine.

Milling Example 3

The hydroxygallium phthalocyanine pigment of Milling Example 3 was obtained in the same manner as in Milling Example 2 except that the time for the milling treatment in Milling Example 2 was changed from 80 hours to 100 hours. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 1.4% by mass based on the content of hydroxygallium phthalocyanine.

Milling Example 4

0.5 parts of the hydroxygallium phthalocyanine pigment obtained in Synthetic Example 3, 9.5 parts of N-methylformamide (product code: F0059, manufactured by Tokyo Chemical Industry Co., Ltd.) and 15 parts of glass beads with a diameter of 0.9 mm were subjected to a milling treatment in a ball mill at room temperature (23° C.) for 100 hours. Upon this, a standard bottle (product name: PS-6, manufactured by HAKUYO GLASS Co., Ltd.) was used as the container, and the milling treatment was carried out under the condition where the container was rotated 60 times per minute. The liquid thus treated was filtered through a filter (part No.: N-NO. 125T, pore size: 133 μm, manufactured by NBC Meshtec Inc.) to remove the glass beads. To this liquid, 30 parts N-methylformamide was added and the resultant liquid was then filtered. The residue collected on the strainer was washed thoroughly with tetrahydrofuran. Then, the washed residue was vacuum dried to obtain 0.45 parts of the hydroxygallium phthalocyanine pigment. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 2.1% by mass based on the content of hydroxygallium phthalocyanine.

Milling Example 5

The hydroxygallium phthalocyanine pigment of Milling Example 5 was obtained in the same manner as in Milling Example 4 except that the time for the milling treatment in Milling Example 4 was changed from 100 hours to 7 hours. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 2.9% by mass based on the content of hydroxygallium phthalocyanine.

Milling Example 6

The hydroxygallium phthalocyanine pigment of Milling Example 6 was obtained in the same manner as in Milling Example 4 except that the time for the milling treatment in Milling Example 4 was changed from 100 hours to 5 hours. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 3.1% by mass based on the content of hydroxygallium phthalocyanine.

Milling Example 7

1.0 part of the hydroxygallium phthalocyanine pigment obtained in Synthetic Example 3, 9.0 parts of N-methylformamide (product code: F0059, manufactured by Tokyo Chemical Industry Co., Ltd.) and 15 parts of glass beads with a diameter of 0.9 mm were subjected to a milling treatment in a ball mill at room temperature (23° C.) for 4 hours. Upon this, a standard bottle (product name: PS-6, manufactured by HAKUYO GLASS Co., Ltd.) was used as the container, and the milling treatment was carried out under the condition where the container was rotated 60 times per minute. The liquid thus treated was filtered through a filter (part No.: N-NO. 125T, pore size: 133 μm, manufactured by NBC Meshtec Inc.) to remove the glass beads. To this liquid, 30 parts N-methylformamide was added and the resultant liquid was then filtered. The residue collected on the strainer was washed thoroughly with tetrahydrofuran. Then, the washed residue was vacuum dried to obtain 0.44 parts of the hydroxygallium phthalocyanine pigment. The obtained pigment has strong peaks at Bragg angle 2θ of 7.4°±0.3° and 28.2°±0.3° in the X-ray diffraction spectrum using CuKα radiation. The content of the amide compound (N-methylformamide) represented by the above formula (A1) in the hydroxygallium phthalocyanine crystal particle was estimated by $^1$H-NMR measurement to be 3.9% by mass based on the content of hydroxygallium phthalocyanine.

Milling Example 8

0.5 parts of the titanyl phthalocyanine pigment obtained in Synthetic Example 5, 10 parts of tetrahydrofuran and 15 parts of glass beads with a diameter of 0.9 mm were subjected to a milling treatment using a sand mill (K-800, manufactured by Igarashi Machine Production Co., Ltd. (now AIMEX CO., Ltd.), disc diameter 70 mm, 5 discs) under a circulating water temperature of 18° C. for 48 hours. Upon this, the milling treatment was carried out under the condition where the disc was rotated 500 times per minute. The liquid thus treated was filtered through a filter (part No.: N-NO. 125T, pore size: 133 μm, manufactured by NBC Meshtec Inc.) to remove the glass beads. To this liquid, 30 parts of tetrahydrofuran was added and the resultant liquid was then filtered. The residue collected on the strainer was washed thoroughly with methanol and water. Then, the washed residue was vacuum dried to obtain 0.45 parts of the titanyl phthalocyanine pigment. The obtained pigment has strong peaks at Bragg angle 2θ of 27.2°±0.3° in the X-ray diffraction spectrum using CuKα radiation.

Milling Example 9

0.5 parts of the chlorogallium phthalocyanine pigment obtained in Synthetic Example 4 and 10 parts of N,N-dimethylformamide (product code: D0722, manufactured by Tokyo Chemical Industry Co., Ltd.) were subjected to a milling treatment with a magnetic stirrer at room temperature (23° C.) for 4 hours. From the liquid thus treated, the chlorogallium phthalocyanine pigment was taken out by using tetrahydrofuran, filtered through a filter (part No.: N-NO. 125T, pore size: 133 μm, manufactured by NBC Meshtec Inc.), and the residue collected on the strainer was washed thoroughly with tetrahydrofuran. Then, the washed residue was vacuum dried to obtain 0.46 parts of the chlorogallium phthalocyanine crystal. The spectrum of the obtained pigment had a first peak at 659 nm and a second peak at 791 nm in the spectral absorption spectrum according to the method mentioned above, and the absorbance of the second peak was 0.79 times the absorbance of the first peak.

Milling Example 10

0.5 parts of the chlorogallium phthalocyanine pigment obtained in Synthetic Example 4, 10 parts of N,N-dimethylformamide (product code: D0722, manufactured by Tokyo Chemical Industry Co., Ltd.) and 15 parts of glass beads with a diameter of 0.9 mm were subjected to a milling treatment using a paint shaker (manufactured by Toyo Seiki Seisaku-sho, Ltd.) at room temperature (23° C.) for 48 hours. Upon this, a standard bottle (product name: PS-6, manufactured by HAKUYO GLASS Co., Ltd.) was used as the container. The liquid thus treated was filtered through a filter (part No.: N-NO. 125T, pore size: 133 μm, manufactured by NBC Meshtec Inc.) to remove the glass beads. To this liquid, 30 parts of N,N-dimethylformamide was added and the resultant liquid was then filtered. The residue collected on the strainer was washed thoroughly with tetrahydrofuran. Then, the washed residue was vacuum dried to obtain 0.47 parts of the chlorogallium phthalocyanine pigment. The spectrum of the obtained pigment had a first peak at 643 nm and a second peak at 789 nm in the spectral absorption spectrum according to the method mentioned above, and the absorbance of the second peak was 0.74 times the absorbance of the first peak. In addition, the pigment has peaks at Bragg angle 2θ±0.2° of 7.4°, 16.6°, 25.5° and 28.3° in the X-ray diffraction spectrum using CuKα radiation.

Production Example 1 of Titanium Oxide Particle

Anatase type titanium oxide with an average primary particle diameter of 200 nm was used as a base, and a solution of titanium and niobium in sulfuric acid containing 33.7 parts of titanium in terms of $TiO_2$ and 2.9 parts of niobium in terms of $Nb_2O_5$ was prepared. 100 parts of the base was dispersed in pure water to prepare 1000 parts of a suspension, which was heated to 60° C. The solution of titanium and niobium in sulfuric acid and a 10 mol/L sodium hydroxide were added dropwise into the suspension over 3 hours such that the pH of the suspension became 2 to 3. After the dropwise addition of the entire amount, the pH was adjusted to be near neutral, and the solids were settled by adding a polyacrylamide based flocculating agent. The supernatant was removed, and the solids were filtered, washed, and dried at 110° C. to obtain an intermediate containing 0.1 wt % of organic matter derived from the flocculating agent in terms of C. This intermediate was calcined at 750° C. in nitrogen for 1 hour, and then calcined at 450° C. in the air to prepare a titanium oxide particle 1. The obtained particle had an average particle diameter (average primary particle diameter) of 220 nm according to the aforementioned method of measuring the particle diameter using a scanning electron microscope.

Example 1

<Support>

An aluminum cylinder (JIS-A3003, aluminum alloy) with a length of 257 mm and a diameter of 24 mm, produced through a production method including an extrusion process and a drawing process was used as a support.

<Conductive Layer>

Next, 50 parts of a phenolic resin (monomer/oligomer of a phenolic resin) (trade name: PLYOPHEN J-325, manufactured by DIC CORPORATION, resin solid content: 60%, density after curing: 1.3 g/cm$^2$) as a binder material was dissolved in 35 parts of 1-methoxy-2-propanol as a solvent to obtain a solution.

To this solution, 75 parts of the titanium oxide particle 1 obtained in Production Example 1 of Titanium Oxide Particle was added, and the resultant solution was, as a dispersing medium, placed in a vertical sand mill using 120 parts of glass beads with an average particle diameter of 1.0 mm, and a dispersion treatment was carried out for 4 hours under the condition where the temperature of the dispersion liquid was 23±3° C. and the number of rotations was 1500 rpm (peripheral speed is 5.5 m/s), thereby obtaining a dispersion liquid. The glass beads were removed from this dispersion liquid with a mesh. To the dispersion liquid after the glass beads were removed, 0.01 parts of a silicone oil (trade name: SH28 PAINT ADDITIVE, manufactured by Dow Corning Toray Co., Ltd.) as a leveling agent and 8 parts of a silicone resin particle (trade name: KMP-590, Shin-Etsu Chemical Co., Ltd., average particle diameter: 2 μm, density: 1.3 g/cm$^3$) as a surface roughening agent were added, and the resultant mixture was stirred. Then, by subjecting the mixture to pressure filtration using a PTFE filter paper (trade name: PF060, manufactured by Advantec Toyo Kaisha, Ltd.) to prepare a coating liquid for a conductive layer. With the coating liquid for a conductive layer thus prepared, the above-mentioned support was subjected to immersion coating under the environment of normal temperature and normal humidity (23° C./50% RH) to form a coating film, and the coating film was heated at 170° C. for 30 minutes and cured, thereby forming a conductive layer with a film thickness of 25 μm.

<Underlayer>

Next, 25 parts of N-methoxymethylated nylon 6 (trade name: Toresin EF-30T, manufactured by Nagase ChemteX Corporation) was dissolved in 480 parts of a mixed solution of methanol/n-butanol=2/1 (dissolved by heating at 65° C.) to prepare a solution, which was then cooled. Subsequently, the solution was filtered through a membrane filter (trade name: FP-022, pore size: 0.22 manufactured by Sumitomo Electric Industries, Ltd.) to prepare a coating liquid for an underlayer. With the coating liquid for an underlayer thus prepared, the above-mentioned conductive layer was subjected to immersion coating to form a coating film, and the coating film was heated and dried at a temperature of 100° C. for 10 minutes, thereby forming an underlayer with a film thickness of 0.5

<Charge Generating Layer>

Next, 20 parts of the hydroxygallium phthalocyanine pigment obtained in Milling Example 1, 10 parts of a polyvinyl butyral (trade name: S-LEC BX-1, manufactured by SEKISUI CHEMICAL CO., LTD.), 190 parts of cyclohexanone and 482 parts of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a circulating water temperature of 18° C. for 4 hours. Upon this, the milling treatment was carried out under the condition where the disc was rotated 1,800 times per minute. By adding 444 parts of cyclohexanone and 634 parts of ethyl acetate to this dispersion liquid, a coating liquid for a charge generating layer was prepared.

Upon forming a coating film on the above-mentioned underlayer through immersion coating of this coating liquid for a charge generating layer, the speed at which the support immersed in the coating liquid was lifted from the coating liquid was gradually changed according to the distance between the liquid surface and the upper end of the support, as shown in Table 1. The coating film thus obtained was heated and dried at 100° C. for 10 minutes to form a charge generating layer with the film thickness distribution shown in Table 4.

TABLE 1

| Distance from upper end of support/mm | Lifting speed/mm/min |
| --- | --- |
| ~3 | 829 |
| 28 | 605 |
| 53 | 444 |
| 78 | 359 |
| 103 | 307 |
| 128 | 284 |
| 153 | 286 |
| 178 | 314 |
| 203 | 365 |
| 228 | 474 |
| 253~ | 616 |

<Charge Transport Layer>
Next, by dissolving 70 parts of a triarylamine compound represented by the following formula (B1):

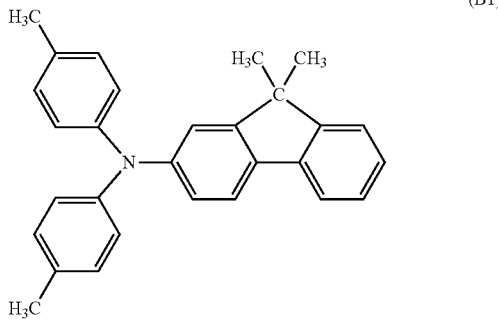

(B1)

10 parts of a triarylamine compound represented by the following formula (B2):

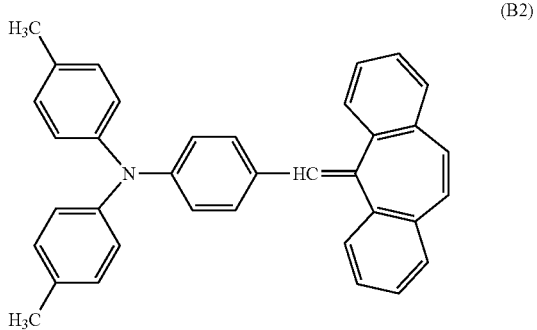 [SMILES: Cc1ccc(N(c2ccc(C)cc2)c2ccc(C=C3c4ccccc4C=Cc4ccccc43)cc2)cc1]

(B2)

and 100 parts of a polycarbonate (trade name: Iupilon Z-200, manufactured by Mitsubishi Engineering-Plastics Corporation) in 630 parts of monochlorobenzene as charge transport materials, a coating liquid for a charge transport layer was prepared. With the coating liquid for a charge transport layer thus prepared, the above-mentioned charge generating layer was subjected to immersion coating to form a coating film, and the coating film was heated and dried at a temperature of 120° C. for 1 hour, thereby forming a charge transport layer with a film thickness of 17 μm.

The heating treatment for each of the coating films of the conductive layer, the underlayer, the charge generating layer and the charge transport layer was carried out using an oven set to each temperature. The heating treatment for each layer was carried out in the following Examples in the same manner. As described above, a cylindrical (drum-shaped) electrophotographic photosensitive member was produced.

The type of the charge generating material contained in the electrophotographic photosensitive member obtained at this time; the content of the compound (A1) contained in the crystal of the charge generating material; the absorption coefficient β of the charge generating layer measured according to the method mentioned above; the calculated value of the following expression (E1); $\Delta = d_6 - d_0$; and the calculated value of the film thickness of the charge generating layer in each region in the axial direction of the support according to the following expression (E2) are shown in Table 7. In addition, for $d=d(Y)$ calculated with the following expression (E2), when it was determined whether the film thickness distribution of the charge generating layer of Example 1 is between $d-0.2\Delta$ and $d+0.2\Delta$, it fell within the space between $d-0.2\Delta$ and $d+0.2\Delta$ in all regions. The results are also shown in Table 7.

$$\frac{1-e^{-2\beta d_6}}{1-e^{-2\beta d_0}} \geq 1.2 \tag{E1}$$

$$d(Y) = d_0 + \Delta(1-\beta\Delta)\frac{Y^2}{Y_{max}^2} + \beta\Delta^2 \frac{Y^4}{Y_{max}^4} \tag{E2}$$

Note that, in the tables, "HOGaPc" refers to the "hydroxygallium phthalocyanine pigment", "TiOPc" refers to the "titanyl phthalocyanine pigment", "ClGaPc(9)" refers to the "chlorogallium phthalocyanine pigment obtained in Milling Example 9", "ClGaPc(10)" refers to the "chlorogallium phthalocyanine pigment obtained in Milling Example 10", "disazo(C1)" refers to the "compound represented by the formula (C1)", "disazo(C2)" refers to the "compound represented by the formula (C2)", and "trisazo" refers to the "compound represented by the formula (C3)".

Examples 2 to 6, 8 to 14 and 22 to 27

Electrophotographic photosensitive members of Examples 2 to 6, 8 to 14 and 22 to 27 were prepared by appropriately changing the number of parts for 444 parts of cyclohexanone and 634 parts of ethyl acetate upon preparing the coating liquid for a charge generating layer in the formation of the charge generating layer of Example 1, thereby adjusting the viscosity of the coating liquid, and also by changing the lifting speed upon the immersion coating shown in Table 1. The results are shown in Table 4 and Table 7.

Figure 9:
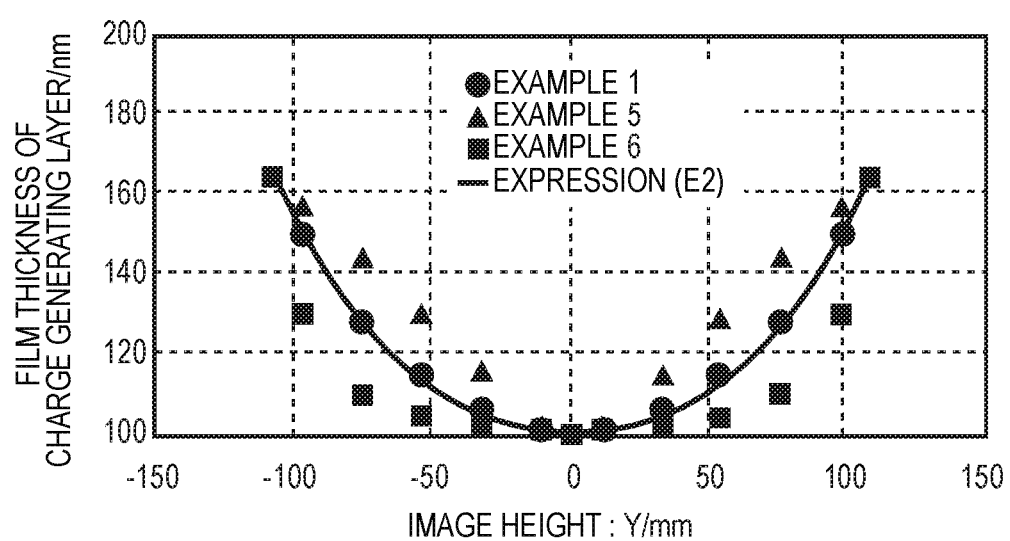
FIG. 9 is a graph showing a comparison between the film thickness distributions of the charge generating layers of Example 1, Example 5 and Example 6 and the film thickness distribution of the charge generating layer calculated by the expression (E2) common to these three Examples.

In addition, a graph presenting a comparison among the film thickness distributions of the charge generating layer of Example 1, Example 5 and Example 6 and the film thickness distribution of the charge generating layer calculated with the expression (E2) common to these three Examples is shown in FIG. 9.

Examples 7 and 15 to 21

Electrophotographic photosensitive members of Examples 7 and 15 to 21 were prepared in the same manner as in Example 1 except that the formation of the conductive layer in Example 1 was changed as follows and also the immersion coating of the charge generating layer was carried out in the same method as mentioned above but the film thickness distribution of the charge generating layer was changed as shown in Table 4. The results are shown in Table 4 and Table 7.

60 parts of a barium sulfate particle covered with tin oxide (trade name: Passtran PC1, manufactured by MITSUI MINING & SMELTING CO., LTD.), 15 parts of a titanium oxide particle (trade name: TITANIX JR, manufactured by Tayca Corporation), 43 parts of a resol phenolic resin (trade name: PHENOLITE J-325, manufactured by DIC CORPORATION, solid content 70% by mass), 0.015 parts of a silicone oil (trade name: SH28PA, manufactured by Dow Corning Toray Co., Ltd.), 3.6 parts of a silicone resin particle (trade name: Tospearl 120, manufactured by MOMENTIVE PERFORMANCE MATERIALS JAPAN LLC.), 50 parts of 2-methoxy-1-propanol and 50 parts of methanol were placed in a ball mill and subjected to a dispersion treatment for 20 hours to prepare a coating liquid for a conductive layer. With the coating liquid for a conductive layer thus prepared, the above-mentioned support was subjected to immersion coating to form a coating film, and the coating film was heated at 145° C. for 1 hour and cured, thereby forming a conductive layer with a film thickness of 8 µm.

Examples 28 to 33 and 35 to 49

Electrophotographic photosensitive members of Examples 28 to 33 and 35 to 49 were prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 3 and also the immersion coating was carried out in the same method as mentioned above but the film thickness distribution of the charge generating layer was changed as shown in Table 4. The results are shown in Table 4 and Table 7.

Example 34

An electrophotographic photosensitive member of Example 34 was prepared in the same manner as in Example 1 except that, in the formation of the charge generating layer in Example 7, the hydroxygallium phthalocyanine pigment obtained in Milling Example 1 was changed to the hydroxygallium phthalocyanine pigment obtained in Milling Example 3 and also the immersion coating was carried out in the same method as mentioned above but the film thickness distribution of the charge generating layer was changed as shown in Table 4. The results are shown in Table 4 and Table 7.

Example 50

An electrophotographic photosensitive member of Example 50 was prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 2 and also the immersion coating was carried out in the same method as mentioned above but the film thickness distribution of the charge generating layer was changed as shown in Table 4. The results are shown in Table 4 and Table 7.

Example 51

An electrophotographic photosensitive member of Example 51 was prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 4 and also the immersion coating was carried out in the same method as mentioned above but the film thickness distribution of the charge generating layer was changed as shown in Table 4. The results are shown in Table 4 and Table 7.

Example 52

An electrophotographic photosensitive member of Example 52 was prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 5 and also the immersion coating was carried out in the same method as mentioned above but the film thickness distribution of the charge generating layer was changed as shown in Table 4. The results are shown in Table 4 and Table 7.

Example 53

An electrophotographic photosensitive member of Example 53 was prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 6 and also the immersion coating was carried out in the same method as mentioned above but the film thickness distribution of the charge generating layer was changed as shown in Table 4. The results are shown in Table 4 and Table 7.

Examples 54 to 55

Electrophotographic photosensitive members of Examples 54 to 55 were prepared in the same manner as in Example 1 except that, in the formation of the charge generating layer in Example 1, the hydroxygallium phthalocyanine pigment obtained in Milling Example 1 was changed to the hydroxygallium phthalocyanine pigment obtained in Milling Example 7 and also the immersion coating was carried out in the same method as mentioned above but the film thickness distribution of the charge generating layer was changed as shown in Table 4. The results are shown in Table 4 and Table 7.

Example 56

An electrophotographic photosensitive member of Example 56 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 5. The results are shown in Table 5 and Table 8.

12 parts of the titanyl phthalocyanine pigment obtained in Milling Example 8, 10 parts of a polyvinyl butyral (trade name: S-LEC BX-1, manufactured by SEKISUI CHEMICAL CO., LTD.), 139 parts of cyclohexanone and 354 parts of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a circulating water temperature of 18° C. for 4 hours. Upon this, the milling treatment was carried out under the condition where the disc was rotated 1,800 times per minute. By adding 326 parts of cyclohexanone and 465 parts of ethyl acetate to this dispersion liquid, a coating liquid for a charge generating layer was prepared.

Examples 57 to 58 and 60 to 67

Electrophotographic photosensitive members of Examples 57 to 58 and 60 to 67 were prepared in the same manner as in Example 56 except that the immersion coating of the charge generating layer in Example 56 was carried out in the same method as mentioned above but the film thickness distribution of the charge generating layer was changed as shown in Table 5. The results are shown in Table 5 and Table 8.

Example 59

An electrophotographic photosensitive member of Example 59 was prepared in the same manner as in Example 56 except that the formation of the conductive layer in Example 56 was changed as follows and also the immersion coating of the charge generating layer was carried out in the same method as mentioned above but the film thickness distribution of the charge generating layer was changed as shown in Table 5. The results are shown in Table 5 and Table 8.

60 parts of a barium sulfate particle covered with tin oxide (trade name: Passtran PC1, manufactured by MITSUI MINING & SMELTING CO., LTD.), 15 parts of a titanium oxide particle (trade name: TITANIX JR, manufactured by Tayca Corporation), 43 parts of a resol phenolic resin (trade name: PHENOLITE J-325, manufactured by DIC CORPORATION, solid content 70% by mass), 0.015 parts of a silicone oil (trade name: SH28PA, manufactured by Dow Corning Toray Co., Ltd.), 3.6 parts of a silicone resin particle (trade name: Tospearl 120, manufactured by MOMENTIVE PERFORMANCE MATERIALS JAPAN LLC.), 50 parts of 2-methoxy-1-propanol and 50 parts of methanol were placed in a ball mill and subjected to a dispersion treatment for 20 hours to prepare a coating liquid for a conductive layer. With the coating liquid for a conductive layer thus prepared, the above-mentioned support was subjected to immersion coating to form a coating film, and the coating film was heated at 145° C. for 1 hour and cured, thereby forming a conductive layer with a film thickness of 8 μm.

Example 68

An electrophotographic photosensitive member of Example 68 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 5. The results are shown in Table 5 and Table 8.

30 parts of the chlorogallium phthalocyanine pigment obtained in Milling Example 9, 10 parts of a polyvinyl butyral (trade name: S-LEC BX-1, manufactured by SEKISUI CHEMICAL CO., LTD.), 253 parts of cyclohexanone and 643 parts of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a circulating water temperature of 18° C. for 4 hours. Upon this, the milling treatment was carried out under the condition where the disc was rotated 1,800 times per minute. By adding 592 parts of cyclohexanone and 845 parts of ethyl acetate to this dispersion liquid, a coating liquid for a charge generating layer was prepared.

Examples 69 to 75 and 80 to 85

Electrophotographic photosensitive members of Examples 69 to 75 and 80 to 85 were prepared in the same manner as in Example 68 except that the immersion coating of the charge generating layer in Example 68 was carried out in the same method as mentioned above but the film thickness distribution of the charge generating layer was changed as shown in Table 5. The results are shown in Table 5 and Table 8.

Examples 76 to 79

Electrophotographic photosensitive members of Examples 76 to 79 were prepared in the same manner as in Example 68 except that the formation of the conductive layer in Example 68 was changed as follows and also the immersion coating of the charge generating layer was carried out in the same method as mentioned above but the film thickness distribution of the charge generating layer was changed as shown in Table 5. The results are shown in Table 5 and Table 8.

60 parts of a barium sulfate particle covered with tin oxide (trade name: Passtran PC1, manufactured by MITSUI MINING & SMELTING CO., LTD.), 15 parts of a titanium oxide particle (trade name: TITANIX JR, manufactured by Tayca Corporation), 43 parts of a resol phenolic resin (trade name: PHENOLITE J-325, manufactured by DIC CORPORATION, solid content 70% by mass), 0.015 parts of a silicone oil (trade name: SH28PA, manufactured by Dow Corning Toray Co., Ltd.), 3.6 parts of a silicone resin particle (trade name: Tospearl 120, manufactured by MOMENTIVE PERFORMANCE MATERIALS JAPAN LLC.), 50 parts of 2-methoxy-1-propanol and 50 parts of methanol were placed in a ball mill and subjected to a dispersion treatment for 20 hours to prepare a coating liquid for a conductive layer. With the coating liquid for a conductive layer thus prepared, the above-mentioned support was subjected to immersion coating to form a coating film, and the coating film was heated at 145° C. for 1 hour and cured, thereby forming a conductive layer with a film thickness of 8 μm.

Example 86

An electrophotographic photosensitive member of Example 86 was prepared in the same manner as in Example 1 except that the lifting speed upon immersion coating of the charge generating layer in Example 1 was gradually changed according to the distance between the liquid surface and the upper end of the support, as shown in Table 2. The results are shown in Table 5 and Table 8.

TABLE 2

| Distance from upper end of support/mm | Lifting speed/mm/min |
|---|---|
| ~3 | 290 |
| 28 | 290 |
| 53 | 290 |
| 78 | 290 |
| 103 | 290 |
| 128 | 290 |
| 153 | 293 |
| 178 | 314 |
| 203 | 365 |
| 228 | 474 |
| 253~ | 616 |

Example 87

An electrophotographic photosensitive member of Example 87 was prepared in the same manner as in Example 1 except that the lifting speed upon immersion coating of the charge generating layer in Example 1 was gradually changed according to the distance between the liquid surface and the upper end of the support, as shown in Table 3. The results are shown in Table 5 and Table 8.

TABLE 3

| Distance from upper end of support/mm | Lifting speed/mm/min |
| --- | --- |
| ~3 | 725 |
| 28 | 466 |
| 53 | 373 |
| 78 | 316 |
| 103 | 290 |
| 128 | 290 |
| 153 | 316 |
| 178 | 372 |
| 203 | 474 |
| 228 | 599 |
| 253~ | 769 |

Comparative Examples 1

An electrophotographic photosensitive member of Comparative Example 1 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 6. The results are shown in Table 6 and Table 9.

30 parts of the chlorogallium phthalocyanine pigment obtained in Milling Example 10, 10 parts of a polyvinyl butyral (trade name: S-LEC BX-1, manufactured by SEKISUI CHEMICAL CO., LTD.), 253 parts of cyclohexanone and 643 parts of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a circulating water temperature of 18° C. for 4 hours. Upon this, the milling treatment was carried out under the condition where the disc was rotated 1,800 times per minute. By adding 592 parts of cyclohexanone and 845 parts of ethyl acetate to this dispersion liquid, a coating liquid for a charge generating layer was prepared.

Comparative Examples 2, 4 and 6 to 9

Electrophotographic photosensitive members of Comparative Examples 2, 4 and 6 to 9 were prepared in the same manner as in Comparative Example 1 except that the immersion coating of the charge generating layer in Comparative Example 1 was carried out in the same method as mentioned above but the film thickness distribution of the charge generating layer was changed as shown in Table 6. The results are shown in Table 6 and Table 9.

Comparative Examples 3

An electrophotographic photosensitive member of Comparative Example 3 was prepared in the same manner as in Comparative Example 1 except that the preparation of the coating liquid for a charge generating layer in Comparative Example 1 was changed as follows and also the immersion coating of the charge generating layer was carried out in the same method as mentioned above but the film thickness distribution of the charge generating layer was changed as shown in Table 6. The results are shown in Table 6 and Table 9.

20 parts of the chlorogallium phthalocyanine pigment obtained in Milling Example 10, 10 parts of a polyvinyl butyral (trade name: S-LEC BM-S, manufactured by SEKISUI CHEMICAL CO., LTD.), 370 parts of n-butyl acetate and 878 parts of glass beads with a diameter of 0.9 mm were subjected to a dispersion treatment using a paint shaker (manufactured by Toyo Seiki Seisaku-sho, Ltd.) at room temperature (23° C.) for 1 hour. By adding 900 parts of n-butyl acetate to this dispersion liquid, a coating liquid for a charge generating layer was prepared.

Comparative Examples 5

An electrophotographic photosensitive member of Comparative Example 5 was prepared in the same manner as in Comparative Example 1 except that the formation of the conductive layer in Comparative Example 1 was changed as follows and also the immersion coating of the charge generating layer was carried out in the same method as mentioned above but the film thickness distribution of the charge generating layer was changed as shown in Table 6. The results are shown in Table 6 and Table 9.

60 parts of a barium sulfate particle covered with tin oxide (trade name: Passtran PC1, manufactured by MITSUI MINING & SMELTING CO., LTD.), 15 parts of a titanium oxide particle (trade name: TITANIX JR, manufactured by Tayca Corporation), 43 parts of a resol phenolic resin (trade name: PHENOLITE J-325, manufactured by DIC CORPORATION, solid content 70% by mass), 0.015 parts of a silicone oil (trade name: SH28PA, manufactured by Dow Corning Toray Co., Ltd.), 3.6 parts of a silicone resin particle (trade name: Tospearl 120, manufactured by MOMENTIVE PERFORMANCE MATERIALS JAPAN LLC.), 50 parts of 2-methoxy-1-propanol and 50 parts of methanol were placed in a ball mill and subjected to a dispersion treatment for 20 hours to prepare a coating liquid for a conductive layer. With the coating liquid for a conductive layer thus prepared, the above-mentioned support was subjected to immersion coating to form a coating film, and the coating film was heated at 145° C. for 1 hour and cured, thereby forming a conductive layer with a film thickness of 8 µm.

Comparative Examples 10

An electrophotographic photosensitive member of Comparative Example 10 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 6. The results are shown in Table 6 and Table 9.

20 parts of the disazo compound represented by the following formula (C1), 8 parts of a polyvinyl butyral (trade name: S-LEC BX-1, manufactured by SEKISUI CHEMICAL CO., LTD.), 177 parts of cyclohexanone and 482 parts of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a circulating water temperature of 18° C. for 4 hours. Upon this, the milling treatment was carried out under the condition where the disc was rotated 1,800 times per minute. By adding 414 parts of cyclohexanone and 592 parts of ethyl acetate to this dispersion liquid, a coating liquid for a charge generating layer was prepared.

of glass beads with a diameter of 0.9 mm were subjected to a dispersion treatment using a sand mill (K-800, manufactured by Igarashi Machine Production Co., Ltd. (now AIMEX CO., Ltd.), disc diameter 70 mm, 5 discs) under a

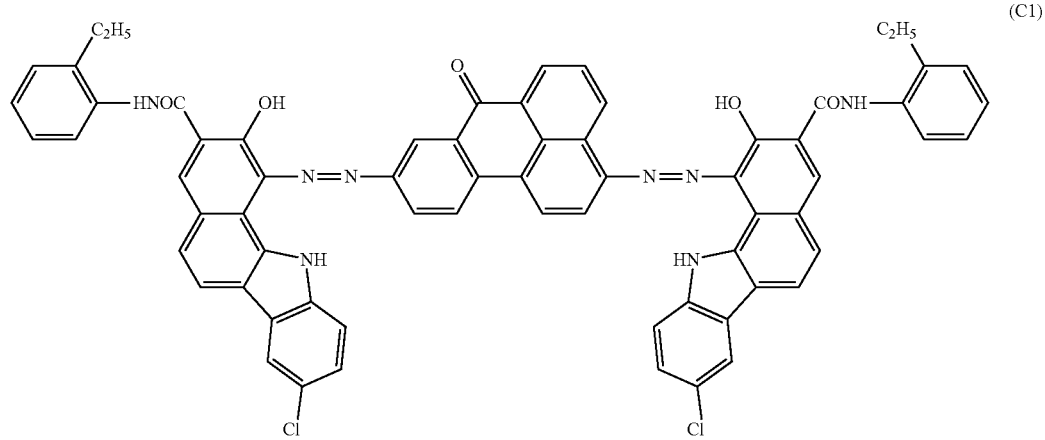

(C1)

Comparative Examples 11 to 20

Electrophotographic photosensitive members of Comparative Examples 11 to 20 were prepared in the same manner as in Comparative Example 10 except that the immersion coating of the charge generating layer in Comparative Example 10 was carried out in the same method as mentioned above but the film thickness distribution of the charge generating layer was changed as shown in Table 6. The results are shown in Table 6 and Table 9.

Comparative Examples 21

An electrophotographic photosensitive member of Comparative Example 21 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 6. The results are shown in Table 6 and Table 9.

20 parts of the disazo compound represented by the following formula (C2), 8 parts of a polyvinyl butyral (trade name: S-LEC BX-1, manufactured by SEKISUI CHEMICAL CO., LTD.), 177 parts of cyclohexanone and 482 parts circulating water temperature of 18° C. for 4 hours. Upon this, the milling treatment was carried out under the condition where the disc was rotated 1,800 times per minute. By adding 414 parts of cyclohexanone and 592 parts of ethyl acetate to this dispersion liquid, a coating liquid for a charge generating layer was prepared.

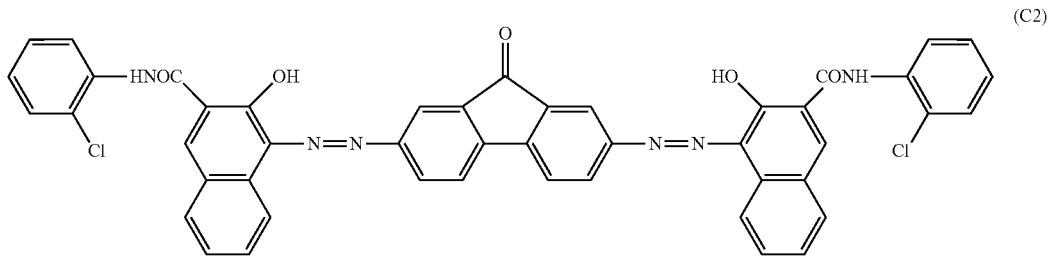

(C2)

Comparative Examples 22 to 23

Electrophotographic photosensitive members of Comparative Examples 22 to 23 were prepared in the same manner as in Comparative Example 21 except that the immersion coating of the charge generating layer in Comparative Example 21 was carried out in the same method as mentioned above but the film thickness distribution of the charge generating layer was changed as shown in Table 6. The results are shown in Table 6 and Table 9.

Comparative Examples 24

An electrophotographic photosensitive member of Comparative Example 24 was prepared in the same manner as in Example 1 except that the preparation of the coating liquid for a charge generating layer in Example 1 was changed as follows and also the immersion coating of the charge generating layer was carried out in the same method as mentioned above but the film thickness distribution of the charge generating layer was changed as shown in Table 6. The results are shown in Table 6 and Table 9.

20 parts of the trisazo compound represented by the following formula (C3), 30 parts of a polyvinyl butyral (trade name: S-LEC BLS, manufactured by SEKISUI CHEMICAL CO., LTD.), 300 parts of cyclohexanone and 500 parts of glass beads with a diameter of 0.9 mm were subjected to a milling treatment in a ball mill at room temperature (23° C.) for 48 hours. Upon this, a standard bottle (product name: PS-6, manufactured by HAKUYO GLASS Co., Ltd.) was used as the container, and the milling treatment was carried out under the condition where the container was rotated 60 times per minute. By adding 60 parts of cyclohexanone and 360 parts of ethyl acetate to this dispersion liquid, a coating liquid for a charge generating layer was prepared.

Comparative Examples 28 to 29

Electrophotographic photosensitive members of Comparative Examples 28 to 29 were prepared in the same manner as in Comparative Example 27 except that the immersion coating of the charge generating layer in Comparative Example 27 was carried out in the same method as mentioned above but the film thickness of the charge generating layer was changed as shown in Table 6. The results are shown in Table 6 and Table 9.

Comparative Examples 30

An electrophotographic photosensitive member of Comparative Example 30 was prepared in the same manner as in

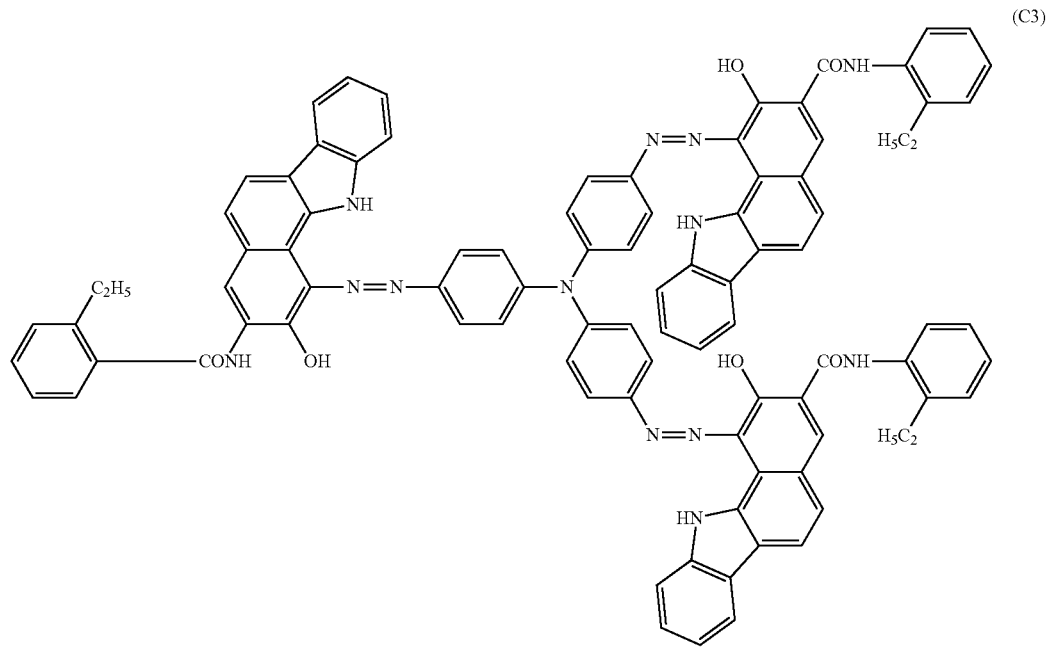

Comparative Examples 25 to 26

Electrophotographic photosensitive members of Comparative Examples 25 to 26 were prepared in the same manner as in Comparative Example 24 except that the immersion coating of the charge generating layer in Comparative Example 24 was carried out in the same method as mentioned above but the film thickness distribution of the charge generating layer was changed as shown in Table 6. The results are shown in Table 6 and Table 9.

Comparative Examples 27

An electrophotographic photosensitive member of Comparative Example 27 was prepared in the same manner as in Example 1 except that the immersion coating of the charge generating layer in Example 1 was carried out at a constant lifting speed regardless of the distance between the liquid surface and the upper end of the support and the film thickness of the charge generating layer was changed to be constant at 60 nm in the axial direction of the support, as shown in Table 6. The results are shown in Table 6 and Table 9.

Example 28 except that the immersion coating of the charge generating layer in Example 28 was carried out at a constant lifting speed regardless of the distance between the liquid surface and the upper end of the support and the film thickness of the charge generating layer was changed to be constant at 60 nm in the axial direction of the support, as shown in Table 6. The results are shown in Table 6 and Table 9.

Comparative Examples 31 to 32

Electrophotographic photosensitive members of Comparative Examples 31 to 32 were prepared in the same manner as in Comparative Example 30 except that the immersion coating of the charge generating layer in Comparative Example 30 was carried out in the same method as mentioned above but the film thickness of the charge generating layer was changed as shown in Table 6. The results are shown in Table 6 and Table 9.

Comparative Examples 33

An electrophotographic photosensitive member of Comparative Example 33 was prepared in the same manner as in Example 56 except that the immersion coating of the charge generating layer in Example 56 was carried out at a constant lifting speed regardless of the distance between the liquid surface and the upper end of the support and the film thickness of the charge generating layer was changed to be constant generally at 130 nm in the axial direction of the support, as shown in Table 6. The results are shown in Table 6 and Table 9.

Comparative Examples 34

An electrophotographic photosensitive member of Comparative Example 34 was prepared in the same manner as in Example 68 except that the immersion coating of the charge generating layer in Example 68 was carried out at a constant lifting speed regardless of the distance between the liquid surface and the upper end of the support and the film thickness of the charge generating layer was changed to be constant at 80 nm in the axial direction of the support, as shown in Table 6. The results are shown in Table 6 and Table 9.

Comparative Examples 35 to 36

Electrophotographic photosensitive members of Comparative Examples 35 to 36 were prepared in the same manner as in Comparative Example 34 except that the immersion coating of the charge generating layer in Comparative Example 34 was carried out in the same method as mentioned above but the film thickness of the charge generating layer was changed as shown in Table 6. The results are shown in Table 6 and Table 9.

Comparative Examples 37

An electrophotographic photosensitive member of Comparative Example 37 was prepared in the same manner as in Comparative Example 1 except that the immersion coating of the charge generating layer in Comparative Example 1 was carried out at a constant lifting speed regardless of the distance between the liquid surface and the upper end of the support and the film thickness of the charge generating layer was changed to be constant generally at 120 nm in the axial direction of the support, as shown in Table 6. The results are shown in Table 6 and Table 9.

Comparative Examples 38

An electrophotographic photosensitive member of Comparative Example 38 was prepared in the same manner as in Comparative Example 10 except that the immersion coating of the charge generating layer in Comparative Example 10 was carried out at a constant lifting speed regardless of the distance between the liquid surface and the upper end of the support and the film thickness of the charge generating layer was changed to be constant generally at 240 nm in the axial direction of the support, as shown in Table 6. The results are shown in Table 6 and Table 9.

Comparative Examples 39

An electrophotographic photosensitive member of Comparative Example 39 was prepared in the same manner as in Comparative Example 21 except that the immersion coating of the charge generating layer in Comparative Example 21 was carried out at a constant lifting speed regardless of the distance between the liquid surface and the upper end of the support and the film thickness of the charge generating layer was changed to be constant at 240 nm in the axial direction of the support, as shown in Table 6. The results are shown in Table 6 and Table 9.

Comparative Examples 40

An electrophotographic photosensitive member of Comparative Example 40 was prepared in the same manner as in Comparative Example 24 except that the immersion coating of the charge generating layer in Comparative Example 24 was carried out at a constant lifting speed regardless of the distance between the liquid surface and the upper end of the support and the film thickness of the charge generating layer was changed to be constant generally at 240 nm in the axial direction of the support, as shown in Table 6. The results are shown in Table 6 and Table 9.

TABLE 4

Average film thickness of charge generating layer in each region in axial direction of cylindrical support [nm]

| | $Y = -108$ mm | $Y = -97.2$ mm | $Y = -75.6$ mm | $Y = -54$ mm | $Y = -32.4$ mm | $Y = -10.8$ mm | $Y = 0$ mm $d_0$ | $Y = 10.8$ mm $d_1$ | $Y = 32.4$ mm $d_2$ | $Y = 54$ mm $d_3$ | $Y = 75.6$ mm $d_4$ | $Y = 97.2$ mm $d_5$ | $Y = 108$ mm $d_6$ |
|---|---|---|---|---|---|---|---|---|---|---|---|---|---|
| Example 1 | 164 | 150 | 128 | 115 | 106 | 101 | 100 | 101 | 106 | 115 | 128 | 150 | 164 |
| Example 2 | 164 | 150 | 130 | 117 | 105 | 100 | 100 | 102 | 109 | 117 | 130 | 150 | 164 |
| Example 3 | 165 | 139 | 115 | 107 | 103 | 101 | 100 | 101 | 103 | 107 | 115 | 140 | 164 |
| Example 4 | 165 | 154 | 140 | 126 | 113 | 102 | 100 | 102 | 113 | 126 | 140 | 155 | 164 |
| Example 5 | 164 | 157 | 144 | 130 | 116 | 102 | 100 | 102 | 115 | 129 | 144 | 157 | 164 |
| Example 6 | 165 | 130 | 110 | 104 | 102 | 101 | 100 | 101 | 102 | 104 | 110 | 130 | 164 |
| Example 7 | 164 | 150 | 127 | 113 | 104 | 101 | 100 | 101 | 104 | 114 | 127 | 149 | 164 |
| Example 8 | 89 | 81 | 71 | 65 | 62 | 60 | 60 | 60 | 62 | 65 | 71 | 81 | 89 |
| Example 9 | 123 | 118 | 105 | 94 | 86 | 81 | 80 | 81 | 86 | 94 | 105 | 118 | 124 |
| Example 10 | 212 | 171 | 138 | 131 | 125 | 121 | 120 | 121 | 125 | 131 | 138 | 172 | 212 |
| Example 11 | 275 | 232 | 194 | 173 | 158 | 144 | 141 | 144 | 158 | 173 | 193 | 231 | 275 |
| Example 12 | 148 | 137 | 120 | 109 | 104 | 101 | 100 | 101 | 104 | 109 | 120 | 137 | 148 |
| Example 13 | 136 | 125 | 114 | 106 | 103 | 101 | 100 | 101 | 103 | 106 | 114 | 125 | 136 |
| Example 14 | 126 | 123 | 117 | 110 | 105 | 101 | 100 | 101 | 105 | 110 | 116 | 123 | 127 |
| Example 15 | 127 | 123 | 116 | 111 | 106 | 102 | 101 | 102 | 106 | 111 | 116 | 123 | 127 |
| Example 16 | 127 | 124 | 118 | 112 | 106 | 101 | 100 | 101 | 106 | 112 | 118 | 124 | 127 |
| Example 17 | 127 | 115 | 107 | 103 | 101 | 100 | 100 | 100 | 101 | 103 | 107 | 115 | 127 |
| Example 18 | 99 | 95 | 90 | 86 | 83 | 81 | 80 | 81 | 83 | 86 | 90 | 95 | 99 |
| Example 19 | 156 | 146 | 133 | 127 | 122 | 120 | 120 | 120 | 122 | 127 | 134 | 146 | 156 |
| Example 20 | 224 | 204 | 186 | 177 | 168 | 162 | 161 | 162 | 168 | 176 | 186 | 205 | 224 |
| Example 21 | 315 | 287 | 243 | 215 | 205 | 200 | 200 | 200 | 204 | 214 | 243 | 287 | 314 |
| Example 22 | 120 | 115 | 109 | 105 | 102 | 100 | 100 | 100 | 102 | 105 | 109 | 115 | 120 |

TABLE 4-continued

| | Average film thickness of charge generating layer in each region in axial direction of cylindrical support [nm] | | | | | | | | | | | | |
|---|---|---|---|---|---|---|---|---|---|---|---|---|
| | $Y = -108$ mm | $Y = -97.2$ mm | $Y = -75.6$ mm | $Y = -54$ mm | $Y = -32.4$ mm | $Y = -10.8$ mm | $Y = 0$ mm $d_0$ | $Y = 10.8$ mm $d_1$ | $Y = 32.4$ mm $d_2$ | $Y = 54$ mm $d_3$ | $Y = 75.6$ mm $d_4$ | $Y = 97.2$ mm $d_5$ | $Y = 108$ mm $d_6$ |
| Example 23 | 114 | 112 | 108 | 104 | 101 | 100 | 100 | 100 | 101 | 104 | 108 | 112 | 114 |
| Example 24 | 164 | 160 | 153 | 148 | 144 | 141 | 140 | 141 | 144 | 148 | 153 | 160 | 164 |
| Example 25 | 219 | 201 | 190 | 184 | 181 | 180 | 180 | 180 | 182 | 185 | 190 | 202 | 219 |
| Example 26 | 283 | 267 | 247 | 233 | 225 | 219 | 219 | 220 | 224 | 233 | 247 | 267 | 282 |
| Example 27 | 364 | 336 | 301 | 279 | 269 | 261 | 260 | 262 | 268 | 280 | 301 | 336 | 363 |
| Example 28 | 187 | 166 | 134 | 117 | 106 | 101 | 100 | 101 | 106 | 117 | 134 | 166 | 187 |
| Example 29 | 187 | 169 | 140 | 122 | 111 | 103 | 102 | 103 | 111 | 122 | 140 | 170 | 187 |
| Example 30 | 187 | 150 | 121 | 110 | 103 | 101 | 100 | 101 | 103 | 110 | 121 | 150 | 187 |
| Example 31 | 187 | 174 | 150 | 133 | 118 | 105 | 103 | 105 | 118 | 133 | 150 | 173 | 188 |
| Example 32 | 187 | 178 | 160 | 142 | 123 | 107 | 104 | 107 | 124 | 142 | 160 | 178 | 189 |
| Example 33 | 187 | 147 | 117 | 104 | 102 | 101 | 100 | 101 | 102 | 104 | 117 | 146 | 187 |
| Example 34 | 186 | 167 | 134 | 117 | 105 | 101 | 100 | 101 | 105 | 117 | 135 | 166 | 187 |
| Example 35 | 93 | 26 | 74 | 66 | 63 | 61 | 61 | 61 | 63 | 66 | 74 | 86 | 93 |
| Example 36 | 133 | 124 | 105 | 92 | 85 | 80 | 80 | 80 | 85 | 92 | 105 | 123 | 133 |
| Example 37 | 272 | 195 | 135 | 128 | 122 | 120 | 120 | 120 | 122 | 128 | 135 | 196 | 271 |
| Example 38 | 162 | 147 | 127 | 111 | 104 | 100 | 100 | 100 | 104 | 111 | 127 | 147 | 162 |
| Example 39 | 145 | 140 | 129 | 116 | 108 | 102 | 100 | 102 | 108 | 117 | 129 | 140 | 145 |
| Example 40 | 110 | 105 | 96 | 89 | 83 | 80 | 80 | 80 | 83 | 89 | 96 | 105 | 110 |
| Example 41 | 186 | 171 | 148 | 133 | 124 | 120 | 120 | 120 | 124 | 133 | 147 | 171 | 187 |
| Example 42 | 281 | 215 | 183 | 163 | 153 | 151 | 150 | 150 | 153 | 163 | 184 | 215 | 281 |
| Example 43 | 133 | 127 | 116 | 107 | 102 | 100 | 100 | 100 | 102 | 107 | 116 | 127 | 133 |
| Example 44 | 123 | 119 | 111 | 105 | 102 | 100 | 100 | 100 | 102 | 105 | 111 | 119 | 123 |
| Example 45 | 96 | 93 | 87 | 83 | 81 | 80 | 80 | 80 | 81 | 83 | 87 | 93 | 96 |
| Example 46 | 153 | 146 | 136 | 128 | 122 | 119 | 119 | 120 | 122 | 127 | 136 | 147 | 153 |
| Example 47 | 226 | 207 | 187 | 174 | 166 | 160 | 160 | 160 | 165 | 174 | 188 | 208 | 225 |
| Example 48 | 305 | 288 | 259 | 231 | 211 | 192 | 190 | 193 | 210 | 232 | 259 | 289 | 305 |
| Example 49 | 116 | 113 | 108 | 104 | 101 | 100 | 100 | 100 | 101 | 104 | 108 | 113 | 116 |
| Example 50 | 188 | 164 | 133 | 116 | 105 | 100 | 100 | 100 | 105 | 116 | 133 | 165 | 187 |
| Example 51 | 187 | 164 | 133 | 115 | 105 | 100 | 100 | 100 | 105 | 115 | 133 | 165 | 187 |
| Example 52 | 186 | 166 | 134 | 115 | 105 | 100 | 100 | 100 | 105 | 115 | 134 | 166 | 187 |
| Example 53 | 187 | 165 | 133 | 115 | 104 | 100 | 100 | 100 | 104 | 115 | 133 | 165 | 187 |
| Example 54 | 188 | 165 | 132 | 115 | 106 | 100 | 100 | 100 | 106 | 115 | 132 | 165 | 187 |
| Example 55 | 272 | 250 | 208 | 168 | 135 | 121 | 120 | 120 | 135 | 168 | 208 | 250 | 271 |

TABLE 5

| | Average film thickness of charge generating layer in each region in axial direction of cylindrical support [nm] | | | | | | | | | | | | |
|---|---|---|---|---|---|---|---|---|---|---|---|---|
| | $Y = -108$ mm | $Y = -97.2$ mm | $Y = -75.6$ mm | $Y = -54$ mm | $Y = -32.4$ mm | $Y = -10.8$ mm | $Y = 0$ mm $d_0$ | $Y = 10.8$ mm $d_1$ | $Y = 32.4$ mm $d_2$ | $Y = 54$ mm $d_3$ | $Y = 75.6$ mm $d_4$ | $Y = 97.2$ mm $d_5$ | $Y = 108$ mm $d_6$ |
| Example 56 | 165 | 148 | 120 | 103 | 94 | 90 | 90 | 90 | 94 | 103 | 119 | 147 | 166 |
| Example 57 | 167 | 155 | 135 | 120 | 107 | 95 | 92 | 95 | 107 | 120 | 136 | 155 | 166 |
| Example 58 | 165 | 130 | 104 | 96 | 92 | 90 | 90 | 90 | 92 | 96 | 104 | 130 | 166 |
| Example 59 | 166 | 146 | 118 | 102 | 94 | 90 | 90 | 90 | 94 | 102 | 118 | 146 | 166 |
| Example 60 | 145 | 132 | 113 | 101 | 94 | 90 | 90 | 90 | 94 | 101 | 114 | 133 | 145 |
| Example 61 | 103 | 97 | 84 | 77 | 73 | 70 | 70 | 70 | 73 | 77 | 84 | 97 | 104 |
| Example 62 | 198 | 176 | 143 | 124 | 115 | 110 | 110 | 110 | 115 | 124 | 143 | 176 | 199 |
| Example 63 | 294 | 206 | 141 | 133 | 132 | 131 | 130 | 130 | 132 | 133 | 140 | 206 | 295 |
| Example 64 | 130 | 118 | 105 | 97 | 93 | 90 | 90 | 90 | 93 | 97 | 105 | 118 | 130 |
| Example 65 | 118 | 114 | 104 | 96 | 92 | 90 | 90 | 90 | 92 | 96 | 104 | 114 | 119 |
| Example 66 | 111 | 107 | 100 | 95 | 92 | 90 | 90 | 90 | 92 | 95 | 100 | 107 | 111 |
| Example 67 | 104 | 101 | 96 | 93 | 91 | 90 | 90 | 90 | 91 | 93 | 96 | 101 | 104 |
| Example 68 | 175 | 158 | 130 | 112 | 105 | 101 | 100 | 101 | 105 | 113 | 130 | 158 | 176 |
| Example 69 | 176 | 149 | 126 | 108 | 103 | 100 | 100 | 100 | 103 | 108 | 125 | 149 | 176 |
| Example 70 | 175 | 163 | 138 | 121 | 109 | 102 | 100 | 102 | 109 | 121 | 139 | 163 | 176 |
| Example 71 | 177 | 163 | 146 | 131 | 116 | 103 | 101 | 104 | 117 | 131 | 146 | 164 | 176 |
| Example 72 | 177 | 166 | 149 | 134 | 120 | 106 | 102 | 106 | 120 | 134 | 149 | 166 | 176 |
| Example 73 | 176 | 140 | 118 | 107 | 102 | 100 | 100 | 100 | 102 | 107 | 118 | 140 | 176 |
| Example 74 | 157 | 141 | 120 | 108 | 103 | 101 | 100 | 101 | 103 | 108 | 120 | 141 | 156 |
| Example 75 | 140 | 132 | 118 | 109 | 103 | 100 | 100 | 100 | 103 | 109 | 118 | 132 | 141 |
| Example 76 | 141 | 130 | 117 | 108 | 103 | 100 | 100 | 100 | 103 | 108 | 117 | 131 | 141 |
| Example 77 | 108 | 103 | 95 | 89 | 84 | 81 | 80 | 81 | 84 | 89 | 95 | 103 | 108 |
| Example 78 | 180 | 167 | 146 | 130 | 123 | 120 | 120 | 120 | 123 | 130 | 145 | 167 | 179 |
| Example 79 | 288 | 252 | 205 | 179 | 165 | 162 | 160 | 161 | 164 | 179 | 205 | 251 | 288 |
| Example 80 | 130 | 116 | 107 | 103 | 101 | 100 | 100 | 100 | 101 | 103 | 107 | 116 | 130 |
| Example 81 | 122 | 117 | 110 | 105 | 102 | 100 | 100 | 100 | 102 | 105 | 110 | 117 | 122 |
| Example 82 | 109 | 104 | 98 | 94 | 91 | 90 | 90 | 90 | 91 | 94 | 98 | 104 | 108 |
| Example 83 | 165 | 157 | 147 | 139 | 133 | 130 | 130 | 130 | 133 | 138 | 146 | 158 | 165 |
| Example 84 | 235 | 221 | 199 | 183 | 175 | 169 | 169 | 170 | 174 | 184 | 199 | 222 | 235 |

TABLE 5-continued

Average film thickness of charge generating layer in each region in axial direction of cylindrical support [nm]

| | Y = -108 mm | Y = -97.2 mm | Y = -75.6 mm | Y = -54 mm | Y = -32.4 mm | Y = -10.8 mm | Y = 0 mm $d_0$ | Y = 10.8 mm $d_1$ | Y = 32.4 mm $d_2$ | Y = 54 mm $d_3$ | Y = 75.6 mm $d_4$ | Y = 97.2 mm $d_5$ | Y = 108 mm $d_6$ |
|---|---|---|---|---|---|---|---|---|---|---|---|---|---|
| Example 85 | 115 | 112 | 107 | 103 | 101 | 100 | 100 | 100 | 101 | 103 | 107 | 112 | 115 |
| Example 86 | 101 | 100 | 100 | 100 | 100 | 100 | 100 | 101 | 104 | 112 | 127 | 149 | 164 |
| Example 87 | 149 | 127 | 112 | 104 | 101 | 101 | 102 | 104 | 112 | 127 | 149 | 174 | 191 |

TABLE 6

Average film thickness of charge generating layer in each region in axial direction of cylindrical support [nm]

| | Y = -108 mm | Y = -97.2 mm | Y = -75.6 mm | Y = -54 mm | Y = -32.4 mm | Y = -10.8 mm | Y = 0 mm $d_0$ | Y = 10.8 mm $d_1$ | Y = 32.4 mm $d_2$ | Y = 54 mm $d_3$ | Y = 75.6 mm $d_4$ | Y = 97.2 mm $d_5$ | Y = 108 mm $d_6$ |
|---|---|---|---|---|---|---|---|---|---|---|---|---|---|
| Comparative Example 1 | 356 | 285 | 194 | 155 | 142 | 140 | 140 | 140 | 143 | 156 | 194 | 285 | 356 |
| Comparative Example 2 | 357 | 290 | 195 | 154 | 143 | 141 | 140 | 141 | 152 | 168 | 208 | 290 | 356 |
| Comparative Example 3 | 398 | 318 | 220 | 176 | 163 | 161 | 160 | 161 | 164 | 178 | 221 | 319 | 398 |
| Comparative Example 4 | 309 | 248 | 172 | 136 | 124 | 120 | 120 | 120 | 124 | 137 | 172 | 248 | 309 |
| Comparative Example 5 | 309 | 247 | 172 | 137 | 124 | 120 | 120 | 120 | 123 | 136 | 170 | 246 | 307 |
| Comparative Example 6 | 240 | 207 | 165 | 140 | 125 | 121 | 120 | 121 | 125 | 138 | 164 | 208 | 240 |
| Comparative Example 7 | 417 | 318 | 207 | 162 | 152 | 146 | 145 | 146 | 152 | 162 | 207 | 318 | 417 |
| Comparative Example 8 | 225 | 203 | 173 | 158 | 145 | 141 | 140 | 141 | 146 | 157 | 172 | 203 | 224 |
| Comparative Example 9 | 180 | 171 | 158 | 149 | 142 | 140 | 140 | 140 | 142 | 149 | 158 | 171 | 180 |
| Comparative Example 10 | 301 | 280 | 244 | 224 | 206 | 201 | 200 | 201 | 207 | 223 | 245 | 282 | 302 |
| Comparative Example 11 | 405 | 360 | 292 | 254 | 223 | 202 | 200 | 202 | 224 | 253 | 293 | 362 | 406 |
| Comparative Example 12 | 405 | 375 | 316 | 271 | 229 | 204 | 200 | 204 | 228 | 270 | 317 | 374 | 406 |
| Comparative Example 13 | 234 | 217 | 194 | 177 | 166 | 161 | 160 | 161 | 166 | 177 | 194 | 217 | 234 |
| Comparative Example 14 | 374 | 341 | 295 | 268 | 247 | 240 | 240 | 241 | 248 | 267 | 296 | 340 | 374 |
| Comparative Example 15 | 456 | 417 | 351 | 318 | 295 | 282 | 280 | 281 | 295 | 318 | 351 | 415 | 454 |
| Comparative Example 16 | 300 | 277 | 229 | 198 | 175 | 161 | 160 | 161 | 175 | 199 | 230 | 276 | 301 |
| Comparative Example 17 | 542 | 465 | 365 | 301 | 263 | 243 | 240 | 242 | 263 | 301 | 365 | 466 | 540 |
| Comparative Example 18 | 744 | 615 | 462 | 361 | 309 | 281 | 280 | 282 | 310 | 360 | 460 | 614 | 742 |
| Comparative Example 19 | 342 | 319 | 274 | 239 | 214 | 200 | 200 | 201 | 214 | 240 | 274 | 318 | 343 |
| Comparative Example 20 | 304 | 289 | 261 | 236 | 214 | 202 | 200 | 201 | 214 | 236 | 261 | 288 | 304 |
| Comparative Example 21 | 432 | 391 | 323 | 264 | 222 | 202 | 200 | 202 | 223 | 263 | 322 | 391 | 431 |
| Comparative Example 22 | 356 | 334 | 291 | 252 | 221 | 201 | 200 | 201 | 221 | 251 | 291 | 332 | 356 |
| Comparative Example 23 | 296 | 281 | 252 | 229 | 209 | 201 | 200 | 201 | 210 | 228 | 251 | 281 | 296 |
| Comparative Example 24 | 427 | 376 | 310 | 264 | 235 | 222 | 220 | 222 | 235 | 265 | 309 | 376 | 425 |
| Comparative Example 25 | 363 | 336 | 292 | 260 | 235 | 221 | 220 | 222 | 234 | 259 | 293 | 337 | 365 |
| Comparative Example 26 | 313 | 300 | 272 | 247 | 231 | 221 | 220 | 221 | 230 | 248 | 272 | 299 | 312 |
| Comparative Example 27 | 60 | 60 | 60 | 60 | 60 | 60 | 60 | 60 | 60 | 60 | 60 | 60 | 60 |
| Comparative Example 28 | 101 | 101 | 100 | 100 | 100 | 100 | 100 | 100 | 100 | 100 | 100 | 101 | 101 |
| Comparative Example 29 | 140 | 142 | 142 | 140 | 140 | 140 | 140 | 140 | 140 | 140 | 141 | 142 | 141 |
| Comparative Example 30 | 60 | 60 | 60 | 60 | 60 | 60 | 60 | 60 | 60 | 60 | 60 | 60 | 60 |
| Comparative Example 31 | 101 | 101 | 100 | 100 | 101 | 100 | 100 | 100 | 101 | 100 | 100 | 101 | 101 |
| Comparative Example 32 | 141 | 141 | 141 | 141 | 140 | 140 | 140 | 141 | 141 | 141 | 141 | 141 | 141 |
| Comparative Example 33 | 131 | 130 | 131 | 130 | 130 | 129 | 130 | 130 | 130 | 131 | 130 | 130 | 130 |
| Comparative Example 34 | 80 | 80 | 80 | 80 | 80 | 80 | 80 | 80 | 80 | 80 | 80 | 80 | 80 |
| Comparative Example 35 | 120 | 120 | 120 | 120 | 120 | 120 | 120 | 120 | 120 | 120 | 120 | 120 | 120 |
| Comparative Example 36 | 160 | 160 | 160 | 160 | 160 | 60 | 160 | 160 | 160 | 160 | 160 | 60 | 160 |
| Comparative Example 37 | 121 | 122 | 121 | 120 | 20 | 120 | 120 | 120 | 120 | 120 | 121 | 121 | 121 |
| Comparative Example 38 | 243 | 241 | 240 | 241 | 240 | 241 | 240 | 240 | 241 | 241 | 241 | 241 | 242 |
| Comparative Example 39 | 241 | 239 | 239 | 241 | 239 | 239 | 240 | 240 | 240 | 240 | 240 | 240 | 241 |
| Comparative Example 40 | 239 | 240 | 240 | 240 | 242 | 240 | 240 | 240 | 241 | 240 | 240 | 240 | 240 |

TABLE 7

| | Type of charge generating material | Content of compound (A1) [% by mass] | Absorption coefficient β [nm$^{-1}$] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| | | | | | | Calculated value of file thickness of charge generating layer in each region according to expression (E2) [nm] | | | | | |
| Example 1 | HOGaPc | 0.0 | 0.0038 | 1.34 | 64 | 100 | 104 | 113 | 127 | 149 | OK in all regions |
| Example 2 | HOGaPc | 0.0 | 0.0038 | 1.34 | 64 | 100 | 104 | 113 | 127 | 149 | OK in all regions |
| Example 3 | HOGaPc | 0.0 | 0.0038 | 1.34 | 64 | 100 | 104 | 113 | 127 | 149 | OK in all regions |
| Example 4 | HOGaPc | 0.0 | 0.0038 | 1.34 | 64 | 100 | 104 | 113 | 127 | 149 | NG near d3 |
| Example 5 | HOGaPc | 0.0 | 0.0038 | 1.34 | 64 | 100 | 104 | 113 | 127 | 149 | NG near d3 and d4 |
| Example 6 | HOGaPc | 0.0 | 0.0038 | 1.34 | 64 | 100 | 104 | 113 | 127 | 149 | NG near d4 and d5 |

TABLE 7-continued

| | Type of charge generating material | Content of compound (A1) [% by mass] | Absorption coefficient β [nm⁻¹] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| | | | | | | Calculated value of file thickness of charge generating layer in each region according to expression (E2) [nm] | | | | | |
| Example 7 | HOGaPc | 0.0 | 0.0038 | 1.34 | 64 | 100 | 104 | 113 | 127 | 149 | OK in all regions |
| Example 8 | HOGaPc | 0.0 | 0.0038 | 1.34 | 29 | 60 | 62 | 67 | 73 | 83 | OK in all regions |
| Example 9 | HOGaPc | 0.0 | 0.0038 | 1.34 | 44 | 80 | 83 | 90 | 100 | 115 | OK in all regions |
| Example 10 | HOGaPc | 0.0 | 0.0038 | 1.34 | 92 | 121 | 126 | 137 | 157 | 190 | NG near d4 |
| Example 11 | HOGaPc | 0.0 | 0.0038 | 1.33 | 134 | 142 | 148 | 162 | 190 | 239 | OK in all regions |
| Example 12 | HOGaPc | 0.0 | 0.0038 | 1.27 | 48 | 100 | 104 | 110 | 121 | 138 | OK in all regions |
| Example 13 | HOGaPc | 0.0 | 0.0038 | 1.21 | 36 | 100 | 103 | 108 | 116 | 128 | OK in all regions |
| Example 14 | HOGaPc | 0.0 | 0.0038 | 1.16 | 27 | 100 | 102 | 106 | 113 | 121 | OK in all regions |
| Example 15 | HOGaPc | 0.0 | 0.0038 | 1.16 | 26 | 101 | 103 | 107 | 113 | 122 | OK in all regions |
| Example 16 | HOGaPc | 0.0 | 0.0038 | 1.16 | 27 | 100 | 102 | 106 | 113 | 121 | NG near d3 and d4 |
| Example 17 | HOGaPc | 0.0 | 0.0038 | 1.16 | 27 | 100 | 102 | 106 | 113 | 121 | NG near d4 and d5 |
| Example 18 | HOGaPc | 0.0 | 0.0038 | 1.16 | 19 | 80 | 82 | 84 | 89 | 95 | OK in all regions |
| Example 19 | HOGaPc | 0.0 | 0.0038 | 1.16 | 36 | 120 | 123 | 128 | 136 | 148 | OK in all regions |
| Example 20 | HOGaPc | 0.0 | 0.0038 | 1.16 | 63 | 161 | 165 | 174 | 188 | 210 | OK in all regions |
| Example 21 | HOGaPc | 0.0 | 0.0038 | 1.16 | 114 | 201 | 206 | 219 | 244 | 285 | OK in all regions |
| Example 22 | HOGaPc | 0.0 | 0.0038 | 1.12 | 20 | 100 | 102 | 105 | 109 | 116 | OK in all regions |
| Example 23 | HOGaPc | 0.0 | 0.0038 | 1.09 | 14 | 100 | 101 | 103 | 107 | 111 | OK in all regions |
| Example 24 | HOGaPc | 0.0 | 0.0038 | 1.09 | 24 | 140 | 142 | 146 | 151 | 159 | OK in all regions |
| Example 25 | HOGaPc | 0.0 | 0.0038 | 1.09 | 39 | 180 | 183 | 189 | 198 | 211 | NG near d5 |
| Example 26 | HOGaPc | 0.0 | 0.0038 | 1.09 | 63 | 219 | 223 | 232 | 246 | 268 | OK in all regions |
| Example 27 | HOGaPc | 0.0 | 0.0038 | 1.09 | 103 | 261 | 266 | 278 | 300 | 337 | OK in all regions |
| Example 28 | HOGaPc | 1.4 | 0.0050 | 1.34 | 87 | 100 | 105 | 115 | 133 | 165 | OK in all regions |
| Example 29 | HOGaPc | 1.4 | 0.0050 | 1.33 | 85 | 102 | 107 | 117 | 135 | 165 | OK in all regions |
| Example 30 | HOGaPc | 1.4 | 0.0050 | 1.34 | 87 | 100 | 105 | 115 | 133 | 165 | OK in all regions |
| Example 31 | HOGaPc | 1.4 | 0.0050 | 1.32 | 85 | 103 | 108 | 118 | 136 | 166 | OK in all regions |
| Example 32 | HOGaPc | 1.4 | 0.0050 | 1.32 | 85 | 104 | 109 | 119 | 137 | 167 | NG near d3 and d4 |
| Example 33 | HOGaPc | 1.4 | 0.0050 | 1.34 | 87 | 100 | 105 | 115 | 133 | 165 | NG near d5 |
| Example 34 | HOGaPc | 1.4 | 0.0050 | 1.34 | 87 | 100 | 105 | 115 | 133 | 165 | OK in all regions |
| Example 35 | HOGaPc | 1.4 | 0.0050 | 1.33 | 32 | 61 | 63 | 68 | 75 | 86 | OK in all regions |
| Example 36 | HOGaPc | 1.4 | 0.0050 | 1.34 | 53 | 80 | 84 | 91 | 102 | 121 | OK in all regions |
| Example 37 | HOGaPc | 1.4 | 0.0050 | 1.34 | 151 | 120 | 124 | 137 | 166 | 225 | NG near d4 |
| Example 38 | HOGaPc | 1.4 | 0.0050 | 1.27 | 62 | 100 | 104 | 112 | 126 | 147 | OK in all regions |
| Example 39 | HOGaPc | 1.4 | 0.0050 | 1.21 | 45 | 100 | 103 | 109 | 120 | 135 | NG near d4 |
| Example 40 | HOGaPc | 1.4 | 0.0050 | 1.21 | 30 | 80 | 82 | 87 | 94 | 104 | OK in all regions |
| Example 41 | HOGaPc | 1.4 | 0.0050 | 1.21 | 67 | 120 | 124 | 133 | 147 | 171 | OK in all regions |
| Example 42 | HOGaPc | 1.4 | 0.0050 | 1.21 | 131 | 150 | 155 | 167 | 193 | 243 | NG near d5 |
| Example 43 | HOGaPc | 1.4 | 0.0050 | 1.16 | 33 | 100 | 103 | 107 | 115 | 126 | OK in all regions |
| Example 44 | HOGaPc | 1.4 | 0.0050 | 1.12 | 23 | 100 | 102 | 105 | 111 | 118 | OK in all regions |
| Example 45 | HOGaPc | 1.4 | 0.0050 | 1.12 | 16 | 80 | 81 | 84 | 88 | 93 | OK in all regions |
| Example 46 | HOGaPc | 1.4 | 0.0050 | 1.13 | 34 | 199 | 122 | 126 | 134 | 146 | OK in all regions |
| Example 47 | HOGaPc | 1.4 | 0.0050 | 1.12 | 65 | 160 | 164 | 172 | 187 | 209 | OK in all regions |
| Example 48 | HOGaPc | 1.4 | 0.0050 | 1.12 | 115 | 191 | 195 | 206 | 230 | 273 | NG near d3 and d4 |
| Example 49 | HOGaPc | 1.4 | 0.0050 | 1.09 | 16 | 100 | 101 | 104 | 108 | 113 | OK in all regions |
| Example 50 | HOGaPc | 0.9 | 0.0050 | 1.34 | 87 | 100 | 105 | 115 | 133 | 165 | OK in all regions |
| Example 51 | HOGaPc | 2.1 | 0.0050 | 1.34 | 87 | 100 | 105 | 115 | 133 | 165 | OK in all regions |
| Example 52 | HOGaPc | 2.9 | 0.0050 | 1.34 | 87 | 100 | 105 | 115 | 133 | 165 | OK in all regions |
| Example 53 | HOGaPc | 3.1 | 0.0050 | 1.34 | 87 | 100 | 105 | 115 | 133 | 165 | OK in all regions |
| Example 54 | HOGaPc | 3.9 | 0.0050 | 1.34 | 87 | 100 | 105 | 115 | 133 | 165 | OK in all regions |
| Example 55 | HOGaPc | 3.9 | 0.0050 | 1.34 | 151 | 120 | 124 | 137 | 166 | 225 | NG near d3 and d4 |

TABLE 8

| | Type of charge generating material | Content of compound (A1) [% by mass] | Absorption coefficient β [nm⁻¹] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| | | | | | | Calculated value of file thickness of charge generating layer in each region according to expression (E2) [nm] | | | | | |
| Example 56 | TiOPc | 0.0 | 0.0054 | 1.34 | 76 | 90 | 94 | 103 | 119 | 147 | OK in all regions |
| Example 57 | TiOPc | 0.0 | 0.0054 | 1.32 | 74 | 92 | 96 | 105 | 121 | 147 | NG near d3 and d4 |
| Example 58 | TiOPc | 0.0 | 0.0054 | 1.34 | 76 | 90 | 94 | 103 | 119 | 147 | NG near d4 and d5 |
| Example 59 | TiOPc | 0.0 | 0.0054 | 1.34 | 76 | 90 | 94 | 103 | 119 | 147 | OK in all regions |
| Example 60 | TiOPc | 0.0 | 0.0054 | 1.27 | 55 | 90 | 94 | 101 | 113 | 132 | OK in all regions |
| Example 61 | TiOPc | 0.0 | 0.0054 | 1.27 | 34 | 70 | 73 | 77 | 85 | 97 | OK in all regions |
| Example 62 | TiOPc | 0.0 | 0.0054 | 1.27 | 89 | 110 | 115 | 124 | 143 | 176 | OK in all regions |
| Example 63 | TiOPc | 0.0 | 0.0054 | 1.27 | 165 | 130 | 133 | 144 | 174 | 241 | NG near d4 and d5 |
| Example 64 | TiOPc | 0.0 | 0.0054 | 1.21 | 40 | 90 | 93 | 98 | 107 | 121 | OK in all regions |

TABLE 8-continued

|  | Type of charge generating material | Content of compound (A1) [% by mass] | Absorption coefficient β [nm⁻¹] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| Example 65 | TiOPc | 0.0 | 0.0054 | 1.16 | 29 | 90 | 92 | 96 | 103 | 113 | NG near d4 |
| Example 66 | TiOPc | 0.0 | 0.0054 | 1.12 | 21 | 90 | 92 | 95 | 100 | 107 | OK in all regions |
| Example 67 | TiOPc | 0.0 | 0.0054 | 1.09 | 14 | 90 | 91 | 93 | 97 | 101 | OK in all regions |
| Example 68 | ClGaPc(9) | 0.0 | 0.0045 | 1.34 | 76 | 101 | 105 | 114 | 131 | 158 | OK in all regions |
| Example 69 | ClGaPc(9) | 0.0 | 0.0045 | 1.34 | 76 | 101 | 105 | 114 | 131 | 158 | OK in all regions |
| Example 70 | ClGaPc(9) | 0.0 | 0.0045 | 1.34 | 76 | 101 | 105 | 114 | 131 | 158 | OK in all regions |
| Example 71 | ClGaPc(9) | 0.0 | 0.0045 | 1.33 | 75 | 101 | 106 | 115 | 131 | 158 | NG near d3 |
| Example 72 | ClGaPc(9) | 0.0 | 0.0045 | 1.32 | 74 | 102 | 107 | 116 | 132 | 158 | NG near d3 and d4 |
| Example 73 | ClGaPc(9) | 0.0 | 0.0045 | 1.34 | 76 | 101 | 105 | 114 | 131 | 158 | NG near d5 |
| Example 74 | ClGaPc(9) | 0.0 | 0.0045 | 1.27 | 56 | 100 | 104 | 111 | 124 | 143 | OK in all regions |
| Example 75 | ClGaPc(9) | 0.0 | 0.0045 | 1.21 | 41 | 100 | 103 | 109 | 118 | 132 | OK in all regions |
| Example 76 | ClGaPc(9) | 0.0 | 0.0045 | 1.21 | 41 | 100 | 103 | 109 | 118 | 132 | OK in all regions |
| Example 77 | ClGaPc(9) | 0.0 | 0.0045 | 1.21 | 28 | 80 | 82 | 86 | 93 | 102 | OK in all regions |
| Example 78 | ClGaPc(9) | 0.0 | 0.0045 | 1.21 | 59 | 120 | 124 | 132 | 145 | 165 | OK in all regions |
| Example 79 | ClGaPc(9) | 0.0 | 0.0045 | 1.21 | 128 | 161 | 165 | 178 | 204 | 252 | OK in all regions |
| Example 80 | ClGaPc(9) | 0.0 | 0.0045 | 1.16 | 30 | 100 | 102 | 107 | 114 | 124 | NG near d4 and d5 |
| Example 81 | ClGaPc(9) | 0.0 | 0.0045 | 1.12 | 22 | 100 | 102 | 105 | 110 | 117 | OK in all regions |
| Example 82 | ClGaPc(9) | 0.0 | 0.0045 | 1.12 | 18 | 90 | 92 | 94 | 98 | 104 | OK in all regions |
| Example 83 | ClGaPc(9) | 0.0 | 0.0045 | 1.12 | 35 | 130 | 133 | 138 | 146 | 158 | OK in all regions |
| Example 84 | ClGaPc(9) | 0.0 | 0.0045 | 1.13 | 66 | 169 | 173 | 182 | 196 | 219 | OK in all regions |
| Example 85 | ClGaPc(9) | 0.0 | 0.0045 | 1.09 | 15 | 100 | 101 | 104 | 107 | 112 | OK in all regions |
| Example 86 | HOGaPc | 0.0 | 0.0038 | 1.34 | 64 | 100 | 104 | 113 | 127 | 149 | OK in all regions |
| Example 87 | HOGaPc | 0.0 | 0.0038 | 1.42 | 89 | 103 | 108 | 119 | 138 | 169 | OK in all regions |

TABLE 9

|  | Type of charge generating material | Content of compound (A1) [% by mass] | Absorption coefficient β [nm⁻¹] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| Comparative Example 1 | ClGaPc(10) | 0.0 | 0.0045 | 1.34 | 216 | 140 | 142 | 155 | 193 | 283 | OK in all regions |
| Comparative Example 2 | ClGaPc(10) | 0.0 | 0.0045 | 1.34 | 216 | 140 | 142 | 155 | 193 | 283 | NG near d3 and d4 |
| Comparative Example 3 | ClGaPc(10) | 0.0 | 0.0039 | 1.34 | 238 | 160 | 163 | 178 | 221 | 319 | OK in all regions |
| Comparative Example 4 | ClGaPc(10) | 0.0 | 0.0045 | 1.42 | 189 | 120 | 124 | 137 | 172 | 248 | OK in all regions |
| Comparative Example 5 | ClGaPc(10) | 0.0 | 0.0045 | 1.42 | 187 | 120 | 124 | 137 | 172 | 247 | OK in all regions |
| Comparative Example 6 | ClGaPc(10) | 0.0 | 0.0045 | 1.34 | 120 | 121 | 125 | 138 | 163 | 207 | OK in all regions |
| Comparative Example 7 | ClGaPc(10) | 0.0 | 0.0045 | 1.34 | 272 | 144 | 142 | 151 | 195 | 314 | OK in all regions |
| Comparative Example 8 | ClGaPc(10) | 0.0 | 0.0045 | 1.21 | 84 | 141 | 145 | 155 | 173 | 203 | OK in all regions |
| Comparative Example 9 | ClGaPc(10) | 0.0 | 0.0045 | 1.12 | 40 | 140 | 143 | 149 | 158 | 171 | OK in all regions |
| Comparative Example 10 | Disazo (C1) | 0.0 | 0.0013 | 1.34 | 102 | 201 | 208 | 223 | 247 | 281 | OK in all regions |
| Comparative Example 11 | Disazo (C1) | 0.0 | 0.0013 | 1.61 | 206 | 202 | 214 | 241 | 287 | 358 | OK in all regions |
| Comparative Example 12 | Disazo (C1) | 0.0 | 0.0013 | 1.61 | 206 | 202 | 214 | 241 | 287 | 358 | NG near d3 and d4 |
| Comparative Example 13 | Disazo (C1) | 0.0 | 0.0013 | 1.34 | 74 | 161 | 166 | 177 | 194 | 219 | OK in all regions |
| Comparative Example 14 | Disazo (C1) | 0.0 | 0.0013 | 1.34 | 134 | 241 | 250 | 269 | 300 | 345 | OK in all regions |
| Comparative Example 15 | Disazo (C1) | 0.0 | 0.0013 | 1.34 | 174 | 281 | 292 | 316 | 355 | 415 | OK in all regions |
| Comparative Example 16 | Disazo (C1) | 0.0 | 0.0013 | 1.59 | 141 | 161 | 171 | 190 | 223 | 270 | NG near d3, d4 and d5 |
| Comparative Example 17 | Disazo (C1) | 0.0 | 0.0013 | 1.63 | 300 | 242 | 257 | 293 | 358 | 465 | NG near d2, d3 and d4 |
| Comparative Example 18 | Disazo (C1) | 0.0 | 0.0013 | 1.65 | 462 | 282 | 299 | 343 | 437 | 612 | NG near d2, d3 and d4 |
| Comparative Example 19 | Disazo (C1) | 0.0 | 0.0013 | 1.46 | 143 | 201 | 211 | 231 | 263 | 312 | NG near d3, d4 and d5 |
| Comparative Example 20 | Disazo (C1) | 0.0 | 0.0013 | 1.35 | 104 | 201 | 208 | 223 | 247 | 282 | NG near d3 and d4 |
| Comparative Example 21 | Disazo (C1) | 0.0 | 0.0015 | 1.61 | 231 | 202 | 214 | 243 | 293 | 375 | NG near d3, d4 and d5 |
| Comparative Example 22 | Disazo (C1) | 0.0 | 0.0015 | 1.45 | 156 | 201 | 211 | 232 | 267 | 321 | NG near d4 |
| Comparative Example 23 | Disazo (C1) | 0.0 | 0.0015 | 1.30 | 96 | 201 | 208 | 221 | 244 | 276 | NG near d3, d4 and d5 |
| Comparative Example 24 | Trisazo | 0.0 | 0.0010 | 1.61 | 205 | 222 | 235 | 263 | 310 | 380 | NG near d5 |
| Comparative Example 25 | Trisazo | 0.0 | 0.0010 | 1.46 | 145 | 221 | 231 | 252 | 286 | 334 | NG near d3 and d4 |
| Comparative Example 26 | Trisazo | 0.0 | 0.0010 | 1.30 | 92 | 221 | 228 | 241 | 263 | 293 | NG near d4 |
| Comparative Example 27 | HOGaPc | 0.0 | 0.0038 | 1.00 | 0 | 60 | 60 | 60 | 60 | 60 | OK in all regions |
| Comparative Example 28 | HOGaPc | 0.0 | 0.0038 | 1.01 | 1 | 100 | 100 | 100 | 100 | 101 | OK in all regions |
| Comparative Example 29 | HOGaPc | 0.0 | 0.0038 | 1.00 | 1 | 140 | 140 | 140 | 140 | 141 | OK in all regions |
| Comparative Example 30 | HOGaPc | 1.4 | 0.0050 | 1.00 | 0 | 60 | 60 | 60 | 60 | 60 | OK in all regions |
| Comparative Example 31 | HOGaPc | 1.4 | 0.0050 | 1.01 | 1 | 100 | 100 | 100 | 100 | 101 | OK in all regions |
| Comparative Example 32 | HOGaPc | 1.4 | 0.0050 | 1.00 | 1 | 140 | 140 | 140 | 140 | 141 | OK in all regions |
| Comparative Example 33 | TiOPc | 0.0 | 0.0054 | 1.00 | 0 | 130 | 130 | 130 | 130 | 130 | OK in all regions |
| Comparative Example 34 | ClGaPc(9) | 0.0 | 0.0045 | 1.00 | 0 | 80 | 80 | 80 | 80 | 80 | OK in all regions |
| Comparative Example 35 | ClGaPc(9) | 0.0 | 0.0045 | 1.00 | 0 | 120 | 120 | 120 | 120 | 120 | OK in all regions |

TABLE 9-continued

| | Type of charge generating material | Content of compound (A1) [% by mass] | Absorption coefficient β [nm⁻¹] | Calculated value of expression (E1) | Δ = d6-d0 [nm] | Y = 10.8 mm | Y = 32.4 mm | Y = 54 mm | Y = 75.6 mm | Y = 97.2 mm | Whether film thickness of charge generating layer is between d − 0.2Δ and d ∥ 0.2Δ for calculated value d of expression (E2) |
|---|---|---|---|---|---|---|---|---|---|---|---|
| | | | | | | Calculated value of file thickness of charge generating layer in each region according to expression (E2) [nm] | | | | | |
| Comparative Example 36 | ClGaPc(9) | 0.0 | 0.0045 | 1.00 | 0 | 160 | 160 | 160 | 160 | 160 | OK in all regions |
| Comparative Example 37 | ClGaPc(10) | 0.0 | 0.0045 | 1.00 | 1 | 120 | 120 | 120 | 120 | 121 | OK in all regions |
| Comparative Example 38 | Disazo (C1) | 0.0 | 0.0013 | 1.01 | 2 | 240 | 240 | 240 | 241 | 242 | OK in all regions |
| Comparative Example 39 | Disazo (C2) | 0.0 | 0.0015 | 1.00 | 1 | 240 | 240 | 240 | 240 | 241 | OK in all regions |
| Comparative Example 40 | Trisazo | 0.0 | 0.0010 | 1.00 | 0 | 240 | 240 | 240 | 240 | 240 | OK in all regions |

[Evaluation]

The electrophotographic photosensitive members prepared as described above were evaluated as follows. The results are shown in Tables 10 to 12.

<Evaluation Apparatus>

Seven laser beam printers (trade name: Color Laser Jet CP3525dn) manufactured by Hewlett-Packard Company were prepared as the electrophotographic apparatus for evaluation, and modified for use as follows.

For the modification of the optical systems, in addition to the default machine with no modifications, laser beam printers with the scanning characteristic coefficient B and the geometrical feature of the laser scanning apparatus $\theta_{max}$ in the following expression (E8):

$$\theta_{max} = \frac{1}{B}\arccos\sqrt{r} \qquad (E8)$$

(B=0.55, $\theta_{max}$=30°), (B=0.55, $\theta_{max}$=35°), (B=0.55, $\theta_{max}$=40°), (B=0.55, $\theta_{max}$=45°), (B=0.5, $\theta_{max}$=50°) and (B=0.5, $\theta_{max}$=55°) were prepared.

In addition, each of the laser beam printers was modified to operate with a variable pre-exposure condition, charging condition and laser exposure value. Also, the electrophotographic photosensitive member produced as described above was attached to the process cartridge for cyan color and attached to the station of the process cartridge for cyan color. The printer was modified to operate without attaching the process cartridges for other colors (magenta, yellow and black) to the main body thereof.

For outputting images, only the process cartridge for cyan color was attached to the main body of the laser beam printer, and monochrome images were output only using the cyan toner.

<Evaluation of Uneven Solid Image Density>

The electrophotographic photosensitive members produced in Examples 1 to 87 and Comparative Examples 1 to 40 were attached to the above seven laser beam printers under the environment of normal temperature and normal humidity (temperature 23° C., relative humidity 50%), and the charger and the exposure value were set such that the initial dark part potential and bright part potential at the central position of the image forming area of the electrophotographic photosensitive members were −600 V and −150 V, respectively. The pre-exposure value was set to twice the exposure value. For measurement of the surface potential of the electrophotographic photosensitive members upon potential setting, the process cartridge, to the developing position of which a potential probe (trade name: model 6000B-8, manufactured by TREK JAPAN) was attached, was used, and a surface potentiometer (trade name: model 344, manufactured by TREK JAPAN) was used for the measurement for the potential in the central part of the image forming area of the electrophotographic photosensitive members.

Setting the above conditions, solid images were output, and the solid images were visually evaluated and ranked according to the following criteria.

A: There is no unevenness of density in the solid image.

B: There is almost no unevenness of density in the solid image.

C: The density near the end part of the solid image is dark or light.

D: The density near the end part of the solid image is extremely thin.

-: The density near the end part of the solid image is extremely thick.

Among the above ranks, "-: The density near the end part of the solid image is extremely thick" means that the ratio of the sensitivity of the end position to the central position of the image forming area of the electrophotographic photosensitive member of Examples is too large for the modified optical system of the evaluation apparatus. Accordingly, as long as the film thickness distribution of the charge generating layer is adjusted to be close to a certain value, "A: There is no unevenness of density in the solid image" can be achieved.

<Dark Decay Unevenness>

The electrophotographic photosensitive members produced in Examples 1 to 87 and Comparative Examples 1 to 40 were measured under the environment of normal temperature and normal humidity (temperature 23° C., relative humidity 50%), using a measuring apparatus for electrophotographic photosensitive members based on the direct voltage application system with curved NESA glass. Specifically, in the dark place at first, the surface of the electrophotographic photosensitive member was charged such that the surface potential of the electrophotographic photosensitive member became −500 [V] 0.1 seconds after the charging. Next, in the dark place, the decrement in the absolute value of the surface potential (unit: [V]) 1.0 second after the charging was measured, and the dark decay quantity was defined as Vdd.

Dividing the image forming area of the electrophotographic photosensitive member into eight equal sections in the circumferential direction and 25 equal sections in the axial direction, the above measurement was carried out for a total of 200 measurement points, and the average of the values of the dark decay quantity Vdd [V] for eight points in the circumferential direction was calculated. The difference between the maximum and minimum values in the data for the dark decay quantity Vdd for 25 points in the axial direction thus obtained was defined as the dark decay unevenness [V].

<Evaluation of End Part Leakage>

The end part leakage of each of Examples 1 to 87 and Comparative Examples 1 to 40 evaluated as follows, by attaching them to the modified laser beam printers shown in Table 10 to 12. At first, the charging potential was set to −550V under the environment of low temperature and low humidity (temperature 15° C., relative humidity 10%), and adjusted such that the surface potential after pre-exposure became −100V 0.1 seconds after pre-exposure and the bright part after exposure became −150V. In addition, the developing potential was adjusted to be −200V. With this setting, an image with 3 dots and 100 spaces of vertical line pattern was output on plain A4 size paper, and one solid white image for evaluation was output for every time 1,000 sheets passed.

Next, with respect to the obtained solid white images for evaluation, the number of blue spots present in an area that was 97.2 mm or more away from the central position of the image forming area in the axial direction of the electrophotographic photosensitive member, which corresponds to an area with a film thickness of the charge generating layer $d_5$, and that was converted into one perimeter of the electrophotographic receptor was counted. Upon this, the number of sheets passing through at which a solid white image with 10 or more blue spots was first obtained was defined as the leakage number.

TABLE 10

| | Presence or absence of uneven solid image density (B = 0.55) | | | | | | | Modified printer used for evaluation B = 0.55 $\theta_{max}$ | Dark decay unevenness [V] | End part leakage number D103 [sheets] |
|---|---|---|---|---|---|---|---|---|---|---|
| | $\theta_{max} = 30°$ | $\theta_{max} = 35°$ | $\theta_{max} = 40°$ | $\theta_{max} = 45°$ | $\theta_{max} = 50°$ | $\theta_{max} = 55°$ | Image characteristic/remarks for part with best evaluation for unevenness of density | | | |
| Example 1 | — | — | — | — | — | — | A | 55° | 4.8 | 30 |
| Example 2 | — | — | — | — | — | — | A | 55° | 4.8 | 30 |
| Example 3 | — | — | — | — | — | — | A | 55° | 4.8 | 30 |
| Example 4 | — | — | — | — | — | — | B | Slightly thick near d3 | 55° | 4.8 | 30 |
| Example 5 | — | — | — | — | — | — | B | Slightly thick near d3 | 55° | 4.9 | 30 |
| Example 6 | — | — | — | — | — | — | B | Slightly thin at end part | 55° | 4.9 | 30 |
| Example 7 | — | — | — | — | — | — | B | Slight unevenness of density as a whole | 55° | 4.8 | 30 |
| Example 8 | — | — | — | — | — | — | A | | 55° | 4.8 | 34 |
| Example 9 | — | — | — | — | — | — | A | | 55° | 4.8 | 32 |
| Example 10 | — | — | — | — | — | — | B | Slightly thick near d4 | 55° | 4.8 | 28 |
| Example 11 | — | — | — | — | — | — | A | | 55° | 4.8 | 28 |
| Example 12 | — | — | — | C | A | D | | 50° | 4.5 | 31 |
| Example 13 | — | — | C | A | D | D | | 45° | 4.2 | 31 |
| Example 14 | — | C | A | C | D | D | | 40° | 3.9 | 32 |
| Example 15 | — | C | B | C | D | D | Slight unevenness of density as a whole | 40° | 3.9 | 32 |
| Example 16 | — | C | B | C | D | D | Slight thick near d3  Slight unevenness of density as a whole | 40° | 3.9 | 32 |
| Example 17 | — | C | B | C | D | D | Slightly thin at end part  Slight unevenness of density as a whole | 40° | 4.0 | 32 |
| Example 18 | — | C | B | C | D | D | Slight unevenness of density as a whole | 40° | 3.8 | 34 |
| Example 19 | — | C | B | C | D | D | Slight unevenness of density as a whole | 40° | 4.0 | 30 |
| Example 20 | — | C | B | C | D | D | Slight unevenness of density as a whole | 40° | 4.1 | 28 |
| Example 21 | — | C | B | C | D | D | Slight unevenness of density as a whole | 40° | 4.4 | 27 |
| Example 22 | C | A | C | D | D | D | | 35° | 3.6 | 32 |
| Example 23 | A | C | D | D | D | D | | 30° | 3.3 | 32 |
| Example 24 | A | C | D | D | D | D | | 30° | 3.4 | 30 |
| Example 25 | B | C | D | D | D | D | Slightly thin at end part | 30° | 3.5 | 28 |
| Example 26 | A | C | D | D | D | D | | 30° | 3.7 | 28 |
| Example 27 | A | C | D | D | D | D | | 30° | 3.9 | 25 |
| Example 28 | — | — | — | — | — | A | | 55° | 4.6 | 31 |
| Example 29 | — | — | — | — | C | A | | 55° | 4.6 | 31 |
| Example 30 | — | — | — | — | — | A | | 55° | 4.7 | 31 |
| Example 31 | — | — | — | — | C | A | | 55° | 4.6 | 31 |
| Example 32 | — | — | — | — | C | B | Slightly thick near d3 | 55° | 4.7 | 31 |
| Example 33 | — | — | — | — | — | B | Slightly thin at end part | 55° | 4.7 | 31 |
| Example 34 | — | — | — | — | — | B | Slight unevenness of density as a whole | 55° | 4.7 | 31 |
| Example 35 | — | — | — | — | C | A | | 55° | 4.6 | 36 |
| Example 36 | — | — | — | — | — | A | | 55° | 4.7 | 34 |
| Example 37 | — | — | — | — | — | B | Slightly thick near d4 | 55° | 4.7 | 29 |
| Example 38 | — | — | C | A | D | D | | 50° | 4.2 | 32 |
| Example 39 | — | — | C | B | C | D | Slightly thick near d4 | 45° | 4.0 | 32 |
| Example 40 | — | — | C | A | C | D | | 45° | 3.8 | 35 |
| Example 41 | — | — | C | A | C | D | | 45° | 4.1 | 31 |
| Example 42 | — | — | C | B | C | D | Slightly thin at end part | 45° | 4.2 | 29 |
| Example 43 | — | C | A | C | D | D | | 40° | 3.7 | 34 |

TABLE 10-continued

| | Presence or absence of uneven solid image density (B = 0.55) | | | | | | Modified printer used for evaluation B = 0.55 $\theta_{max}$ | Dark decay unevenness [V] | End part leakage number D103 [sheets] |
|---|---|---|---|---|---|---|---|---|---|
| | $\theta_{max} = 30°$ | $\theta_{max} = 35°$ | $\theta_{max} = 40°$ | $\theta_{max} = 45°$ | $\theta_{max} = 50°$ | $\theta_{max} = 55°$ | Image characteristic/remarks for part with best evaluation for unevenness of density | | |
| Example 44 | C | A | C | D | D | D | | 35° | 3.4 | 34 |
| Example 45 | C | A | C | D | D | D | | 35° | 3.2 | 36 |
| Example 46 | C | A | C | D | D | D | | 35° | 3.5 | 32 |
| Example 47 | C | A | C | D | D | D | | 35° | 3.7 | 30 |
| Example 48 | C | B | C | D | D | D | Slightly thick near d3 | 35° | 3.8 | 28 |
| Example 49 | A | C | D | D | D | D | | 30° | 3.1 | 34 |
| Example 50 | — | — | — | — | — | A | | 55° | 4.5 | 32 |
| Example 51 | — | — | — | — | — | A | | 55° | 4.6 | 31 |
| Example 52 | — | — | — | — | — | A | | 55° | 4.5 | 32 |
| Example 53 | — | — | — | — | — | A | | 55° | 4.6 | 31 |
| Example 54 | — | — | — | — | — | A | | 55° | 4.6 | 31 |
| Example 55 | — | — | — | — | — | B | Slightly thick near d3 | 55° | 4.8 | 30 |

TABLE 11

| | Presence or absence of uneven solid image density (B = 0.55) | | | | | | Modified printer used for evaluation B = 0.55 $\theta_{max}$ | Dark decay unevenness [V] | End part leakage number D103 [sheets] |
|---|---|---|---|---|---|---|---|---|---|
| | $\theta_{max} = 30°$ | $\theta_{max} = 35°$ | $\theta_{max} = 40°$ | $\theta_{max} = 45°$ | $\theta_{max} = 50°$ | $\theta_{max} = 55°$ | Image characteristic/remarks for part with best evaluation for unevenness of density | | |
| Example 56 | — | — | — | — | — | A | | 55° | 4.9 | 30 |
| Example 57 | — | — | — | — | C | B | Slightly thick near d3 | 55° | 4.9 | 30 |
| Example 58 | — | — | — | — | — | B | Slightly thin at end part | 55° | 4.9 | 30 |
| Example 59 | — | — | — | — | — | B | Slight unevenness of density as a whole | 55° | 4.9 | 30 |
| Example 60 | — | — | — | — | A | D | | 50° | 4.5 | 31 |
| Example 61 | — | — | — | C | A | D | | 50° | 4.4 | 33 |
| Example 62 | — | — | — | C | A | D | | 50° | 4.6 | 30 |
| Example 63 | — | — | — | C | B | D | Slightly thin at end part | 50° | 4.6 | 27 |
| Example 64 | — | — | C | A | C | D | | 45° | 4.2 | 32 |
| Example 65 | — | C | A | C | D | D | | 40° | 3.9 | 32 |
| Example 66 | C | A | C | D | D | D | | 35° | 3.5 | 32 |
| Example 67 | A | C | D | D | D | D | | 30° | 3.2 | 33 |
| Example 68 | — | — | — | — | — | A | | 55° | 4.6 | 31 |
| Example 69 | — | — | — | — | — | A | | 55° | 4.6 | 31 |
| Example 70 | — | — | — | — | — | A | | 55° | 4.6 | 31 |
| Example 71 | — | — | — | — | — | B | Slightly thick near d3 | 55° | 4.6 | 31 |
| Example 72 | — | — | — | — | C | B | Slightly thick near d3 | 55° | 4.7 | 31 |
| Example 73 | — | — | — | — | — | B | Slightly thin at end part | 55° | 4.6 | 31 |
| Example 74 | — | — | — | C | A | D | | 50° | 4.3 | 32 |
| Example 75 | — | — | C | A | C | D | | 45° | 4.0 | 33 |
| Example 76 | — | — | C | B | C | D | Slight unevenness of density as a whole | 45° | 4.0 | 33 |
| Example 77 | — | — | C | B | C | D | Slight unevenness of density as a whole | 45° | 3.8 | 35 |
| Example 78 | — | — | C | B | C | D | Slight unevenness of density as a whole | 45° | 4.1 | 31 |
| Example 79 | — | — | C | B | C | D | Slight unevenness of density as a whole | 45° | 4.2 | 29 |
| Example 80 | — | C | B | C | D | D | Slightly thin at end part | 40° | 3.7 | 34 |
| Example 81 | C | A | C | D | D | D | | 35° | 3.3 | 34 |
| Example 82 | C | A | C | D | D | D | | 35° | 3.2 | 35 |
| Example 83 | C | A | C | D | D | D | | 35° | 3.5 | 31 |
| Example 84 | C | A | C | D | D | D | | 35° | 3.7 | 30 |
| Example 85 | A | C | D | D | D | D | | 30° | 3.0 | 35 |
| Example 86 | — | — | — | — | — | A | Uniform density only on one side (direction with positive Y) D on the opposite side (direction with negative Y) | 55° | 4.9 | 30 |
| Example 87 | — | — | — | — | — | B | Using evaluation machine in which position of central optical axis was shifted by 15 mm from central position of image forming area (in the direction with negative Y) | 55° | 4.9 | 29 |

*Note:
see remarks

TABLE 12

| | Presence or absence of uneven solid image density (B = 0.55) | | | | | | Image characteristic/remarks for part with best evaluation for unevenness of density | Modified printer used for evaluation B = 0.55 $\theta_{max}$ | Dark decay unevenness [V] | End part leakage number D103 [sheets] |
|---|---|---|---|---|---|---|---|---|---|---|
| | $\theta_{max}=$ 30° | $\theta_{max}=$ 35° | $\theta_{max}=$ 40° | $\theta_{max}=$ 45° | $\theta_{max}=$ 50° | $\theta_{max}=$ 55° | | | | |
| Comparative Example 1 | — | — | — | — | — | C | Thin density as a whole | 55° | 9.1 | 22 |
| Comparative Example 2 | — | — | — | — | — | C | Slightly thin at end part | 55° | 9.1 | 22 |
| Comparative Example 3 | — | — | — | — | — | C | Thin density as a whole | 55° | 8.7 | 20 |
| Comparative Example 4 | — | — | — | — | — | A | | 55° | 9.4 | 23 |
| Comparative Example 5 | — | — | — | — | — | B | Slight unevenness of density as a whole | 55° | 9.7 | 23 |
| Comparative Example 6 | — | — | — | — | — | C | Thin density as a whole | 55° | 8.6 | 25 |
| Comparative Example 7 | — | — | — | — | — | C | Thin density as a whole | 55° | 9.3 | 19 |
| Comparative Example 8 | — | C | B | C | D | D | | 40° | 7.8 | 26 |
| Comparative Example 9 | B | C | D | D | D | D | | 30° | 7.1 | 28 |
| Comparative Example 10 | — | — | — | — | — | — | | 55° | 8.5 | 22 |
| Comparative Example 11 | — | — | — | — | — | C | Slightly thick near d3 | 55° | 10.3 | 19 |
| Comparative Example 12 | — | — | — | — | — | A | | 55° | 10.1 | 19 |
| Comparative Example 13 | — | — | — | — | — | — | | 55° | 8.2 | 24 |
| Comparative Example 14 | — | — | — | — | — | — | | 55° | 9.2 | 20 |
| Comparative Example 15 | — | — | — | — | — | — | | 55° | 11.1 | 15 |
| Comparative Example 16 | — | — | — | — | — | C | Thin density as a whole | 55° | 10.3 | 22 |
| Comparative Example 17 | — | — | — | — | — | A | | 55° | 10.5 | 14 |
| Comparative Example 18 | — | — | — | — | — | A | | 55° | 13.2 | 13 |
| Comparative Example 19 | — | — | C | A | C | D | | 45° | 9.8 | 20 |
| Comparative Example 20 | C | A | C | D | D | D | | 35° | 8.8 | 22 |
| Comparative Example 21 | — | — | — | — | — | A | | 55° | 10.7 | 17 |
| Comparative Example 22 | — | — | C | A | C | D | | 45° | 9.9 | 20 |
| Comparative Example 23 | A | C | D | D | D | D | | 30° | 8.2 | 22 |
| Comparative Example 24 | — | — | — | — | — | A | | 55° | 10.2 | 17 |
| Comparative Example 25 | — | — | C | A | C | D | | 45° | 10.0 | 20 |
| Comparative Example 26 | A | C | D | D | D | D | | 30° | 8.5 | 21 |
| Comparative Example 27 | D | D | D | D | D | D | | 35° | 0.1 | 38 |
| Comparative Example 28 | D | D | D | D | D | D | | 35° | 0.1 | 34 |
| Comparative Example 29 | D | D | D | D | D | D | | 35° | 0.1 | 31 |
| Comparative Example 30 | D | D | D | D | D | D | | 30° | 0.0 | 40 |
| Comparative Example 31 | D | D | D | D | D | D | | Default machine | 0.0 | 36 |
| Comparative Example 32 | D | D | D | D | D | D | | Default machine | 0.1 | 32 |
| Comparative Example 33 | D | D | D | D | D | D | | Default machine | 0.1 | 32 |
| Comparative Example 34 | D | D | D | D | D | D | | Default machine | 0.0 | 38 |
| Comparative Example 35 | D | D | D | D | D | D | | Default machine | 0.0 | 35 |
| Comparative Example 36 | D | D | D | D | D | D | | Default machine | 0.1 | 31 |
| Comparative Example 37 | D | D | D | D | D | D | | Default machine | 0.1 | 29 |
| Comparative Example 38 | D | D | D | D | D | D | | Default machine | 0.1 | 24 |
| Comparative Example 39 | D | D | D | D | D | D | | Default machine | 0.1 | 24 |
| Comparative Example 40 | D | D | D | D | D | D | | Default machine | 0.2 | 24 |

As described above with reference to embodiments and Examples, according to the present invention, an electrophotographic photosensitive member with a distribution of sensitivity in the axial direction of the photosensitive member while suppressing uneven dark decay and occurrence of leakage can be provided.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-117816, filed Jun. 25, 2019, which is hereby incorporated by reference herein in its entirety.

What is claimed is:

1. An electrophotographic photosensitive member, comprising in this order:
   a cylindrical support;
   a conductive layer that contains a binder resin and a metal oxide fine particle, the metal oxide fine particle having a core material containing titanium oxide and an enveloping layer covering the core material that contains niobium or tantalum-doped titanium oxide;
   a charge generating layer that contains a hydroxygallium phthalocyanine crystal as a charge generating material, the hydroxygallium phthalocyanine crystal having strong peaks at Bragg angle 2θ of 7.4°±0.3° and 28.2°±0.3° in CuKα characteristic X-ray diffraction; and
   a charge transport layer, wherein
   $d_1<d_2<d_3<d_4<d_5$ where in the charge generating layer, when a region from a central position of an image forming area to an end position of the image forming area is divided in an axial direction of the cylindrical support into five equal regions, $d_1$, $d_2$, $d_3$, $d_4$ and $d_5$ are respectively average film thicknesses of the charge generating layer in each region in order from the central part,
   the hydroxygallium phthalocyanine crystal contains 0.4 to 3.0% by mass of a compound having a structure represented by formula (A1)

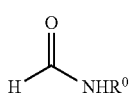

(A1)

where $R^0$ represents a methyl group, a propyl group or a vinyl group, $$\frac{1-e^{-2\beta d_6}}{1-e^{-2\beta d_0}} \geq 1.2 \quad \text{(E1)}$$

where $\beta$ (nm$^{-1}$) is an absorption coefficient of the charge generating layer, $d_0$ is a film thickness of the charge generating layer at the central position of the image forming area and $d_6$ is a film thickness of the charge generating layer at the end position of the image forming area, and a film thickness of the charge generating layer for all Y, where $0 \leq Y \leq Y_{max}$, is between $d-0.2\Delta$ and $d+0.2\Delta$ with respect to $d=d(Y)$ calculated with expression (E2)

$$d(Y) = d_0 + \Delta(1-\beta\Delta)\frac{Y^2}{Y_{max}^2} + \beta\Delta^2\frac{Y^4}{Y_{max}^4} \quad \text{(E2)}$$

where Y (mm) is a distance in the charge generating layer from the central position of the image forming area in the axial direction of the cylindrical support, $Y_{max}$ is a value of Y at the end position of the image forming area, and $\Delta = d_6 - d_0$.

2. The electrophotographic photosensitive member according to claim 1, wherein the conductive layer has a film thickness of greater than 10 μm.

3. A process cartridge integrally supporting an electrophotographic photosensitive member and at least one unit selected from the group consisting of a charging unit, a developing unit and a cleaning unit, the process cartridge being removably attached to a main body of an electrophotographic apparatus, the electrophotographic photosensitive member comprising in this order:

a cylindrical support;

a conductive layer that contains a binder resin and a metal oxide fine particle, the metal oxide fine particle having a core material containing titanium oxide and an enveloping layer covering the core material that contains niobium or tantalum-doped titanium oxide;

a charge generating layer that contains a hydroxygallium phthalocyanine crystal as a charge generating material, the hydroxygallium phthalocyanine crystal having strong peaks at Bragg angle 2θ of 7.4°±0.3° and 28.2°±0.3° in CuKα characteristic X-ray diffraction; and a charge transport layer, wherein $d_1 < d_2 < d_3 < d_4 < d_5$ where in the charge generating layer, when a region from a central position of an image forming area to an end position of the image forming area is divided in an axial direction of the cylindrical support into five equal regions, $d_1$, $d_2$, $d_3$, $d_4$ and $d_5$ are respectively average film thicknesses of the charge generating layer in each region in order from the central part, the hydroxygallium phthalocyanine crystal contains 0.4 to 3.0% by mass of a compound having a structure represented by formula (A1)

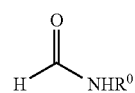

(A1)

where $R^0$ represents a methyl group, a propyl group or a vinyl group, $$\frac{1-e^{-2\beta d_6}}{1-e^{-2\beta d_0}} \geq 1.2 \quad \text{(E1)}$$

where $\beta$ (nm$^{-1}$) is an absorption coefficient of the charge generating layer, $d_0$ is a film thickness of the charge generating layer at the central position of the image forming area and $d_6$ is a film thickness of the charge generating layer at the end position of the image forming area, and a film thickness of the charge generating layer for all Y, where $0 \leq Y \leq Y_{max}$, is between $d-0.2\Delta$ and $d+0.2\Delta$ with respect to $d=d(Y)$ calculated with expression (E2)

$$d(Y) = d_0 + \Delta(1-\beta\Delta)\frac{Y^2}{Y_{max}^2} + \beta\Delta^2\frac{Y^4}{Y_{max}^4} \quad \text{(E2)}$$

where Y (mm) is a distance in the charge generating layer from the central position of the image forming area in the axial direction of the cylindrical support, $Y_{max}$ is a value of Y at the end position of the image forming area, and $\Delta = d_6 - d_0$.

4. The process cartridge according to claim 3, wherein the conductive layer has a film thickness of greater than 10 μm.

5. An electrophotographic apparatus having an electrophotographic photosensitive member, a charging unit, an exposure unit, a developing unit and a transfer unit, the electrophotographic photosensitive member comprising in this order:

a cylindrical support;

a conductive layer that contains a binder resin and a metal oxide fine particle, the metal oxide fine particle having a core material containing titanium oxide and an enveloping layer covering the core material that contains niobium or tantalum-doped titanium oxide;

a charge generating layer that contains a hydroxygallium phthalocyanine crystal as a charge generating material, the hydroxygallium phthalocyanine crystal having strong peaks at Bragg angle 2θ of 7.4°±0.3° and 28.2°±0.3° in CuKα characteristic X-ray diffraction; and a charge transport layer, wherein $d_1 < d_2 < d_3 < d_4 < d_5$ where in the charge generating layer, when a region from a central position of an image forming area to an end position of the image forming area is divided in an axial direction of the cylindrical support into five equal regions, $d_1$, $d_2$, $d_3$, $d_4$ and $d_5$ are respectively average film thicknesses of the charge generating layer in each region in order from the central part, the hydroxygallium phthalocyanine crystal contains 0.4 to 3.0% by mass of a compound having a structure represented by formula (A1)

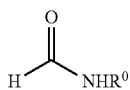 (A1)

where $R^0$ represents a methyl group, a propyl group or a vinyl group, $$\frac{1-e^{-2\beta d_6}}{1-e^{-2\beta d_0}} \geq 1.2 \qquad (E1)$$

where $\beta$ (nm$^{-1}$) is an absorption coefficient of the charge generating layer, $d_0$ is a film thickness of the charge generating layer at the central position of the image forming area and $d_6$ is a film thickness of the charge generating layer at the end position of the image forming area, and a film thickness of the charge generating layer for all Y, where $0 \leq Y \leq Y_{max}$, is between $d-0.2\Delta$ and $d+0.2\Delta$ with respect to $d=d(Y)$ calculated with expression (E2)

$$d(Y) = d_0 + \Delta(1-\beta\Delta)\frac{Y^2}{Y_{max}^2} + \beta\Delta^2\frac{Y^4}{Y_{max}^4} \qquad (E2)$$

where Y (mm) is a distance in the charge generating layer from the central position of the image forming area in the axial direction of the cylindrical support, $Y_{max}$ is a value of Y at the end position of the image forming area, and $\Delta = d_6 - d_0$.

6. The electrophotographic apparatus according to claim 5, wherein the conductive layer has a film thickness of greater than 10 μm.

* * * * *